US012644836B2

(12) United States Patent
Vasefi et al.

(10) Patent No.: US 12,644,836 B2
(45) Date of Patent: Jun. 2, 2026

(54) SYSTEM AND METHOD FOR ASSESSING PRODUCT

(71) Applicant: SafetySpect Inc., Grand Forks, ND (US)

(72) Inventors: Fartash Vasefi, Sherman Oaks, CA (US); Kenneth Edward Barton, Palm City, FL (US); Hossein Kashani Zadeh, Grand Forks, ND (US); Shereen Subhi Ismail, Grand Forks, ND (US); Hassan Reza, Grand Forks, ND (US)

(73) Assignee: SafetySpect Inc., Grand Forks, ND (US)

( * ) Notice: Subject to any disclaimer, the term of this patent is extended or adjusted under 35 U.S.C. 154(b) by 65 days.

(21) Appl. No.: 18/228,246

(22) Filed: Jul. 31, 2023

(65) Prior Publication Data

US 2023/0375476 A1     Nov. 23, 2023

Related U.S. Application Data

(63) Continuation-in-part of application No. 17/980,996, filed on Nov. 4, 2022.

(60) Provisional application No. 63/397,761, filed on Aug. 12, 2022, provisional application No. 63/394,180, filed on Aug. 1, 2022, provisional application No. 63/276,046, filed on Nov. 5, 2021.

(51) Int. Cl.
| | |
|---|---|
| *H04L 9/00* | (2022.01) |
| *G01N 21/64* | (2006.01) |
| *G06F 21/60* | (2013.01) |
| *G06F 21/64* | (2013.01) |

(52) U.S. Cl.
CPC ....... *G01N 21/6456* (2013.01); *G06F 21/602* (2013.01); *G06F 21/64* (2013.01)

(58) Field of Classification Search
CPC .. G01N 21/6456; G01N 33/12; G06F 21/602; G06F 21/64; G06Q 10/08; G06Q 30/0185; H04L 9/50
See application file for complete search history.

(56) References Cited

U.S. PATENT DOCUMENTS

| | | | |
|---|---|---|---|
| 11,454,496 B2 | 9/2022 | Lee et al. | |
| 2004/0245350 A1 | 12/2004 | Zeng | |
| 2005/0195389 A1 | 9/2005 | Noy et al. | |
| 2008/0177140 A1 | 7/2008 | Cline et al. | |
| 2008/0225272 A1 | 9/2008 | Nishimura et al. | |
| 2015/0377787 A1 | 12/2015 | Zeng et al. | |
| 2018/0264347 A1* | 9/2018 | Tran ...................... | G06V 40/28 |

(Continued)

*Primary Examiner* — Uzma Alam
*Assistant Examiner* — Mamadou Faye
(74) *Attorney, Agent, or Firm* — Jason T. Daniel, Esq; Daniel Law Offices, P.A.

(57) ABSTRACT

A method is disclosed. The method inspects a product using a first fluorescence imaging mode, a second fluorescence imaging mode, and a reflectance imaging mode, generates one or more final predictions based on the first fluorescence imaging mode, the second fluorescence imaging mode, and the reflectance imaging mode, collects data from one or more sensors, validates data collected from the one or more sensors, prepares a transaction based on the validated data and the one or more final predictions, broadcasts the transaction to a blockchain network, validates the transaction, and adds new block to the blockchain network based on validated transaction.

10 Claims, 49 Drawing Sheets

(56)                References Cited

U.S. PATENT DOCUMENTS

| | | | |
|---|---|---|---|
| 2019/0293620 A1* | 9/2019 | Farkas | ............... G01N 21/3563 |
| 2022/0187847 A1* | 6/2022 | Cella | ................ G05B 19/41885 |
| 2024/0153289 A1 | 5/2024 | Masaeli et al. | |

* cited by examiner

1240

1

SYSTEM AND METHOD FOR ASSESSING PRODUCT

CROSS REFERENCE TO RELATED APPLICATIONS

This application is a continuation-in-part of U.S. patent application Ser. No. 17/980,996 titled "System and Method For Assessing Product" filed Nov. 4, 2022, which is incorporated herein by reference in its entirety. The U.S. patent application Ser. No. 17/980,996 claims the benefit of U.S. Provisional Application No. 63/276,046, filed on Nov. 5, 2021, which is incorporated herein by reference in its entirety. The U.S. patent application Ser. No. 17/980,996 claims the benefit of U.S. Provisional Application No. 63/394,180, filed on Aug. 1, 2022, which is incorporated herein by reference in its entirety. The U.S. patent application Ser. No. 17/980,996 claims the benefit of U.S. Provisional Application No. 63/397,761, filed on Aug. 12, 2022, which is incorporated herein by reference in its entirety. This application claims the benefit of U.S. Provisional Application No. 63/394,180, filed on Aug. 1, 2022, which is incorporated herein by reference in its entirety. This application claims the benefit of U.S. Provisional Application No. 63/397,761, filed on Aug. 12, 2022, which is incorporated herein by reference in its entirety.

FIELD

The present invention relates to a system and method for assessing product. More particularly, the present invention relates to a non-invasive imaging system and method for assessing a product.

BACKGROUND

With increased product imports and limited monitoring, fraud is a growing concern for consumers. This is of special concern when imported product is food related. Fraud in food industry raises concern for food safety and food quality.

For example, seafood is highly vulnerable to fraud due to factors such as the similar appearance of many species, variation in prices, complex supply chains, and challenges with supply and demand. Although instances of seafood fraud are sometimes reported, many incidents go undetected and the full extent of seafood fraud is difficult to determine.

The flesh of many fish species is similar in taste and texture and, therefore, it is difficult to identify species in fillet form, especially after preparation for consumption. It can be relatively easy to substitute an inexpensive species for one of higher value. One survey by the National Marine Fisheries Service's National Seafood Inspection Laboratory (NSIL) found that 37% of fish and 13% of other seafood (e.g., shellfish, edible seaweed) from randomly selected vendors were mislabeled.

Current techniques for detection of species substitution and mislabeling of fish are laboratory-based methods that typically require hours and/or days for species detection. For example, the Food and Drug Administration (FDA) utilizes a DNA sequencing method called DNA barcoding, which has been found to be highly accurate at differentiating most species of fish. This method is advantageous in that it can target a wide range of species simultaneously. However, this method typically requires hours and/or days to achieve results and involves many laboratory steps for its completion. Furthermore, this method is not ideal for onsite testing, for example at fish processing facilities, because it involves expensive equipment and technical expertise. Instead, samples must be shipped to a commercial laboratory that perform the technique.

Due to the globalized nature and complexity of supply chains, the detection of product mislabeling, and quality requires innovative approaches that can measure compositional and chemical characteristics of products. Inspection tools are needed to assess product fraud more comprehensively and mitigate its potential impacts.

SUMMARY

Generally speaking, pursuant to the various embodiments, according to one aspect, a system for assessing product is presently disclosed. The system comprises an illumination hardware arrangement comprising transmission and sensing hardware, the illumination hardware arrangement configured to inspect a product using three modes from a group comprising: a first fluorescence imaging mode; a second fluorescence imaging mode; and a reflectance imaging mode. The system further comprises processing hardware configured to operate the illumination hardware arrangement according to a protocol comprising inspection settings of the three modes, wherein the processing hardware receives scan results for the three modes from the illumination hardware arrangement and identifies attributes of the product by constructing a dataset from the scan results for three two modes and analyzing the dataset. According to another aspect, the product being assessed is a pharmaceutical product, a drug product, biological product, meat, seafood, a construction product, a natural product, or a synthetic product. According to another aspect, the processing hardware comprises a processor, at least one trained artificial intelligence module, and at least one classifier. According to another aspect, the protocol is determined in part based on an identification of particular attributes expected to be associated with the product when examined using the three modes. According to another aspect, the three modes are three spectroscopy modes.

According to another aspect, a product inspection apparatus is disclosed. The apparatus comprises an illumination hardware arrangement comprising transmission and sensing hardware, the illumination hardware arrangement configured to inspect a product using three modes from a group comprising: a first fluorescence imaging mode; a second fluorescence imaging mode; and a reflectance imaging mode. The apparatus further comprises processing hardware configured to operate the illumination hardware arrangement according to a protocol comprising inspection settings of the three modes, wherein the processing hardware receives scan results for the three modes from the illumination hardware arrangement and identifies attributes of the product by constructing a dataset from the scan results for three two modes and analyzing the dataset. According to another aspect, the product comprises a pharmaceutical product, a drug product, biological product, meat, seafood, a construction product, a natural product, or a synthetic product. According to another aspect, the processing hardware of the apparatus comprises a processor, at least one trained artificial intelligence module, and at least one classifier. According to another aspect, the protocol is determined in part based on an identification of particular attributes expected to be associated with the product when examined using the three modes. According to another aspect, the three modes are three spectroscopy modes. According to another aspect, the transmission hardware of the apparatus comprises one or more light sources. According to another aspect, the one or more light sources of the apparatus are light emitting diodes used in the first fluorescence imaging mode. According to another aspect, the one or more light sources of the apparatus are light emitting diodes used in the second fluorescence imaging mode. According to another aspect, the one or more light sources of the apparatus are bulbs used in the reflectance imaging mode. According to another aspect, the sensing hardware of the apparatus comprises at least two spectrometers. According to another aspect, the two spectrometers are used in the reflectance imaging mode. According to another aspect, one of two spectrometers is used in the first fluorescence imaging mode and the second fluorescence imaging mode.

These and other advantages of the present invention will become apparent to this skilled in the art from the following detailed description of the invention and the accompanying drawings.

4

Figure 15:
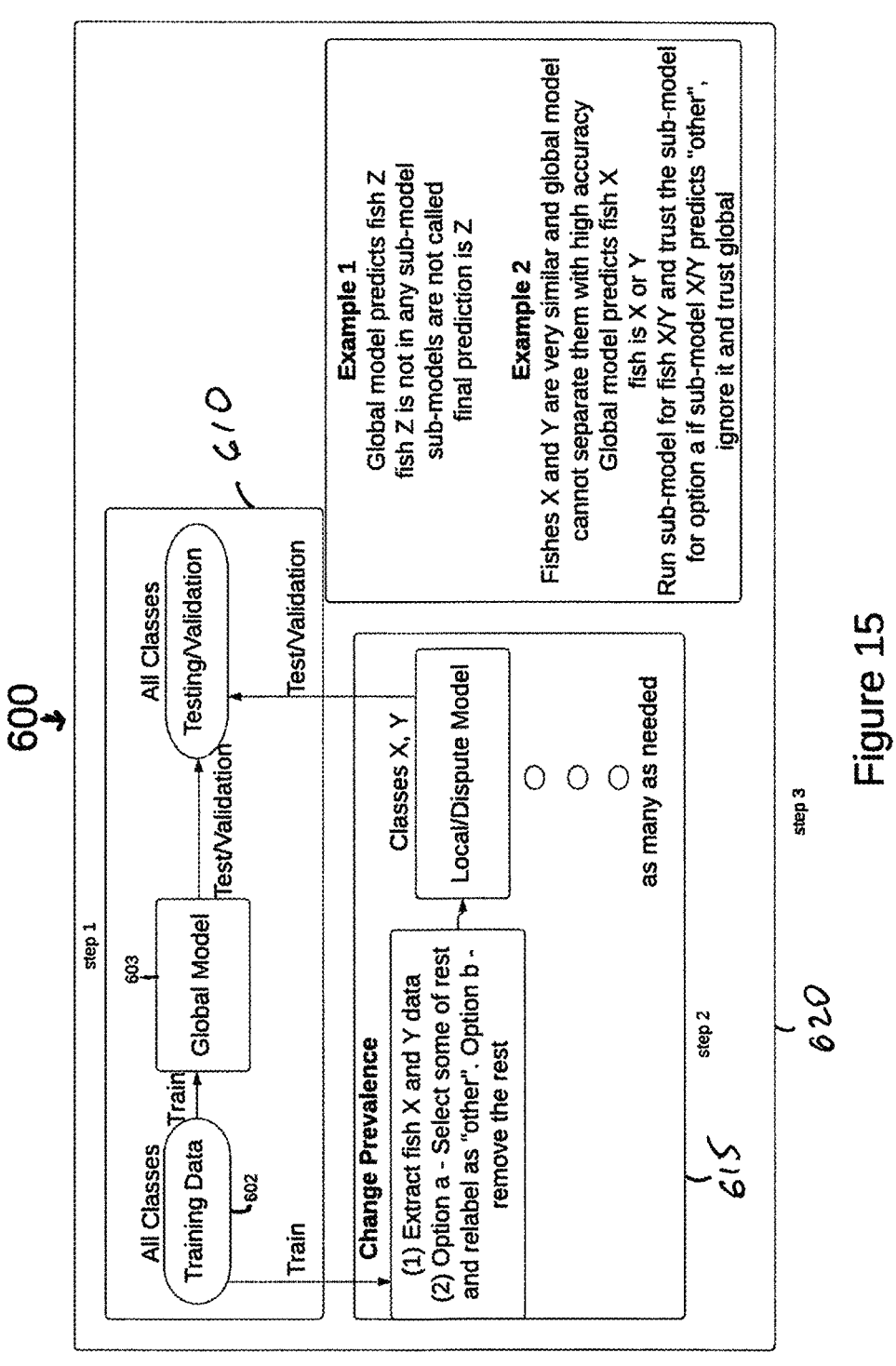
Figure 16:
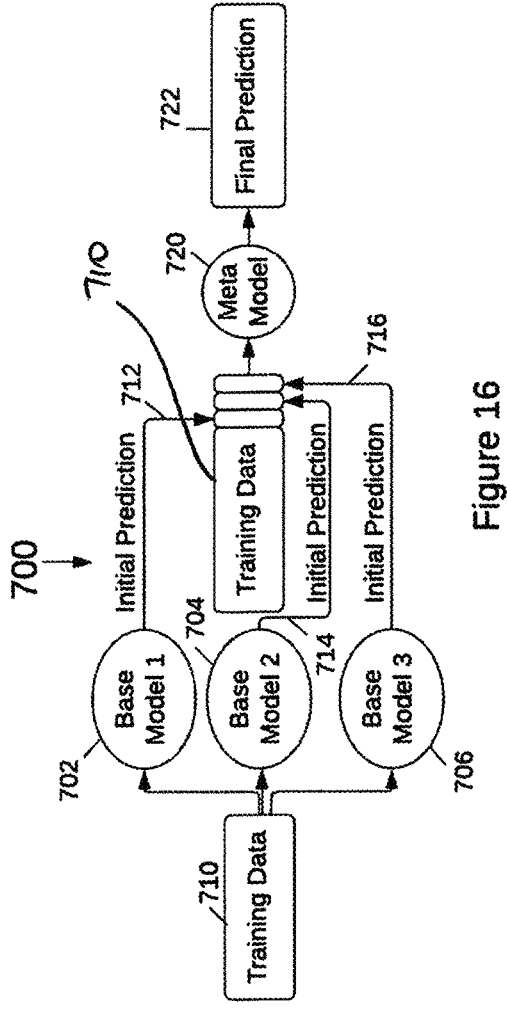
Figure 17:
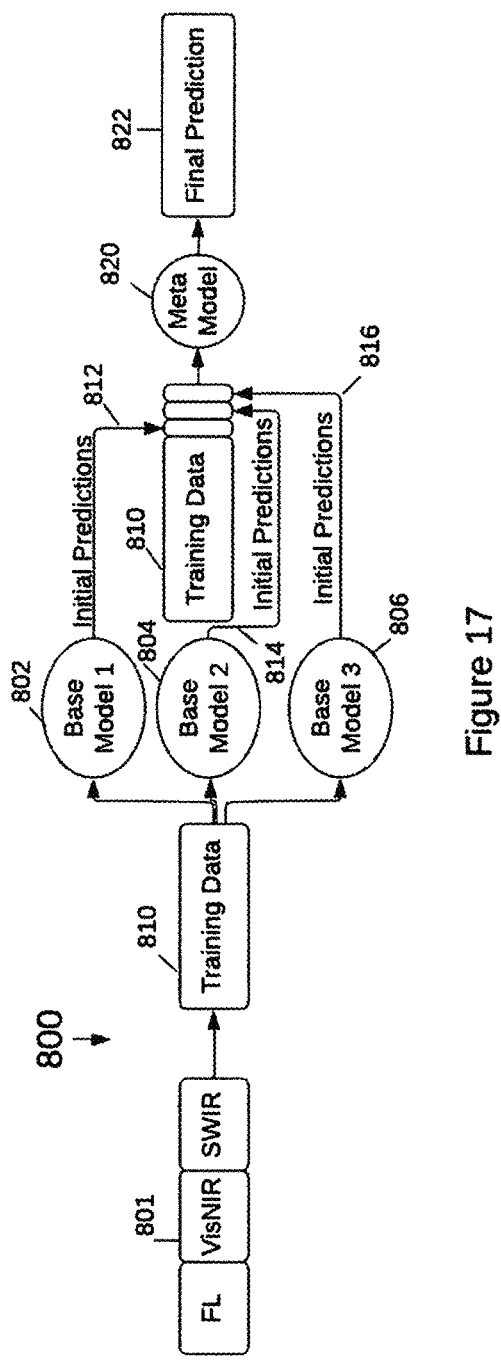
Figure 18:
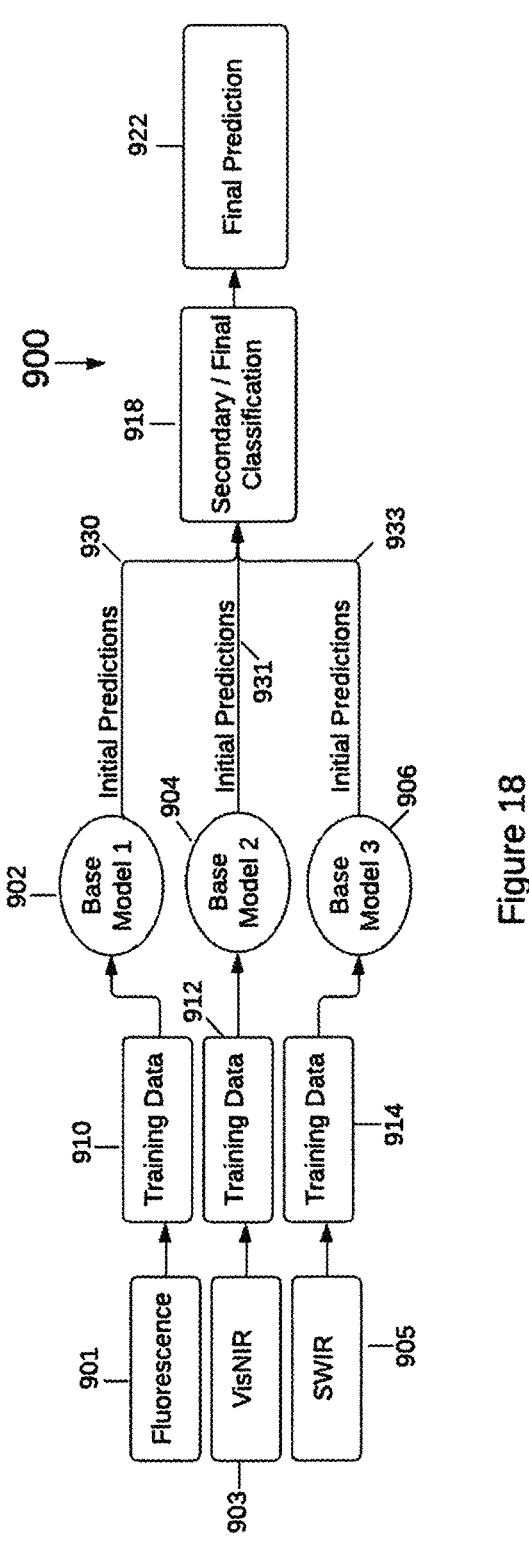
Figure 19:
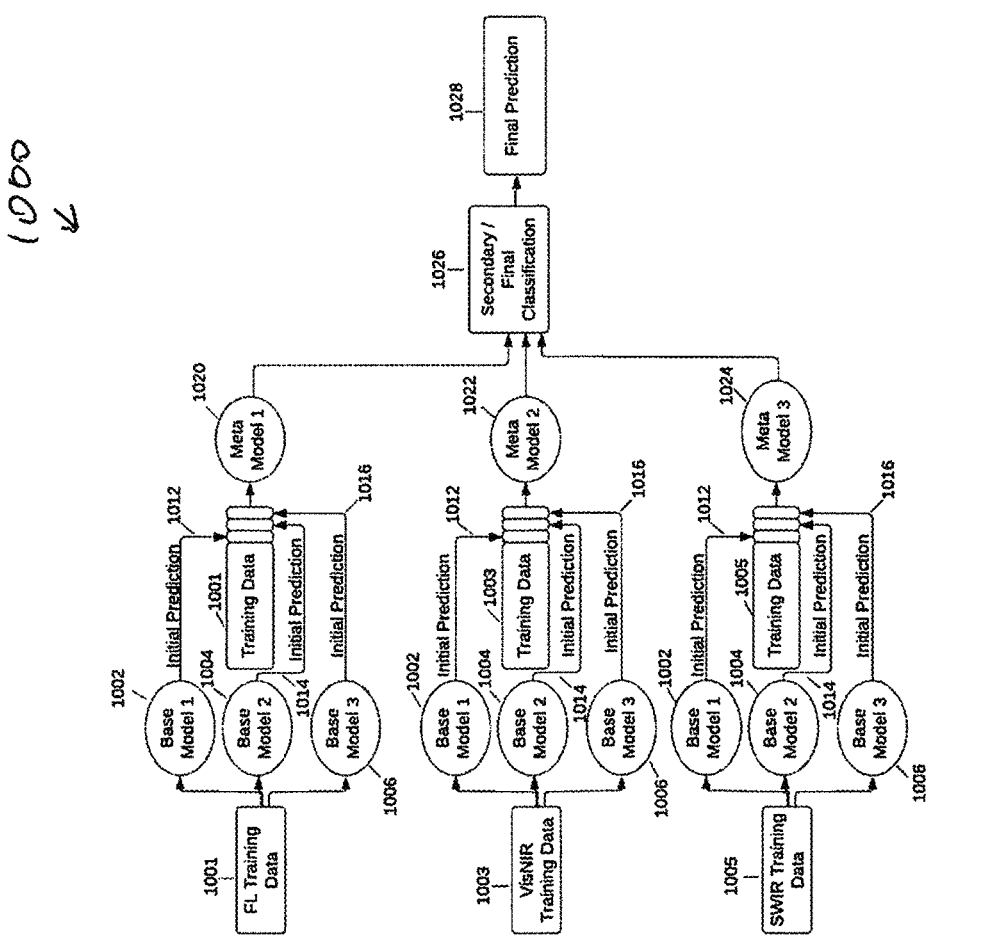

FIG. 15 depicts another method according to some embodiments presently disclosed;

FIG. 16 depicts another method according to some embodiments presently disclosed;

FIG. 17 depicts another method according to some embodiments presently disclosed;

FIG. 18 depicts another method according to some embodiments presently disclosed;

FIG. 19 depicts another method according to some embodiments presently disclosed.

Figure 20:
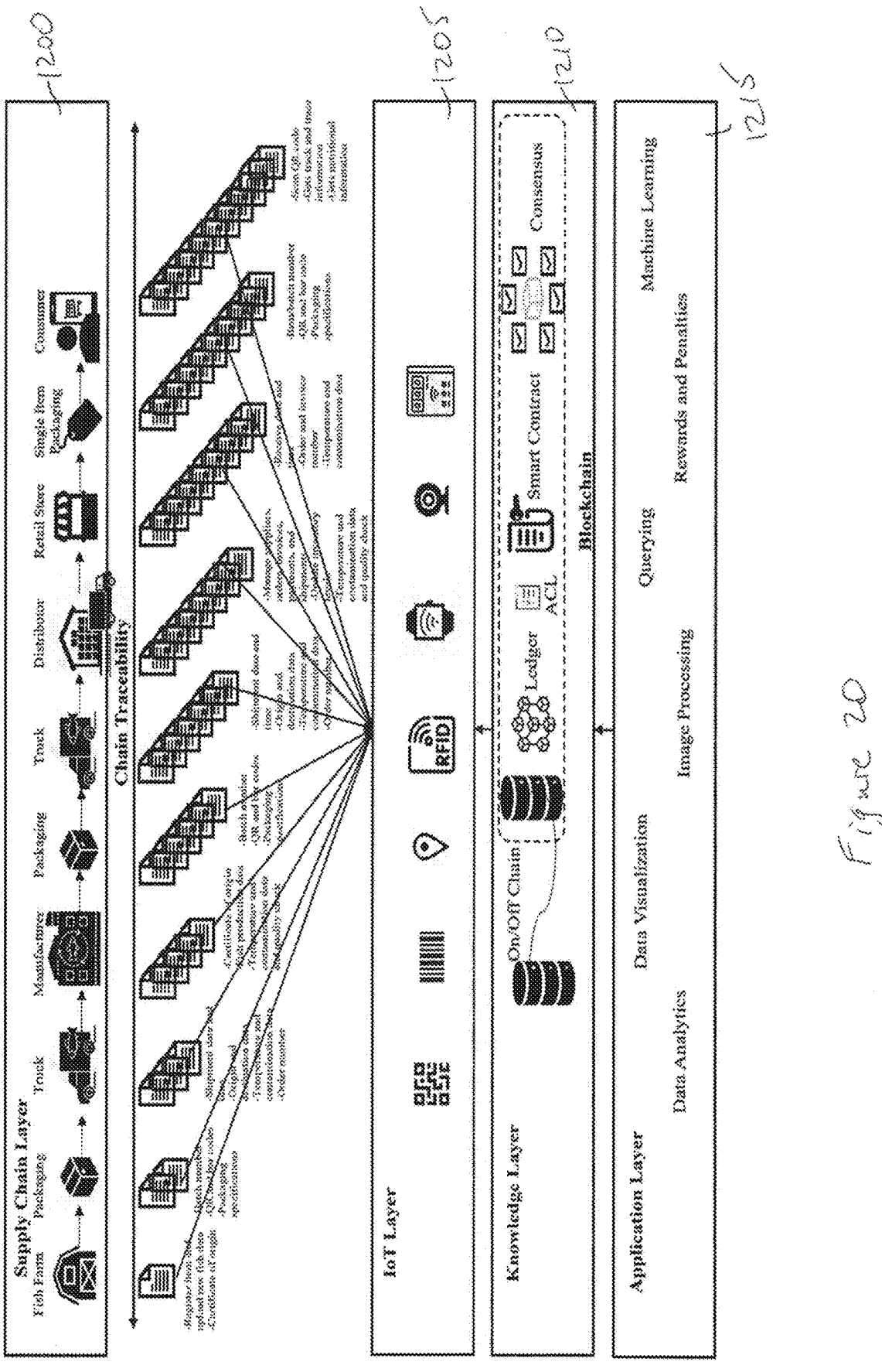
Figure 21:
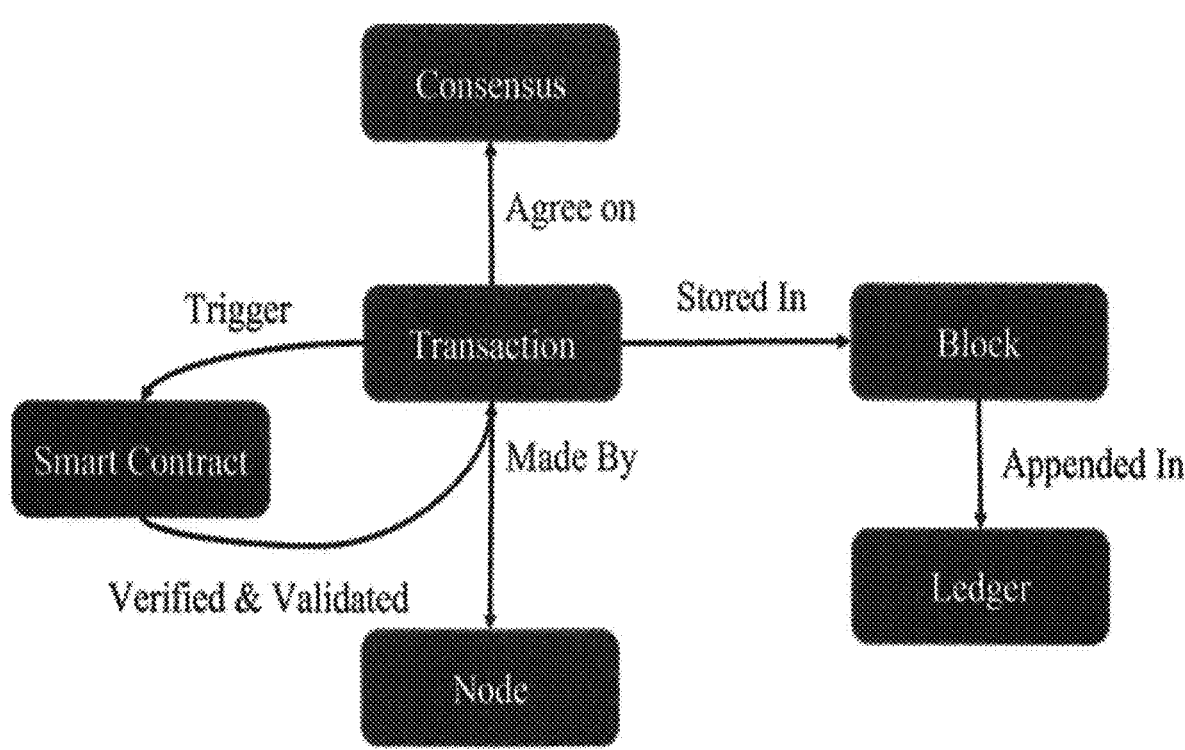
Figure 22:
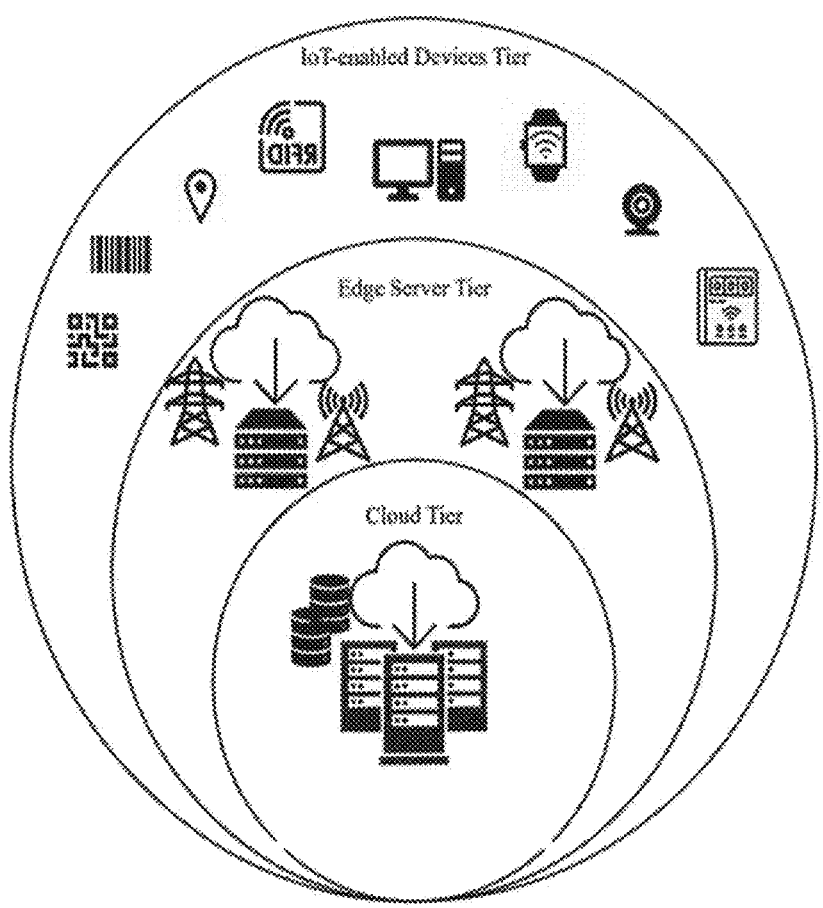
Figure 23:
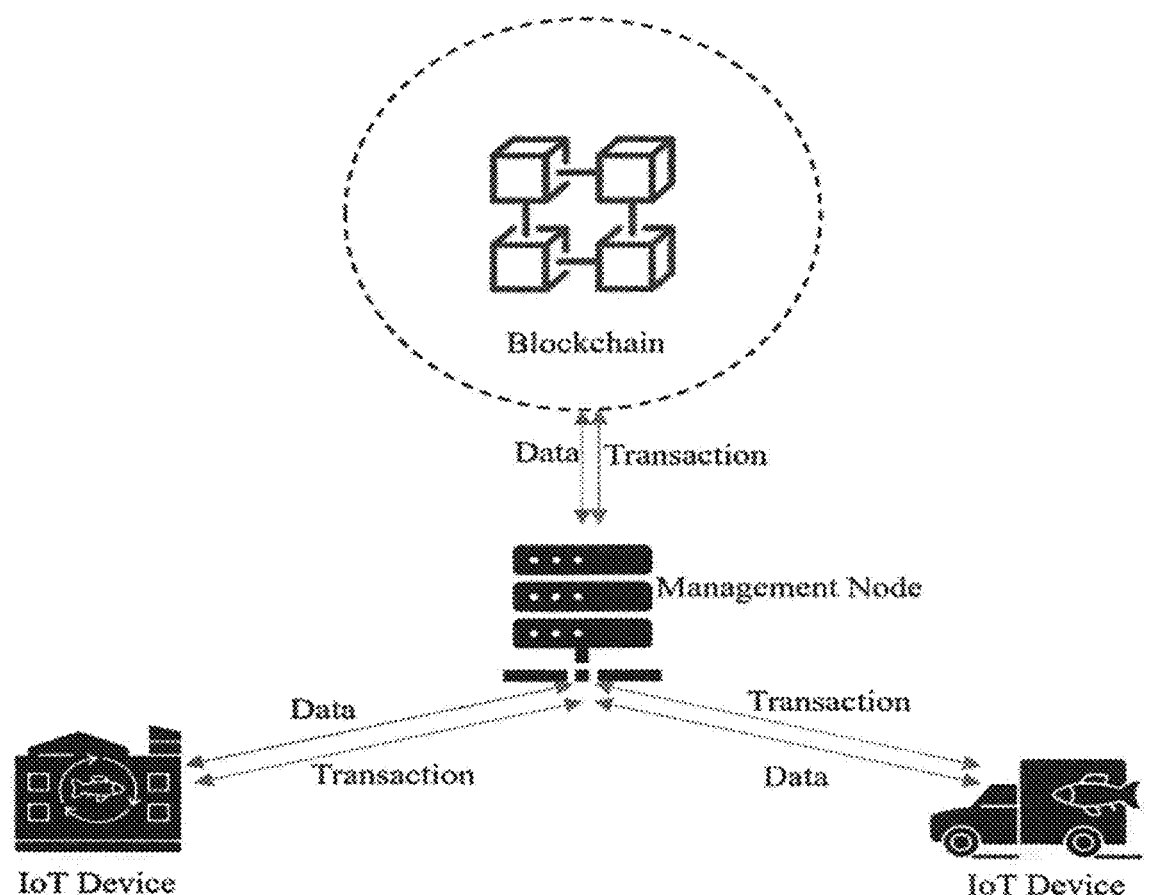
Figure 24:
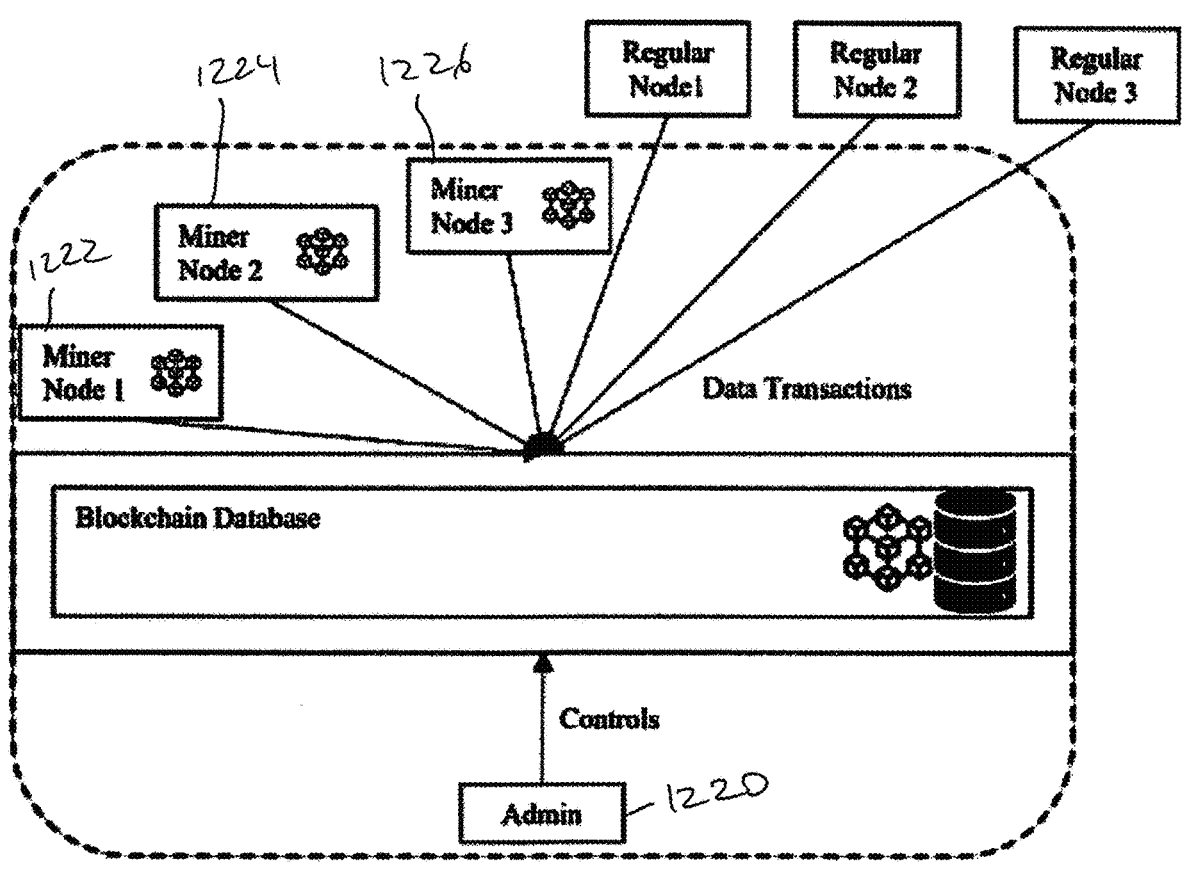
Figure 25:
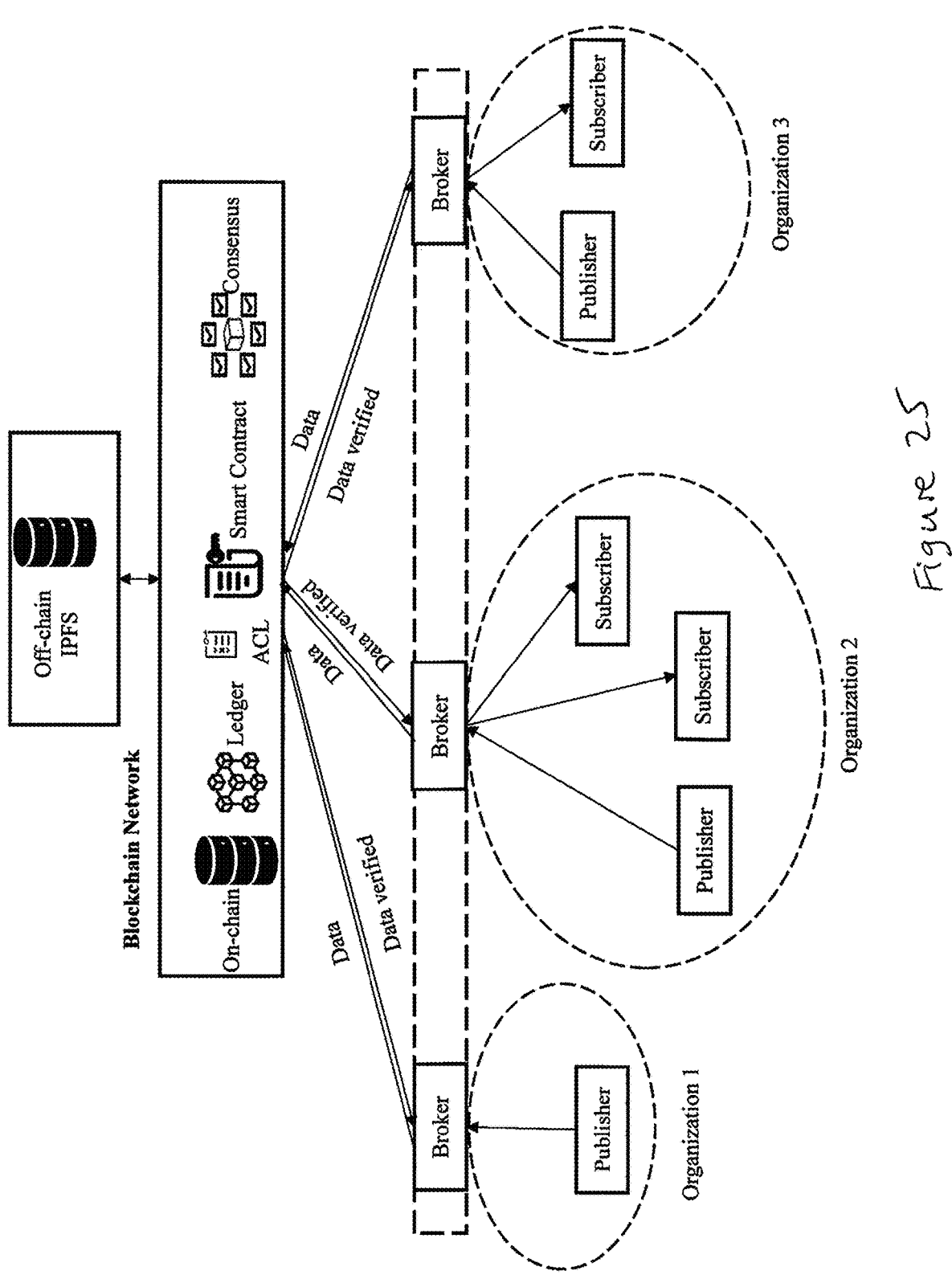
Figure 26:
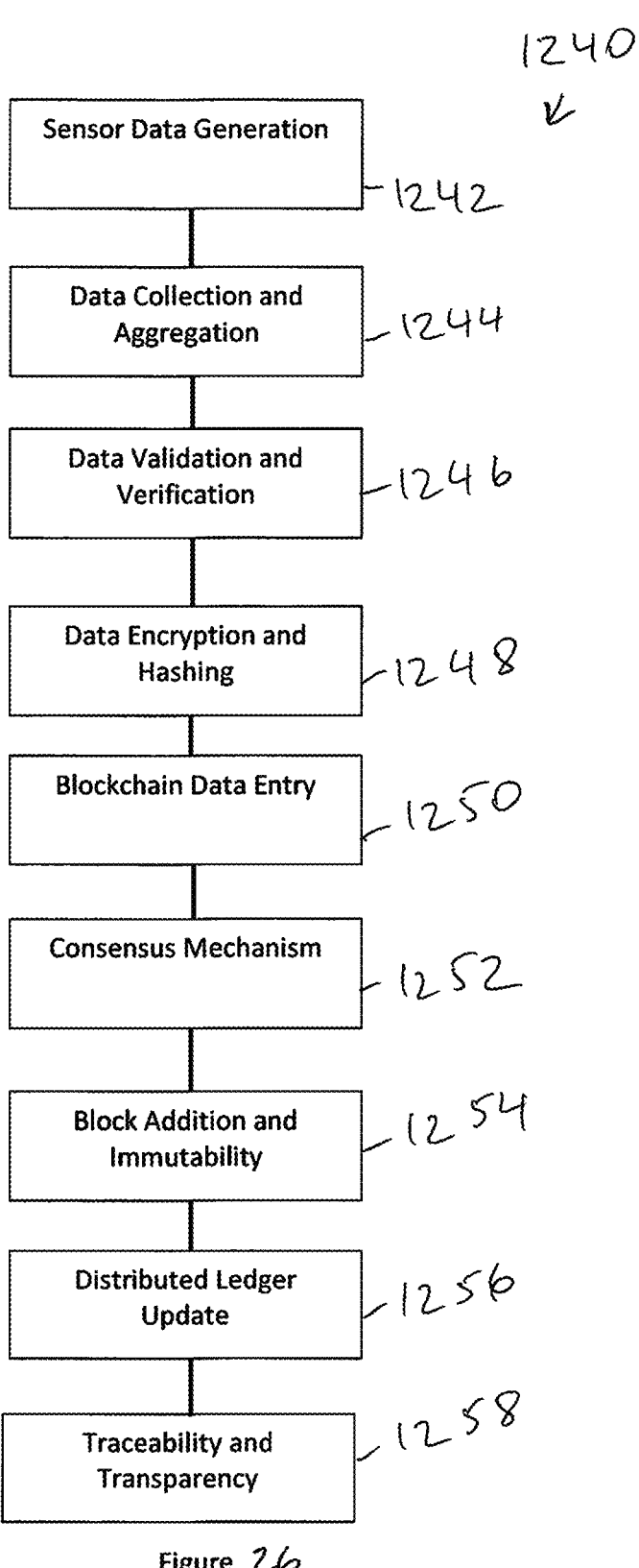
Figure 27:
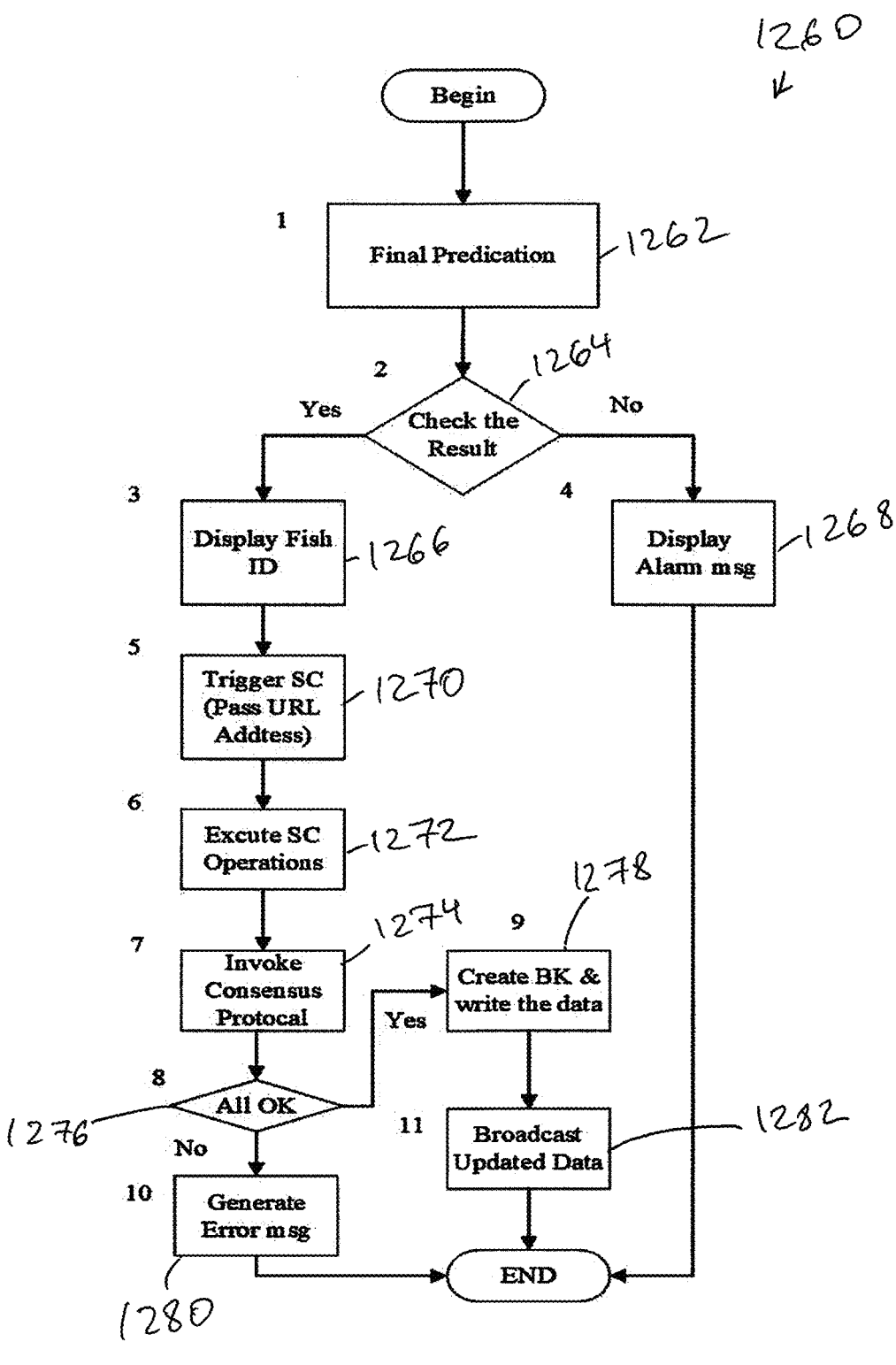
Figure 28:
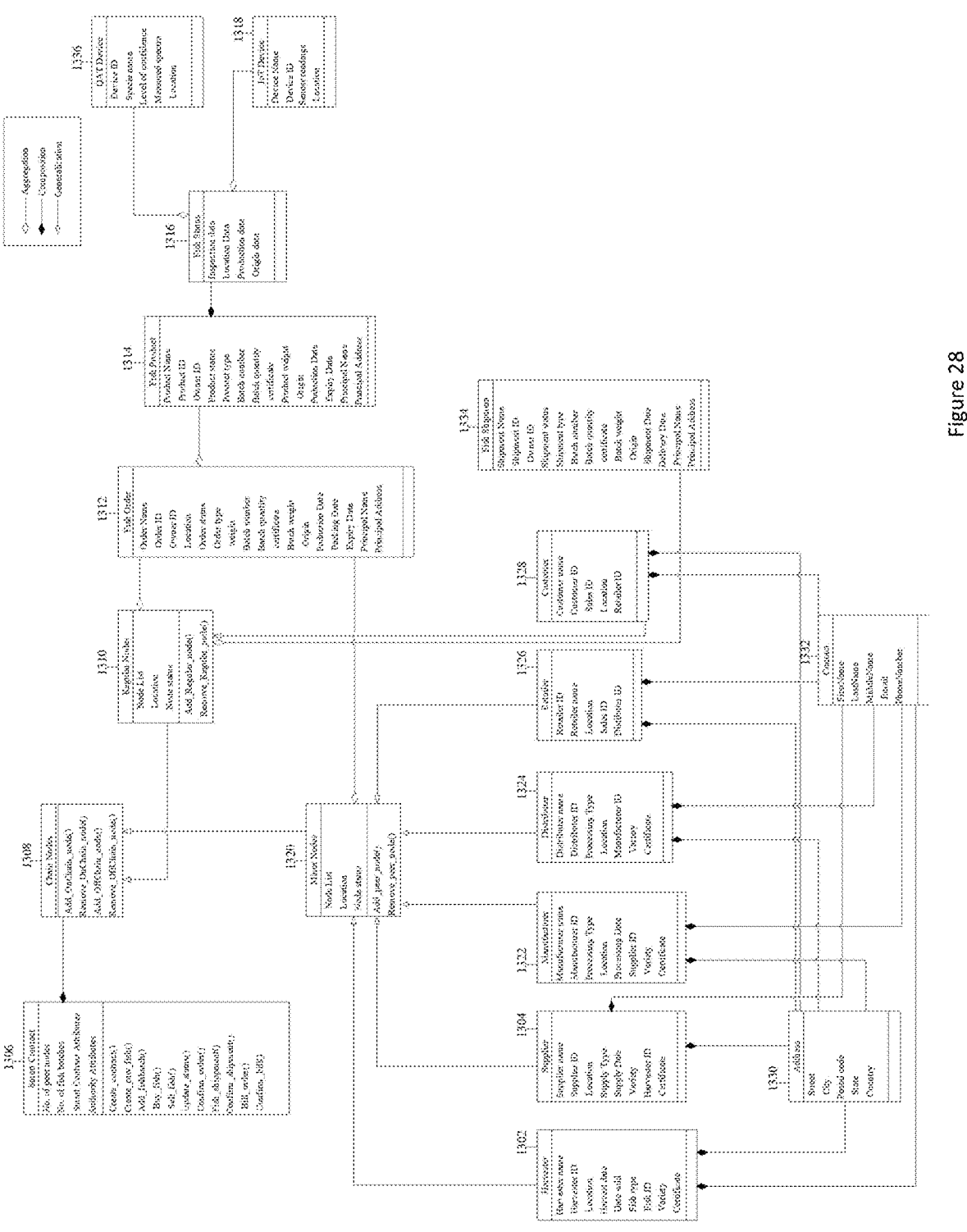
Figure 29:
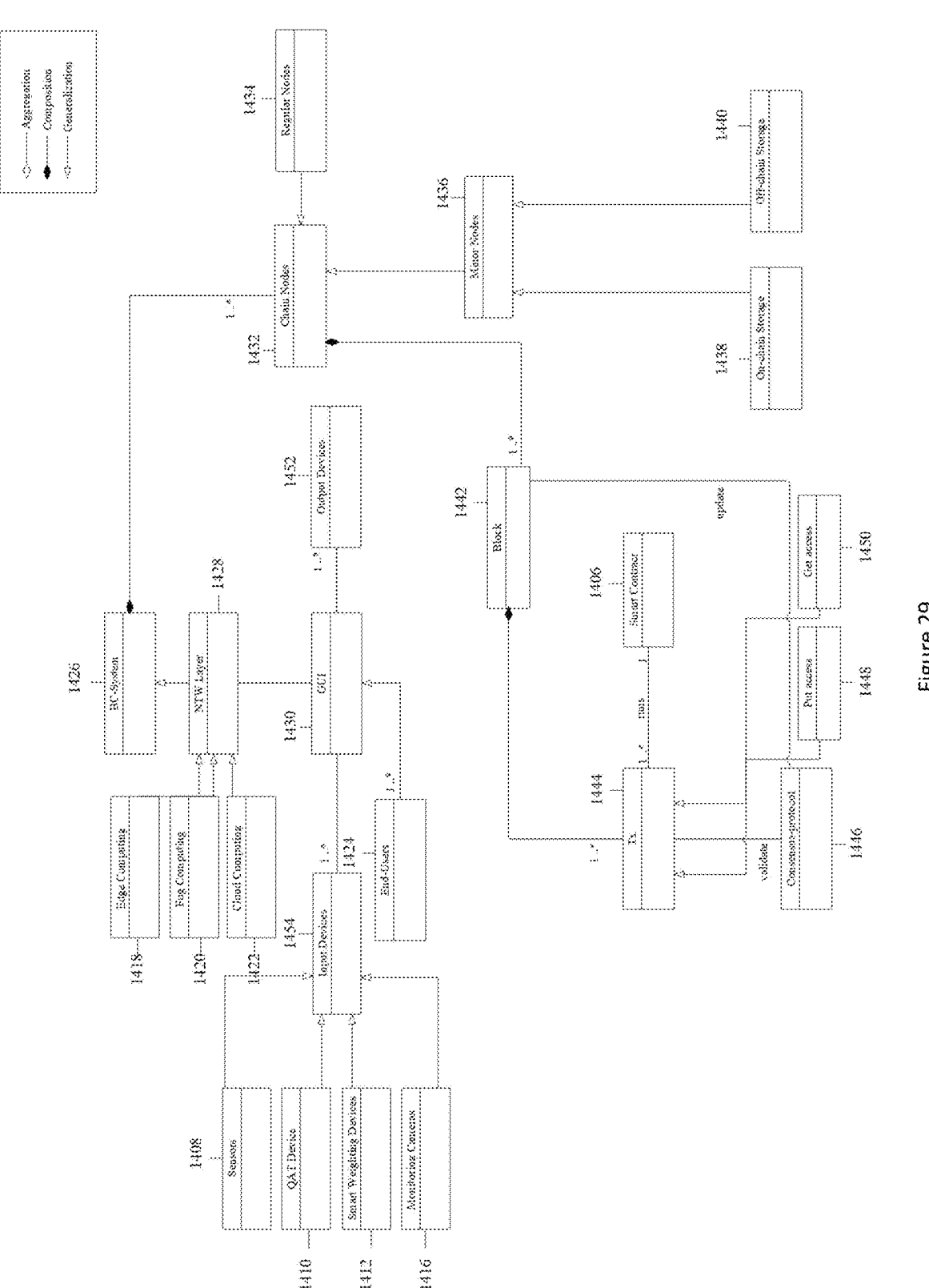
Figure 30:
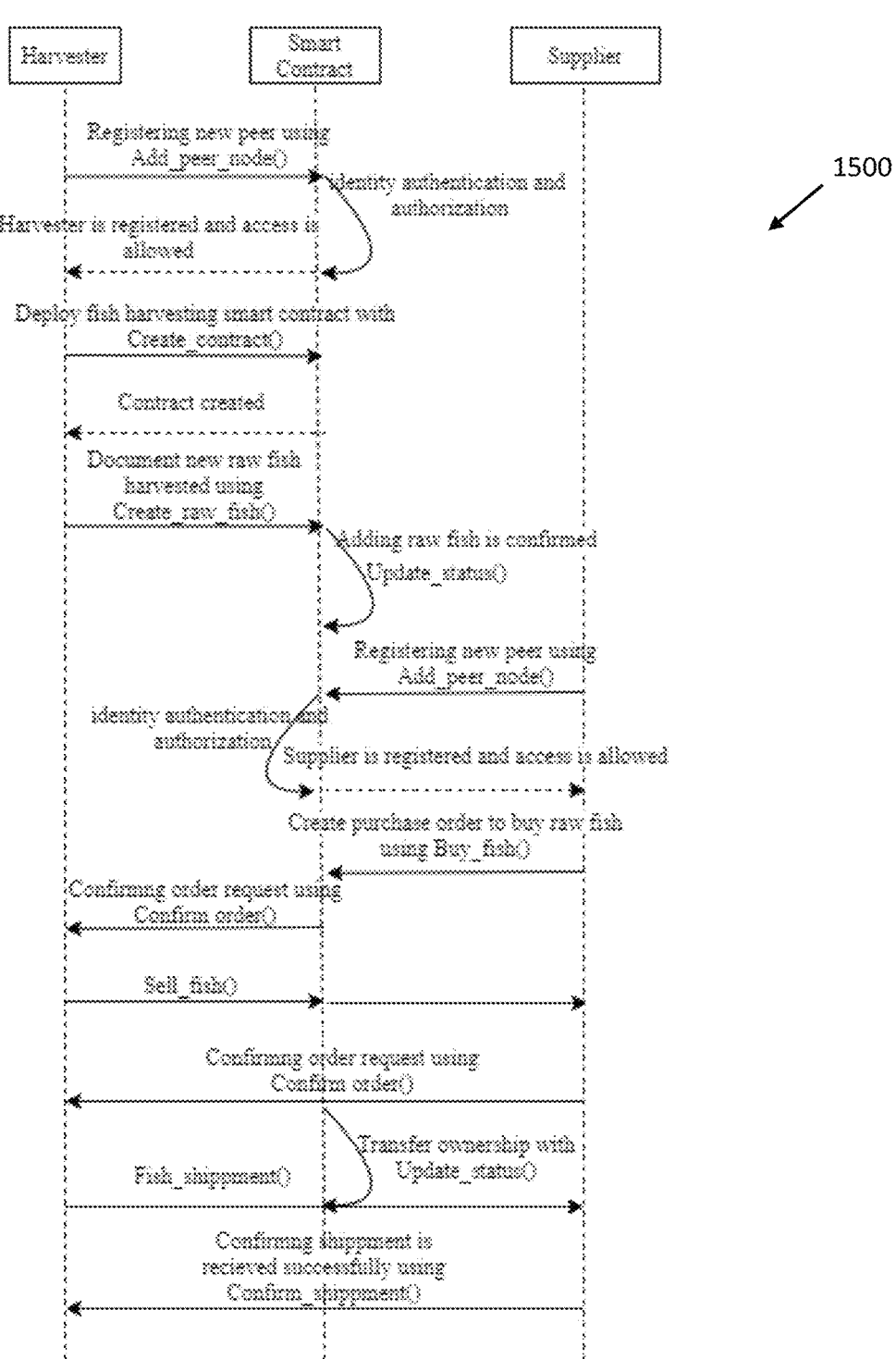
Figure 31:
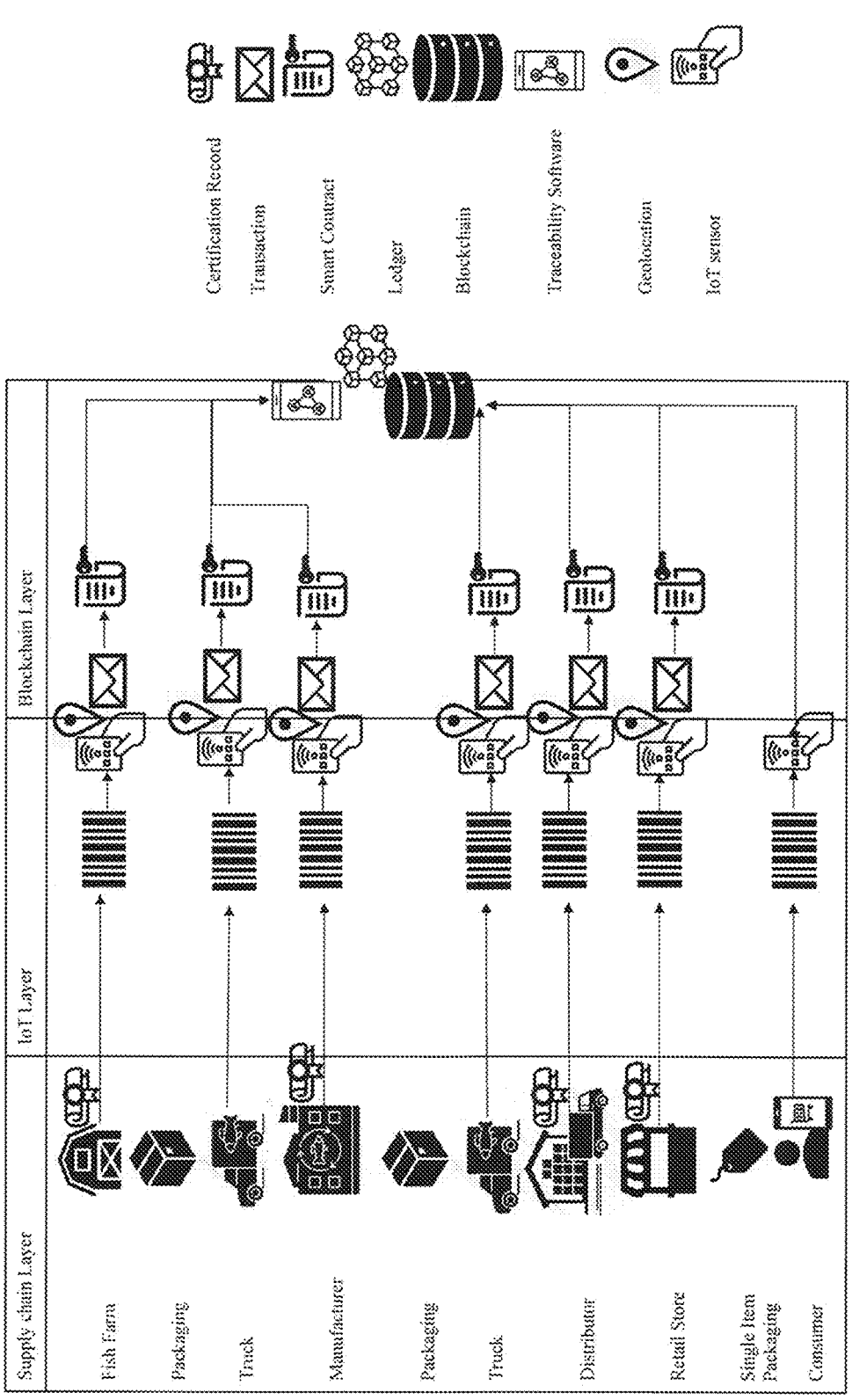
Figure 32:
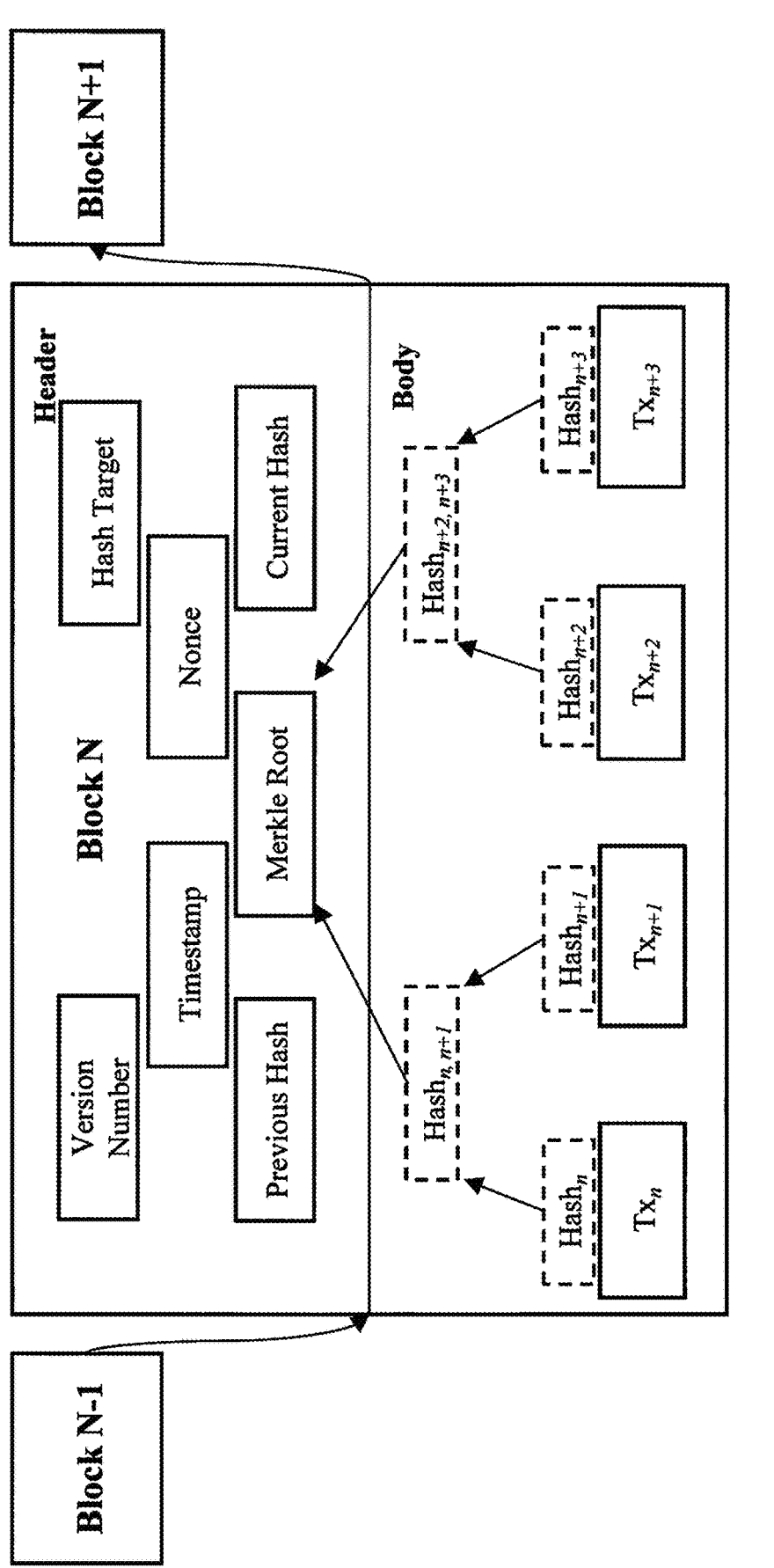
Figure 33:
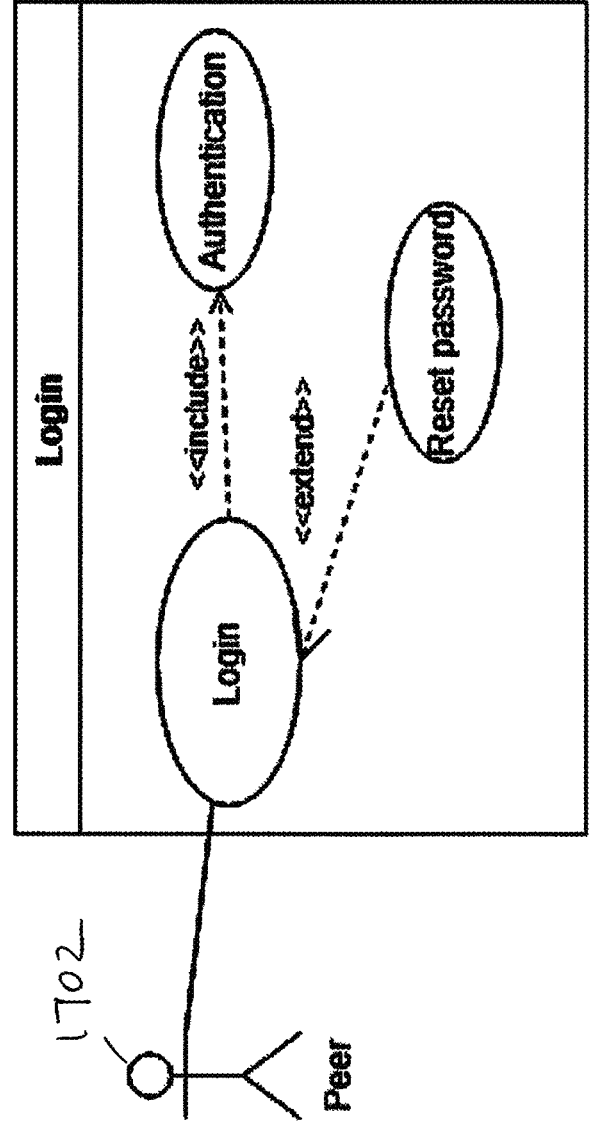
Figure 34:
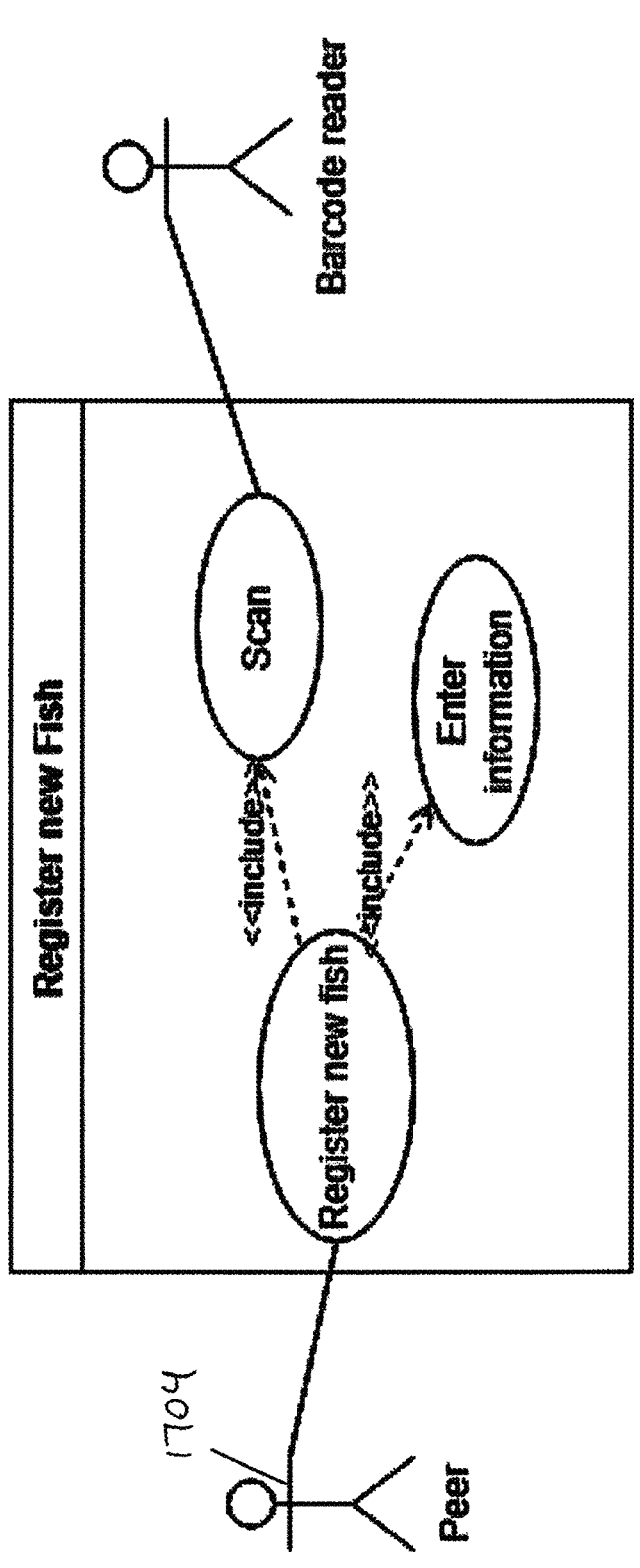
Figure 35:
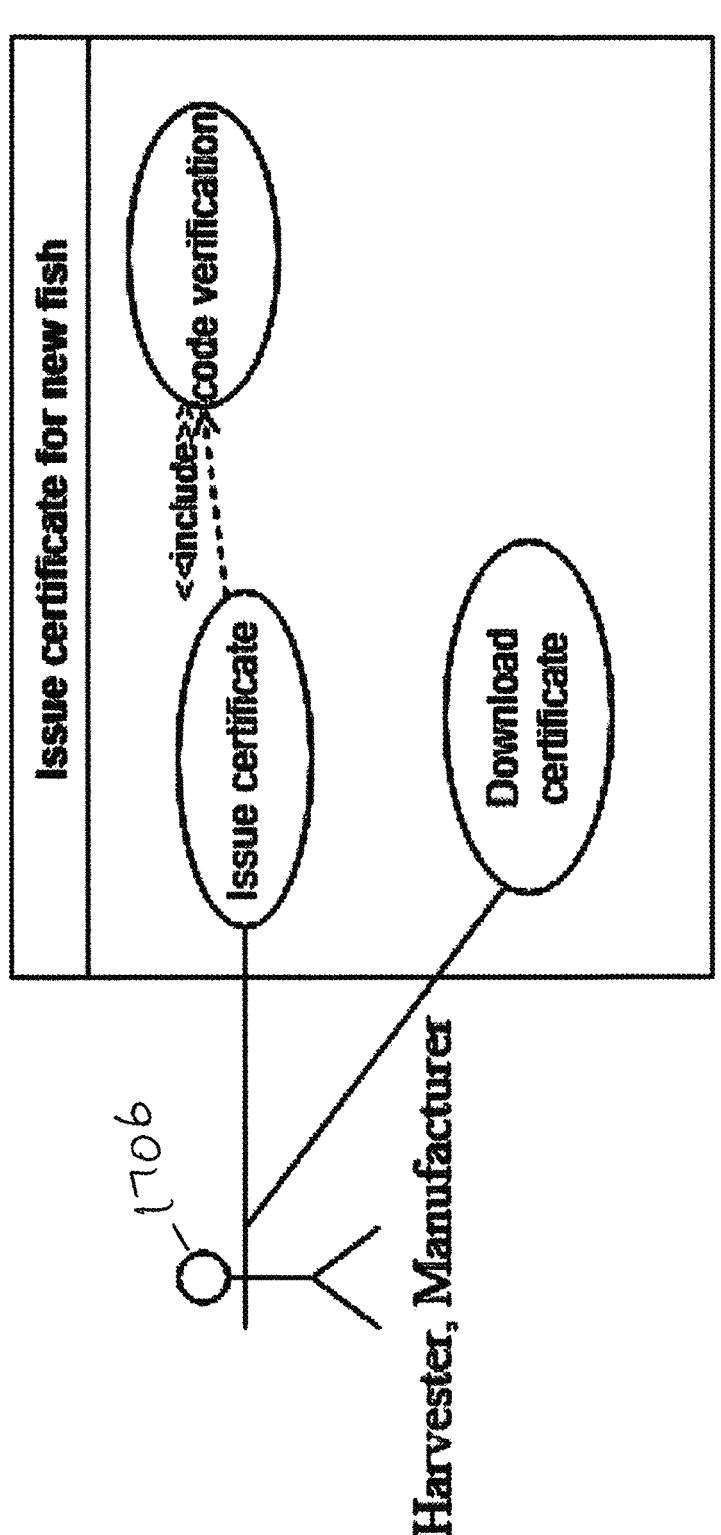
Figure 36:
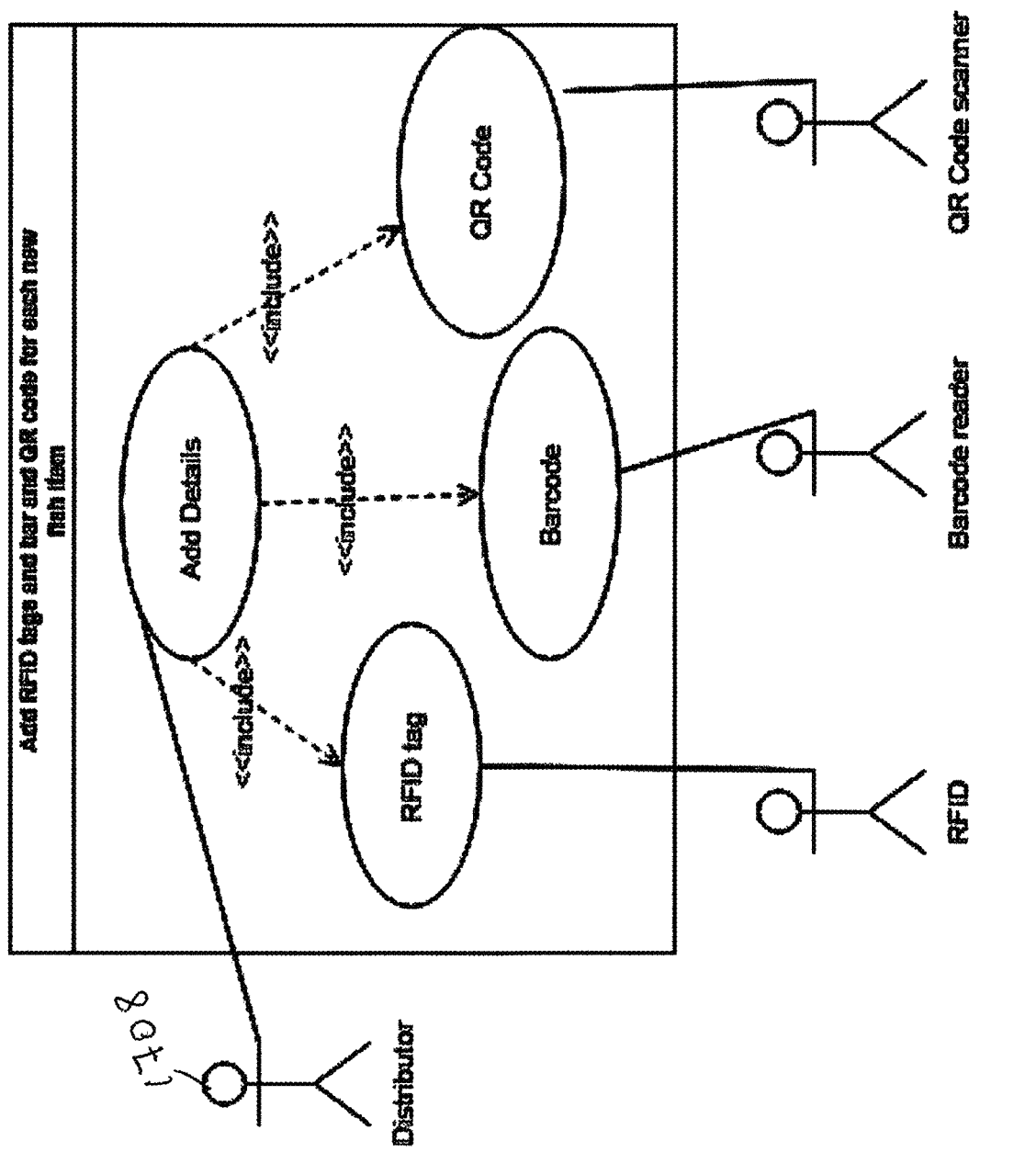
Figure 37:
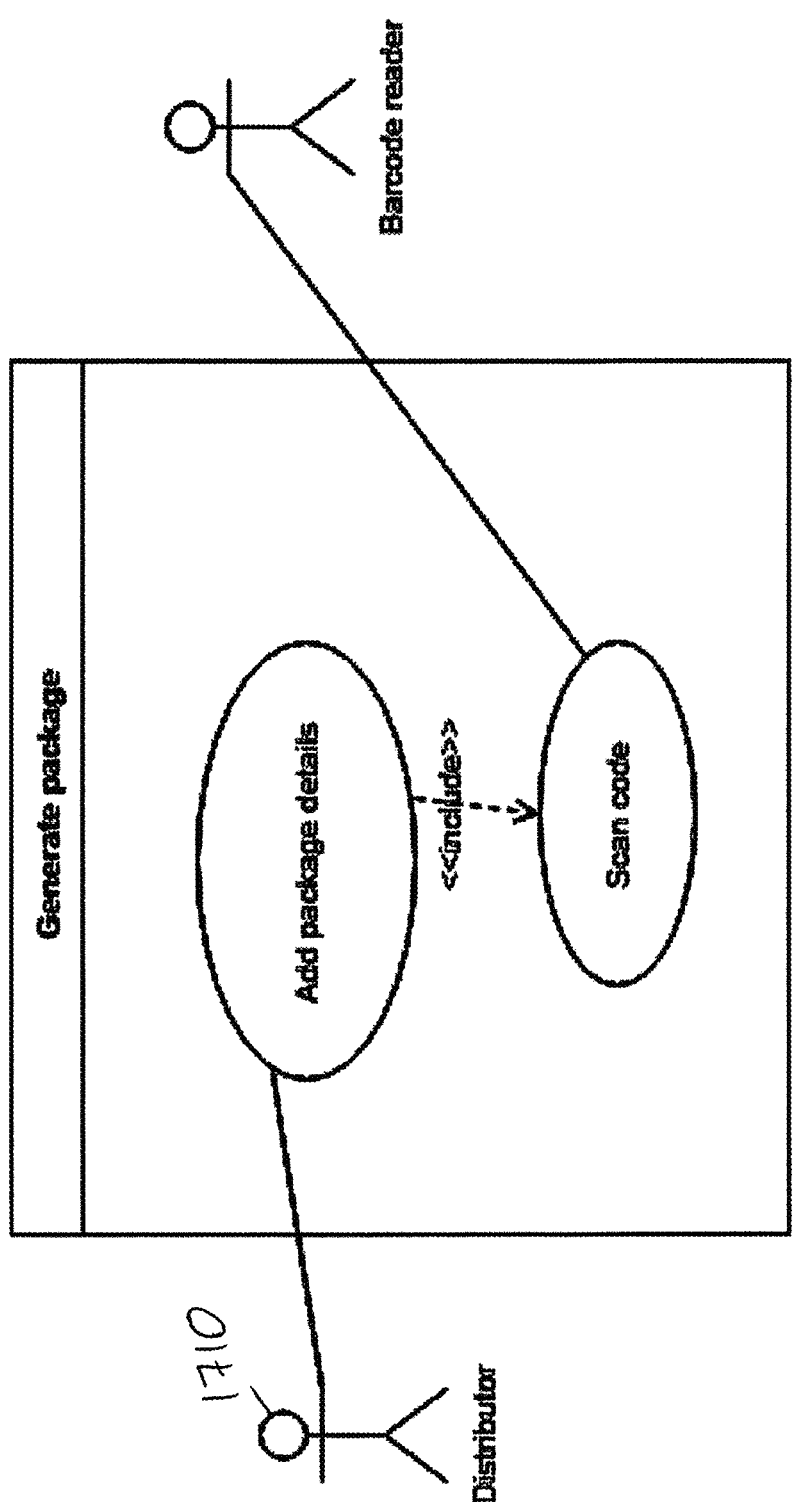
Figure 38:
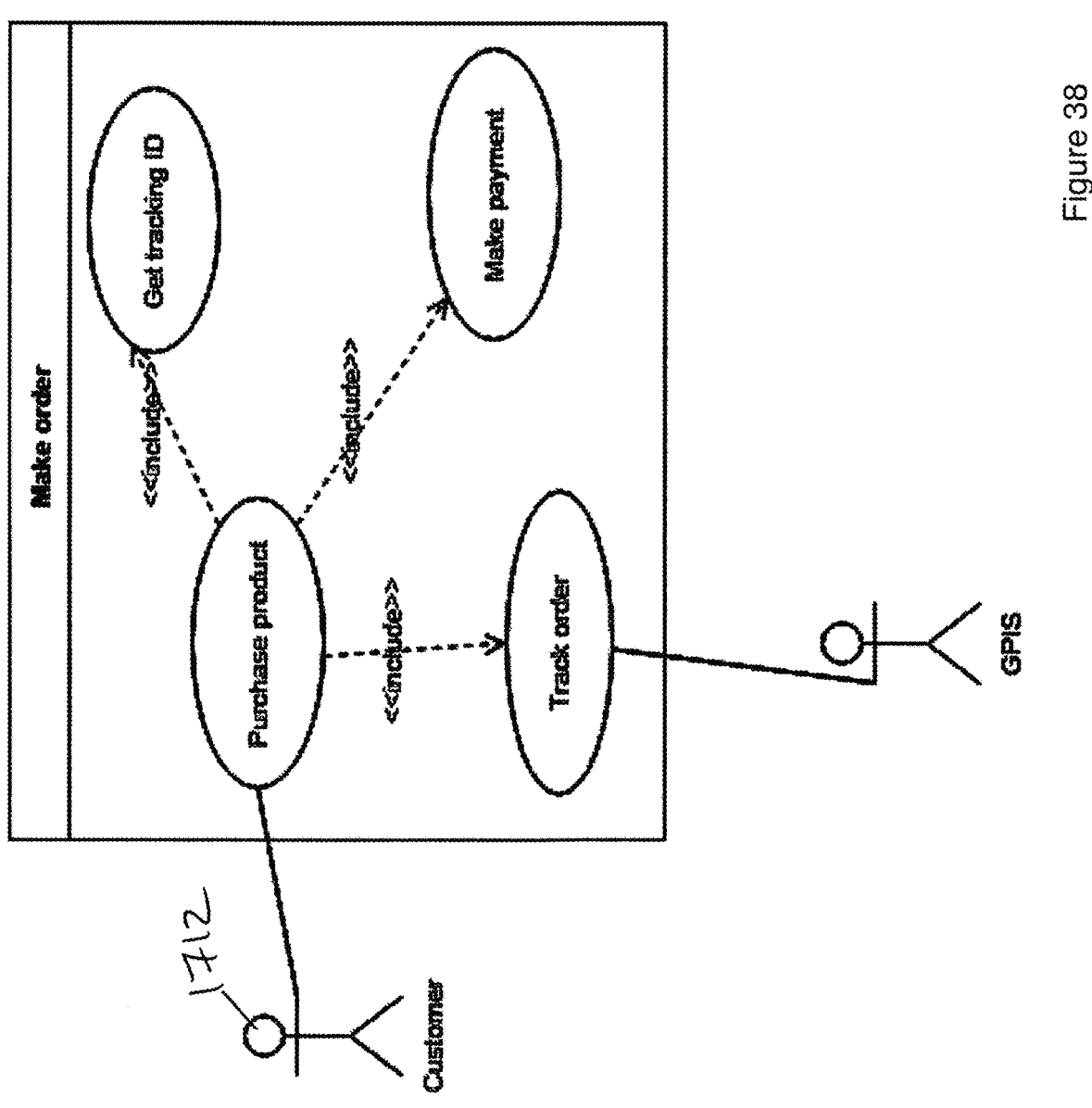
Figure 39:
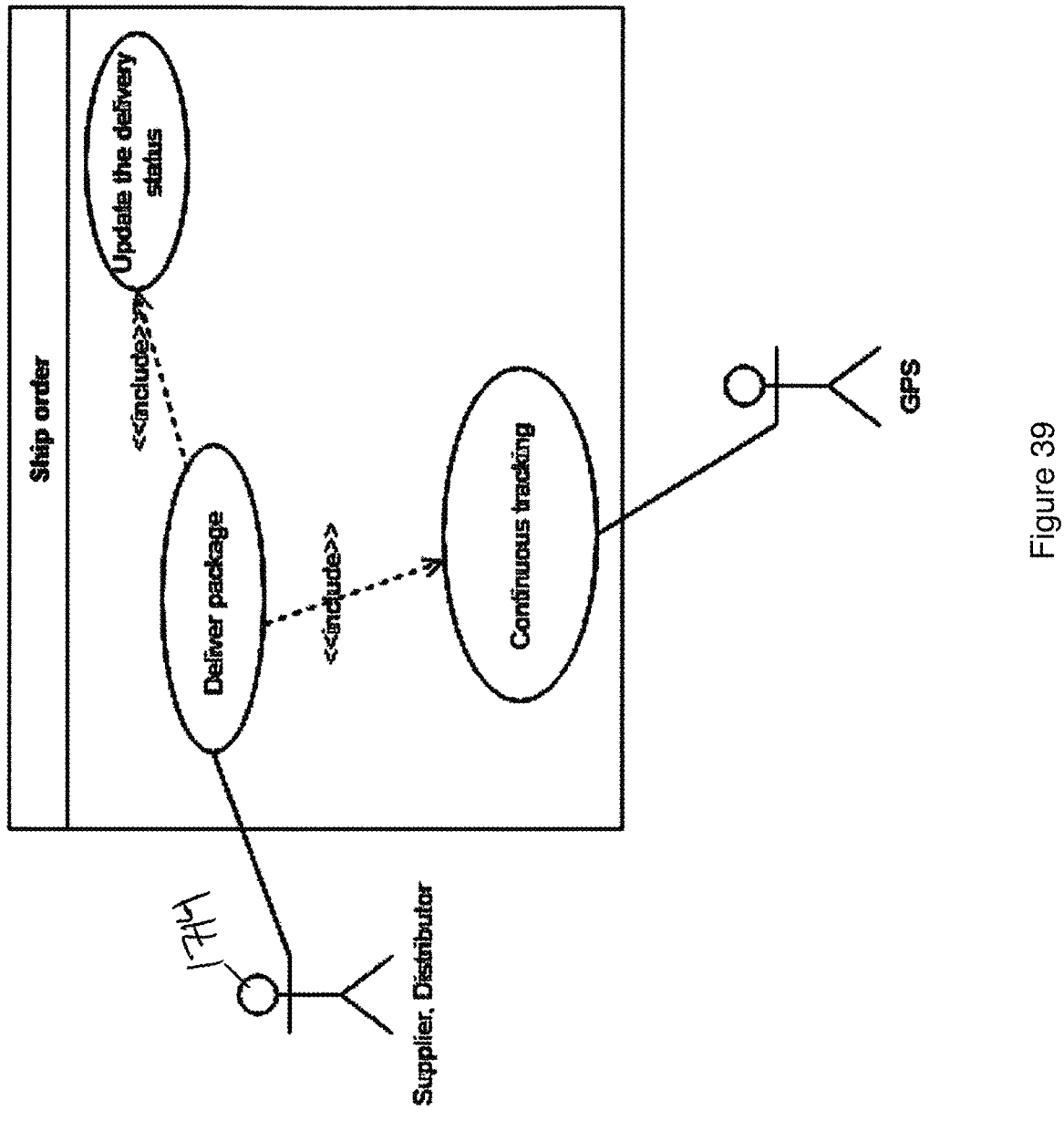
Figure 40:
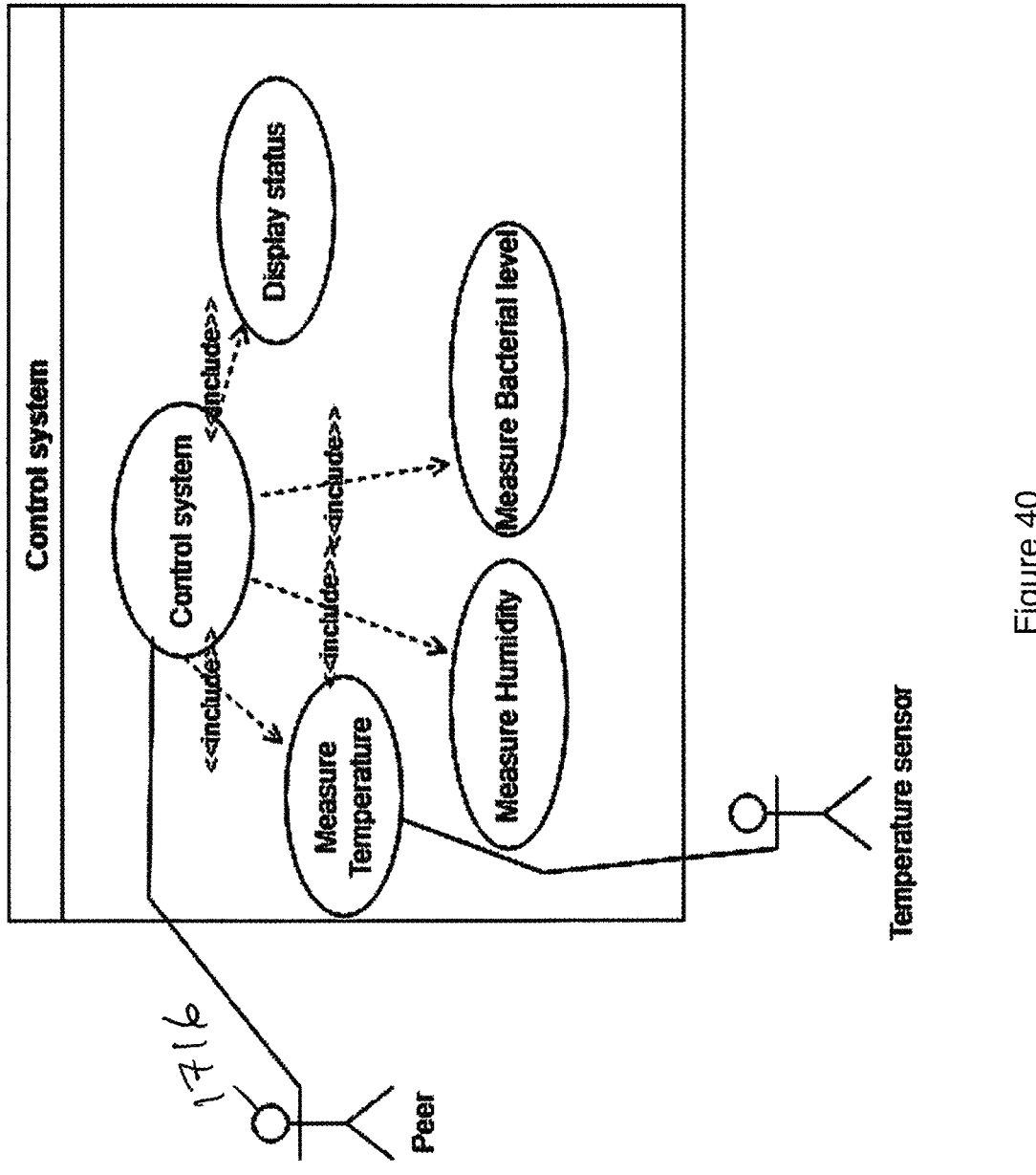
Figure 41:
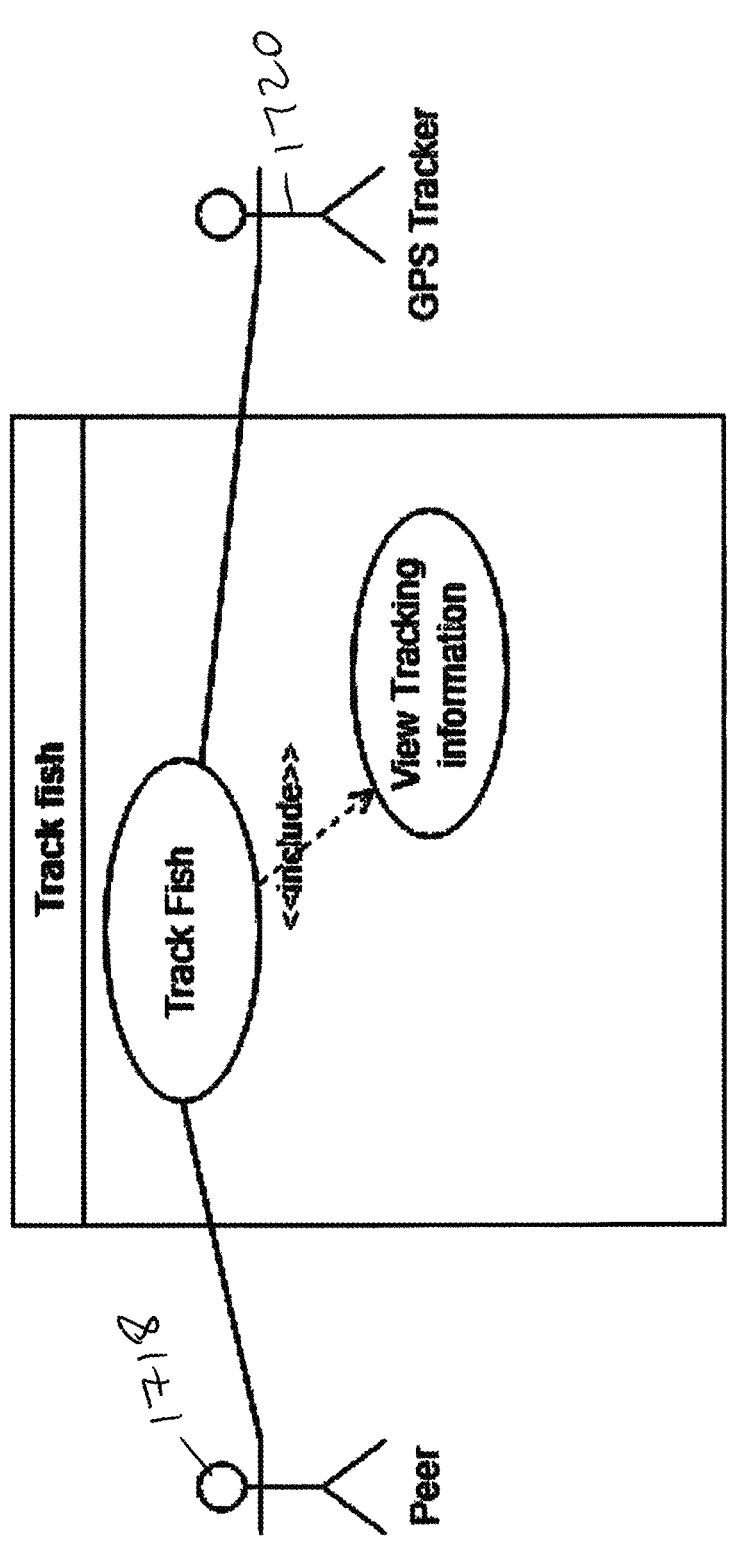
Figure 42:
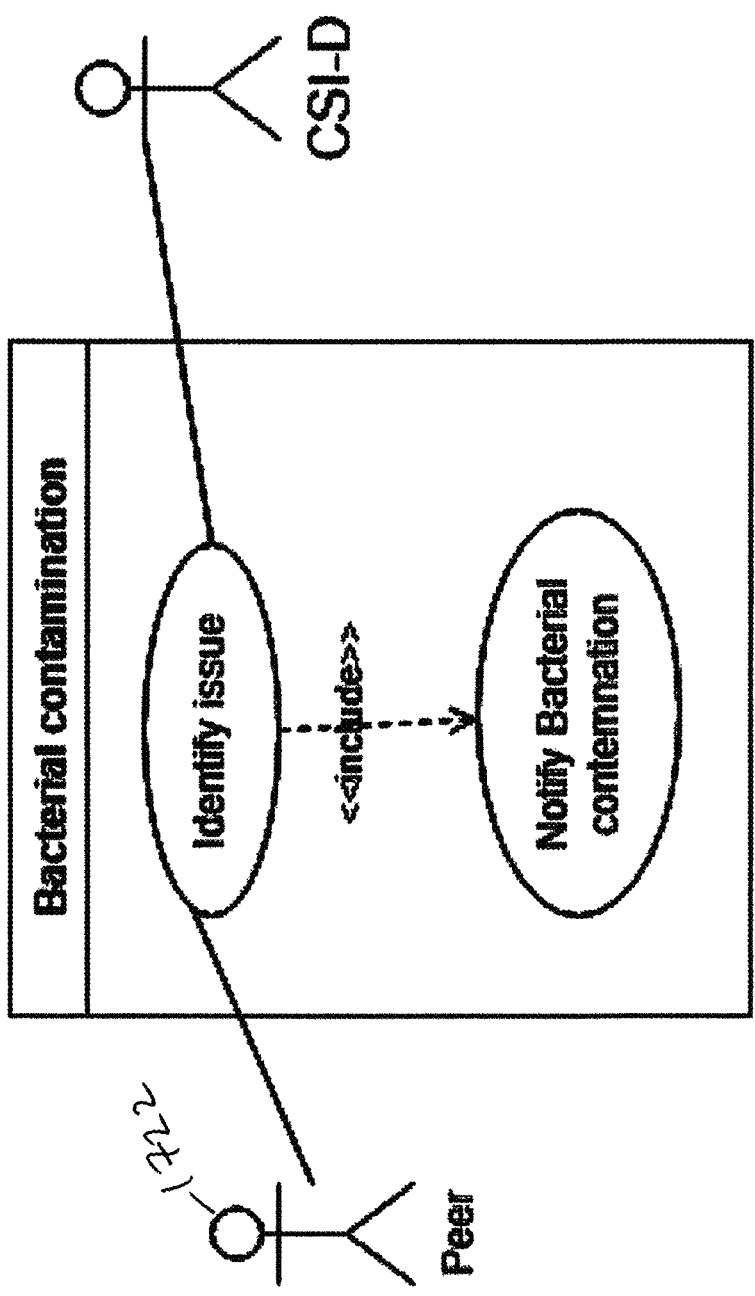
Figure 43:
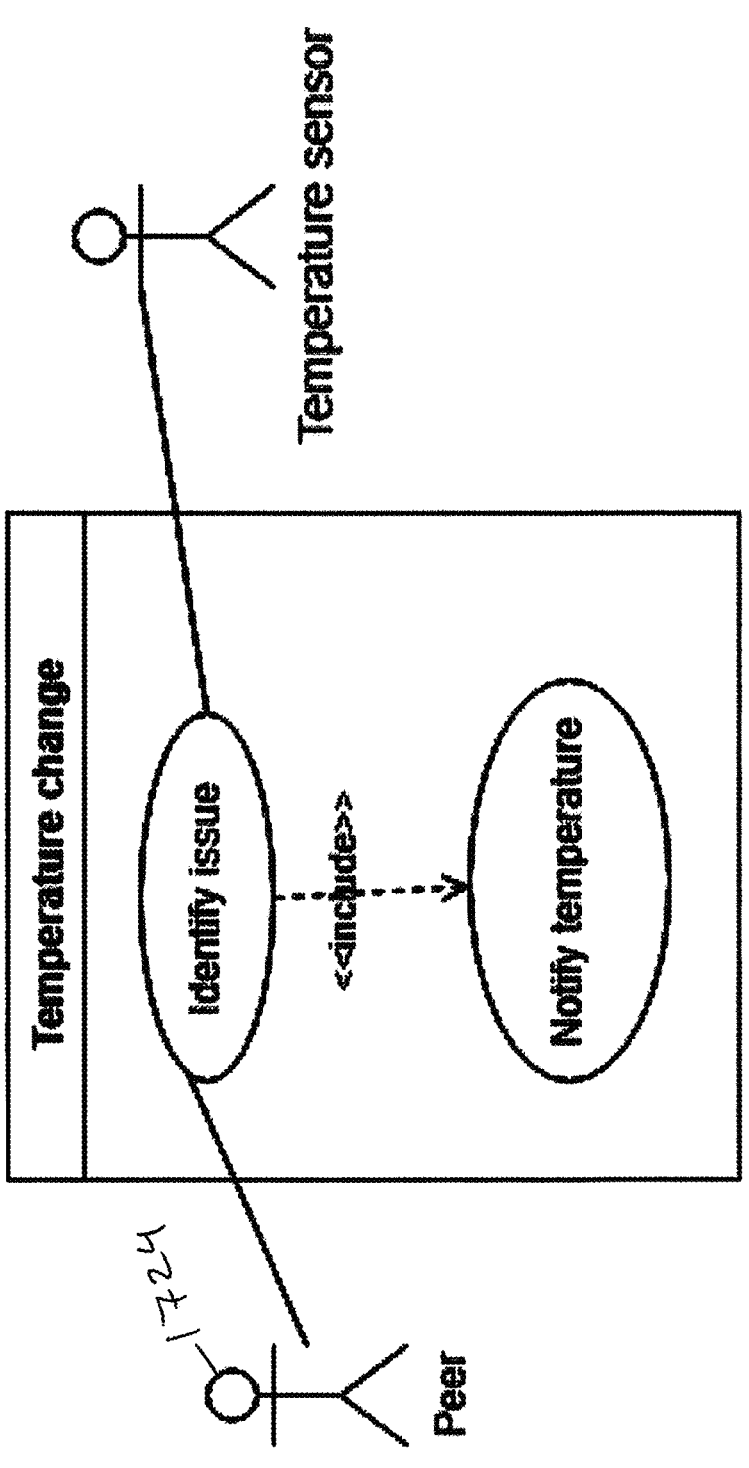
Figure 44:
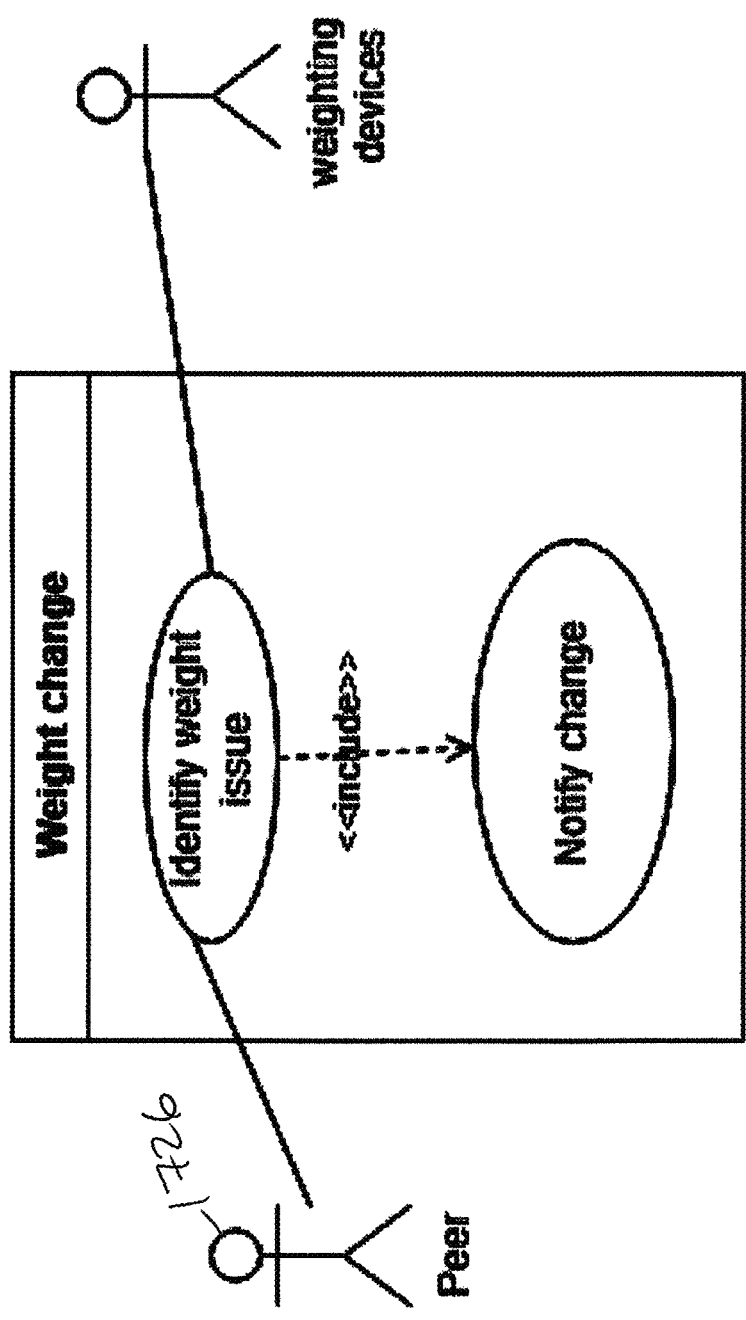

FIG. 20 depicts a system framework according to some embodiments presently disclosed;

FIG. 21 depicts a three-tier architecture according to some embodiments presently disclosed;

FIG. 22 depicts a tiers according to some embodiments presently disclosed;

FIG. 23 depicts a supply chain according to some embodiments presently disclosed;

FIG. 24 depicts an architecture according to some embodiments presently disclosed;

FIG. 25 depicts a distributed publish-subscribe architecture according to some embodiments presently disclosed;

FIG. 26 depicts a process according to some embodiments presently disclosed;

FIG. 27 depicts another process according to some embodiments presently disclosed;

FIG. 28 depicts a class diagram according to some embodiments presently disclosed;

FIG. 29 depicts a conceptual diagram according to some embodiments presently disclosed;

FIG. 30 depicts a sequence diagram according to some embodiments presently disclosed;

FIG. 31 depicts a system according to some embodiments presently disclosed;

FIG. 32 depicts a block structure according to some embodiments presently disclosed;

FIG. 33 depicts an embodiment of a system presently disclosed;

FIG. 34 depicts another embodiment of a system presently disclosed;

FIG. 35 depicts another embodiment of a system presently disclosed;

FIG. 36 depicts another embodiment of a system presently disclosed;

FIG. 37 depicts another embodiment of a system presently disclosed;

FIG. 38 depicts another embodiment of a system presently disclosed;

FIG. 39 depicts another embodiment of a system presently disclosed;

FIG. 40 depicts another embodiment of a system presently disclosed;

FIG. 41 depicts another embodiment of a system presently disclosed;

FIG. 42 depicts another embodiment of a system presently disclosed;

FIG. 43 depicts another embodiment of a system presently disclosed;

FIG. 44 depicts another embodiment of a system presently disclosed.

In the following description, like reference numbers are used to identify like elements. Furthermore, the drawings are intended to illustrate major features of exemplary embodiments in a diagrammatic manner. The drawings are not intended to depict every feature of every implementation nor relative dimensions of the depicted elements, and are not drawn to scale.

DETAILED DESCRIPTION

In the following description, numerous specific details are set forth to clearly describe various specific embodiments disclosed herein. One skilled in the art, however, will understand that the presently claimed invention may be practiced without all of the specific details discussed below. In other instances, well known features have not been described so as not to obscure the invention.

As described herein, the term "pivotally connected" shall be used to describe a situation wherein two or more identified objects are joined together in a manner that allows one or both of the objects to pivot, and/or rotate about or in relation to the other object in either a horizontal or vertical manner.

As described herein, the term "removably coupled" and derivatives thereof shall be used to describe a situation wherein two or more objects are joined together in a non-permanent manner so as to allow the same objects to be repeatedly joined and separated.

Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

In addition, it should be understood that embodiments of the invention include both hardware and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software. As such, it should be noted that a plurality of hardware and software-based devices, as well as a plurality of different structural components may be utilized to implement the invention. Furthermore, and as described in subsequent paragraphs, the specific mechanical configurations illustrated in the drawings are intended to exemplify embodiments of the invention and that other alternative mechanical configurations are possible.

Although some of the presently disclosed embodiments pertains to testing seafood related products, it is to be understood that presently disclosed embodiments may be applied to other products such as, for example, food related products, pharmaceutical related products, drug related products, meat (i.e. beef, lamb, pork, poultry), seafood (i.e. fish, shellfish, seaweed), construction related products, natural products, biological products, synthetic products, pharmaceutical related products, drug related products, and/or other consumer related products.

According to some embodiments, presently disclosed system and method use Quality, Adulteration and Traceability (QAT) system for management of products supply chains. For food related products, QAT provides species identification, ability to incorporate many species (unlike rapid DNA analysis), bypasses sample preparation, and reduces the time and cost of species identification. According to some embodiments, QAT uses multimode spectroscopy, combining reflectance and fluorescence-based spectral analysis and a fusion AI classification algorithm.

According to some embodiments, presently disclosed system and method can be used to track products such as food related products from harvest to market, add quality and freshness assessment with the same hardware platform.

By providing product data about product(s) and quality, presently disclosed system and method may be used to identify mislabelled product, and may be used to dynamically price perishable food related products at multiple purchase decision points—beyond traditional final-discounting by retailers.

According to some embodiments, presently disclosed system and method may be used, for example, 1) to provide rapid species identification; 2) to provide scalability to incorporate many species (unlike rapid DNA analysis which is limited to testing a single target species); 3) to bypass the need for sample preparation, and reducing the time and cost of species identification; 4) to work with cloud-based and/or blockchain food supply chain management; and/or 5) to asses quality in real time to enable dynamic pricing at multiple points along the seafood supply chain.

According to some embodiments, presently disclosed system and method may be used to optically detect established chemical signatures of products (such as, for example, seafood species) and quality by integrating several types of spectroscopic data through fusion-artificial intelligence (AI) algorithm into one or more reports. According to some embodiments, presently disclosed system and method may utilize a handheld device for onsite spot-checks of species-ID and quality across, for example, the seafood supply chain.

According to some embodiments, presently disclosed system and method generates a spectral database for one or more products. The one or more products are imaged using reference spectroscopic systems including visible and near infrared (VIS-NIR), Fluorescence, and short-wave infrared (SWIR) to determine spectral characteristics of the one or more products. The spectral characteristics may indicate species of the one or more products, quality and/or nutrient content of the one or more products. According to some embodiments, after one or more products are imaged, data (i.e. results) that are generated may be corrected for instrument response and/or ambient light. The data may also be normalized using, for example, a reference white target.

According to some embodiments, presently disclosed system and method may analyze data using for example, support vector machine (SVM) with a radial basis function, cubic support vector machine (SVM), weighted K-nearest neighbor (WKNN), linear discriminant (LD), and/or Gaussian Naïve Bayes (GNB).

The sensitivity (min, max)/specificity (min, max) ranges may be from VIS-NIR (7%, 100%)/(97%, 100%), Fluorescence (7%, 100%)/(97%, 100%), SWIR (0%, 97%)/(97%, 100%) to multimode data with (81%, 100%)/(99%, 100%).

According to some embodiments, presently disclosed system and method may utilize Deep Learning methods (e.g. Long Short-Term Memory neural network and Reinforcement learning) combined with a weighting score optimization in the fusion classifier. Long short-term memory (LSTM) is an artificial recurrent neural network (RNN) architecture used in the field of deep learning.

According to some embodiments, presently disclosed system and method may use VIS-NIR and SWIR spectroscopic system with integrated light source, Raspberry Pi computer, and fiber sampling head with reflective optics. The entire spectral range may be simultaneously measured by two spectrometers (UVVIS with a spectral range from 250 nm to 1050 nm with spectral resolution<8 nm FWHM and NIR from 900 nm to 1700 nm with spectral resolution<16 nm FWHM).

According to some embodiments, presently disclosed system and method may use a fluorescence spectroscopy system with excitation filter wavelength at 380 nm, variable excitation power up to 2 W, integrated QR Code reader, rechargeable Li-Ion battery, and/or Capacitive Touch Display.

Hyperspectral band selection is the process of selecting an optimal set of narrow wavelength bands from a large number over a broad range, typically for one of two purposes: hyperspectral reconstruction or classification. The former seeks to condense the information content of the full resolution spectrum so that the spectrum may be reconstructed from a relatively small subset of wavelength bands. The latter seeks to enable classification based on features contained within this small subset.

According to some embodiments, presently disclosed system and method provides self-organizing map weight plane distance (SOM WPD) method for automated band selection based on analysis of the weight planes from a trained self-organizing map.

According to some embodiments, presently disclosed system and method may generate a detailed spectrum at each pixel in the image, thus achieving high resolution in both the spatial and spectral dimensions. By exploiting the unique spectral characteristics of different materials, presently disclosed system provides the capability to identify and distinguish materials spatially in imagery.

Self-organizing maps (SOMs) identify a nonlinear transformation from high to low dimensional space such that the separation between points in the lower dimension is representative of the relative dissimilarity between their higher dimensional counterparts. The Feature Competitive Algorithm (FCA) is a general feature selection method that works by identifying those features in the original high dimensional space that align best with the trained "reference vectors" of the SOM. The Subspace Clustering Based on SOM (SCBSOM) method applies a one-dimensional clustering in each dimension based on the weight connections in the learned SOM followed by a merging process. Heuristic Input for SOM (HI-SOM) similarly applies clustering in the trained SOM for feature selection.

According to some embodiments, presently disclosed system and method uses hyperspectral band selection method based on the exploitation of the relationships between weights in the trained SOM's reference vectors. The mean distance between pairs of "weight planes" (i.e., a high dimensional plane formed by the weights from all trained reference vectors corresponding to the same input band) is used as a measure of the nonlinear correlation between the bands. This measure as the Weight Plan Distance (WPD). This method may be applied to a food fraud application where hyperspectral imaging is used to determine the correct species of, for example, fish fillets.

Developed by Teuvo Kohonen in 1982, the SOM is a type of two-layer artificial neural network that produces a low-dimensional (typically 2D) representation of vectors in a high-dimensional input feature space. It does this by applying unsupervised competitive learning to move the network's weights closer to the input vector. For each input vector, the Euclidian distance between this vector and the weight vectors (called "reference vectors") for all output neurons is calculated. The neuron with the smallest distance is declared the "best matching unit" (BMU), and the reference vectors for all neurons within a neighborhood of the BMU are updated. This "neighborhood" is defined with a neighborhood function, $h_{ci}(t)$, where the c subscript refers to the index of the BMU and the i subscript refers to the $i^{th}$ neuron[24]. The updated weight for the $i^{th}$ reference vector is then given by formula (1) below.

$$w_i(t+1) = w_i(t) + \alpha \cdot h_{ci}(t) \cdot [x(t) - w_i(t)] \tag{1}$$

Figure 1A:
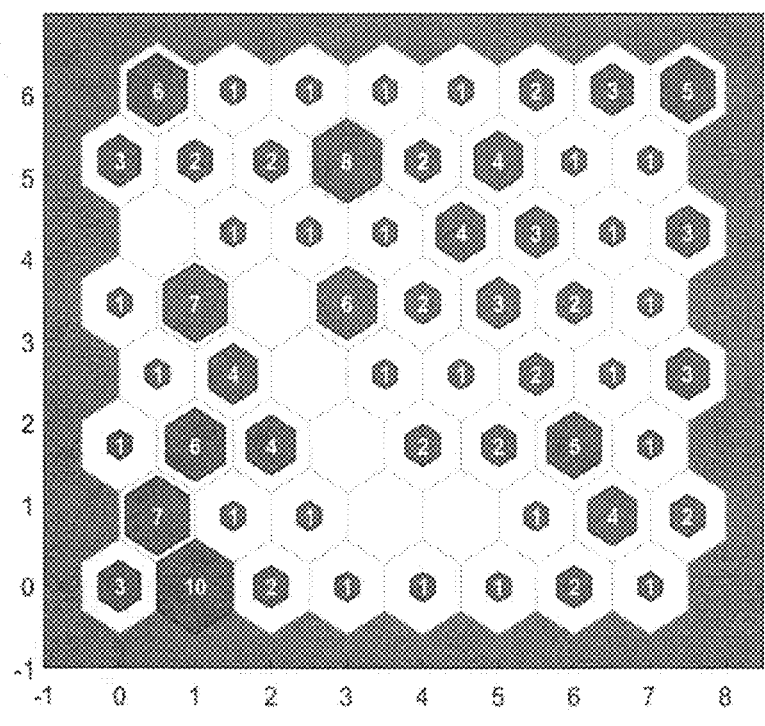
FIG. 1a depicts a plot of the number of input vectors mapped to each neuron according to some embodiments presently disclosed.
Figure 1B:
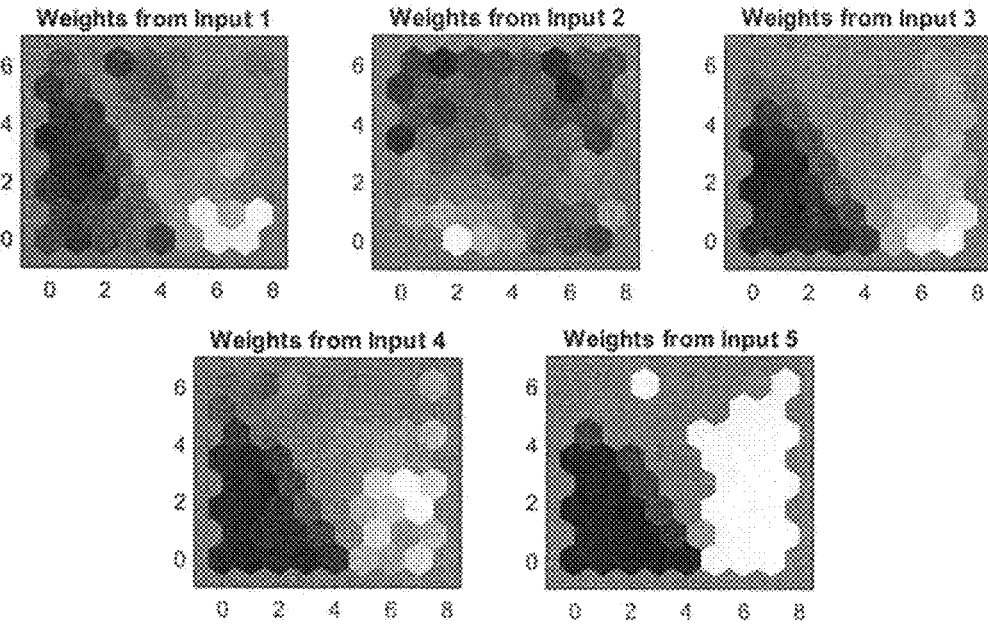
FIG. 1b depicts plots of weight values for each input weight plane according to some embodiments presently disclosed.

FIGS. 1a-b depict the results of training an 8×8 SOM on Fisher's iris dataset. The output layer neurons may be arranged in a hexagonal pattern. FIG. 1a shows a plot of the number of input vectors that are mapped to each output layer neuron. FIG. 1b shows plots of the reference vector weight values at each output neuron for each input weight, with darker colors representing larger values. The collection of weight values for each input may be referred to as a "component plane" or "weight plane".

The weight plane distances (WPD) may be computed by calculating the squared difference between the value of a node in one weight plane and the corresponding node in another weight plane. This calculation may be repeated for all nodes, and the squared differences are then averaged to yield the WPD between these two weight planes. The complete set of WPDs may be computed by calculating the WPD between each pair of weight planes. This WPD set would yield a symmetric N×N matrix, where N is the number of nodes in the SOM.

According to some embodiments, presently disclosed system and method provide a means of band selection based on minimization of redundancy, and it also provides a measure of importance for exact band selection. For example, a tall but broad peak in the WPD matrix suggests that selecting any pair of bands in the vicinity of the true local optimum and still achieve a near-maximum degree of non-redundancy. This could be particularly beneficial in designing a sparse hyperspectral imaging system where the collection of imagery at certain wavelengths may be easier to engineer than at others.

To select features using the WPD matrix, presently disclosed system and method may find local peaks along each row of the WPD matrix. The WPD values at these peak locations are saved in an intermediate matrix while the values at other locations are zeroed. Similar process may be applied along each column of this intermediate matrix to identify the final WPD peaks. A two-stage process may be applied to better eliminate the false peaks that can appear when using 2D peak finder algorithms.

The bands selected the SOM-based method may be used as features to train one or more machine learning classifiers-linear discriminant, quadratic support vector machine (SVM), weighted k-nearest neighbors (WKNN), and/or subspace discriminant (an ensemble method which applies linear discriminants to random subsets of features). One or more of these classifiers may be used to classify the correct species of food product such as, for example, fish fillet based on information from one pixel's visible/near-infrared (VNIR) reflectance or fluorescence spectrum. This classification may be repeated for numbers of selected wavelengths, k=3, 4, and 5, and a 5-fold cross-validation may be conducted as a robust estimation of classification accuracy.

Figure 2:
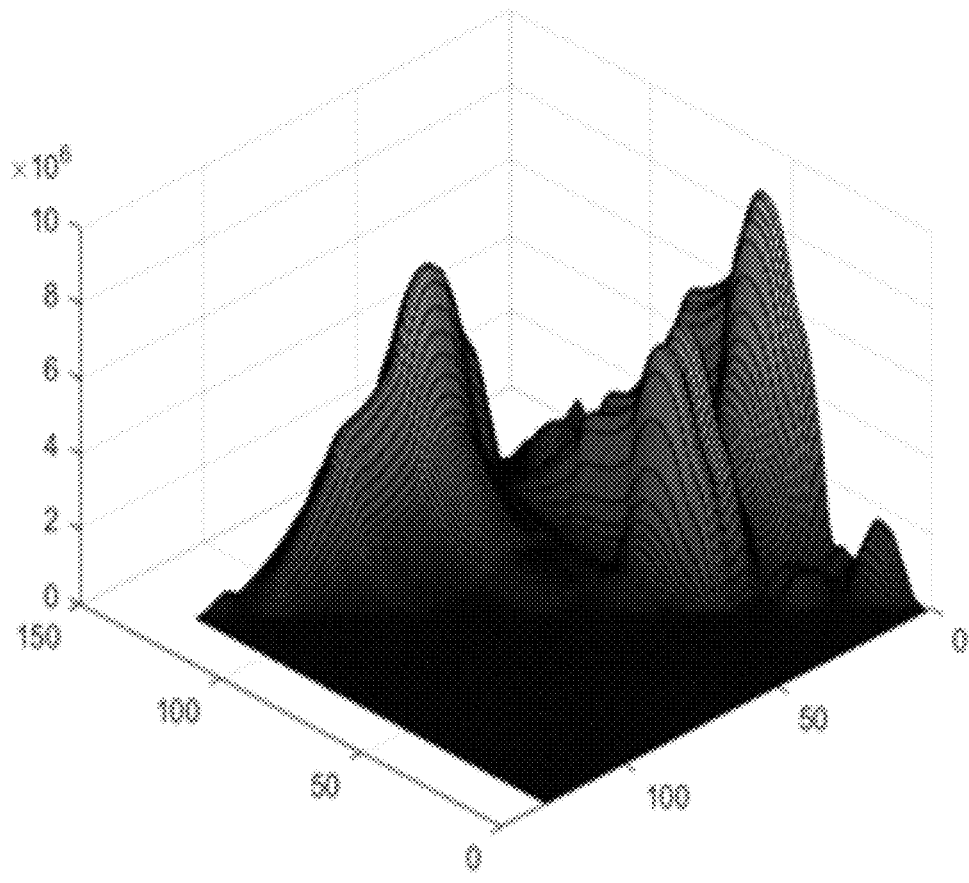
FIG. 2 depicts surface plot of weight plane distance (WPD) from visible and near-infrared (VNIR) data according to some embodiments presently disclosed.

Feature ranking may be conducted using the WPD values at the selected peaks. For example, the two features corresponding to the tallest peak in FIG. 2 (i.e., the two features with the largest WPD) may be assigned ranks one and two. The two features corresponding to the next tallest peaks may be assigned ranks three and four, and so on.

Figure 3:
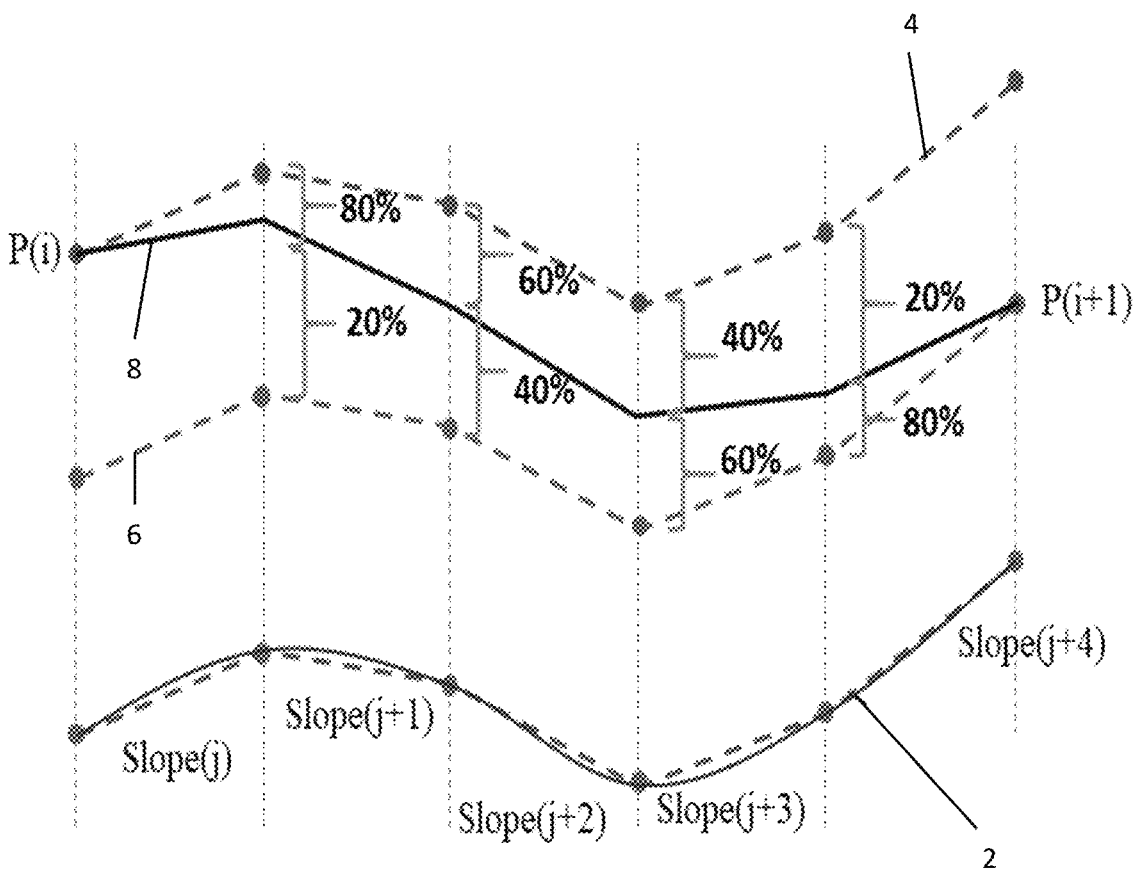
FIG. 3 depicts spectral reconstruction algorithm according to some embodiments presently disclosed.

According to some embodiments, presently disclosed system and method may use a spectral reconstruction algorithm based on samples taken at a small number of wavelength bands, k, within the relevant spectral range and a full-resolution spectral average taken over the entire scene. The scene is a homogenous region of the sample being analyzed (no background regions). This spectral average is referred to as the "reference spectrum" and may be used to estimate the reflectance/fluorescence values at the missing N–k wavelengths. This interpolation may be conducted in a piecewise linear manner by fixing the values at the sampled wavelength band centers and using the point-to-point slopes from the corresponding region of the reference spectrum to estimate values at wavelengths in between in both the forward (i.e., increasing wavelengths) and backward directions. A weighted average of the corresponding points from these spectrum estimates yields the resulting reconstruction. This process may be repeated for every pair of successive sampled bands until the entire spectral range has been covered. Values below the lowest selected wavelength band and above the highest are estimated using a single backward or forward projection, respectively. FIG. 3 depicts spectrum values sampled at bands indicated by points P(i) and P(i+1). Point-to-point slopes at full resolution may be calculated from the reference spectrum line 2 and used to calculate a forward estimation line 4 anchored at P(i) and a backward estimation line 6 anchored at P(i+1). The final full resolution estimate line 8 may be determined by taking weighted averages of the forward line 4 and backward line 6 estimates.

Formula (2) below may be used to solve optimization problem.

$$\text{Minimize } f(x_k) = \sum_{j=1}^{N} (S(j) - P_{interp}(j))^2: \tag{2}$$

$$\text{Subject to: } \|x_k\|_n = k$$

$$1 \leq x_k(l) \leq N \ \forall \ l \in 1, 2, \dots, k$$

$$x_k(l) \in \mathbb{Z}$$

Thus, it may be possible to find the k wavelength bands that minimize the sum of squared errors from the spectral reconstruction over the full-resolution spectral range. The first constraint in Formula (2) restricts the number of wavelength samples to no more than k. The second constraint in Formula (2) restricts the indices of the sampled wavelengths (which form the vector x) to fall within the bounds of the indices of the full-resolution spectrum (i.e., 1 and N). The third constraint in Formula (2) ensures that this vector is integer valued.

To improve the genetic algorithm's probability of finding the global minimum, presently disclosed system and method may use chromosome resulting from the k=m−1 iteration to inform the starting point for the k=m iteration (with the mth wavelength selected at random) and followed the genetic algorithm with a Generalized Pattern Search (GPS). The GPS algorithm creates a mesh centered on the starting point, defined by a set of direction vectors and a scalar mesh size. At each iteration, the objective function may be evaluated at each of the new points until one is found that produces a value less than the current minimum value. This new point may be selected as the new starting point, and the search continues with the same (or larger) mesh size. If none of the points produces a lower objective function value, then the mesh size may be reduced, and the process continues until the mesh size reaches a minimum threshold. In this manner, the GPS algorithm can help push the genetic algorithm solution out of a local optimum and move it to the global optimum (assuming these points are in the same vicinity).

According to some embodiments, presently disclosed system and method were used to create a database consisting of VNIR reflectance and fluorescence spectra collected from 14 fish fillets of six different species (six red snappers, four Malabar snappers, one vermillion snapper, one summer flounder, one blue tilapia, and one white bass). Each fillet was placed in a 150×100×25 mm³ sample holder created with, for example, a 3D printer using production-grade black thermoplastic. Image acquisition used the pushbroom method whereby a linear motorized translation stage was used to move the sample holder incrementally across the scanning line of the imaging spectrograph. The length of the instantaneous field of view (IFOV) was made slightly longer than the length of the sample holder (150 mm) by adjusting the lens-to-sample distance. The resulting spatial resolution along this dimension was determined as 0.4 mm/pixel. Each fillet was sampled along the width direction (100 mm) of the holder with a step size of 0.4 mm to match the spatial resolution of the length direction.

Flat-field corrections may be applied to the VNIR reflectance images and the fluorescence images to convert original absolute intensities in CCD counts to relative reflectance and fluorescence intensities. An initial spatial mask may be created for each imaging mode to separate the fish fillets from the background. Outliers may be handled using data quality strategies such as, for example, by first calculating the mean (μ) and standard deviation (σ) of the fish pixel intensities over the entire fillet. According to some embodiments, presently disclosed system and method used 10×10-pixel region "blocks" to mimic independent fish fillet spectral point measurements using the field of view of a fiber optic spectrometer. According to some embodiments, presently disclosed system and method used, for example, an exclusion criterion where if ≥10% of the constituent pixels in a block exceeded μ±2σ to eliminate outliers. This approach produced a final set of spatial masks, one each for the reflectance and fluorescence images, that determined the blocks for analysis. Table 1 lists the number of valid blocks for each fillet and each collection mode.

TABLE 1

| Fillet | Collection Mode | Number of Fillets | Number of Valid Blocks |
|---|---|---|---|
| Red Snapper | VNIR | 6 | 2,401 |
| Malabar Snapper | VNIR | 4 | 1,599 |
| Vermillion Snapper | VNIR | 1 | 283 |
| Summer Flounder | VNIR | 1 | 316 |
| Blue Tilapia | VNIR | 1 | 250 |
| White Bass | VNIR | 1 | 280 |
| Red Snapper | Fluorescence | 6 | 2,423 |
| Malabar Snapper | Fluorescence | 4 | 1,517 |
| Vermillion Snapper | Fluorescence | 1 | 504 |
| Summer Flounder | Fluorescence | 1 | 516 |
| Blue Tilapia | Fluorescence | 1 | 345 |
| White Bass | Fluorescence | 1 | 387 |

Figure 4A:
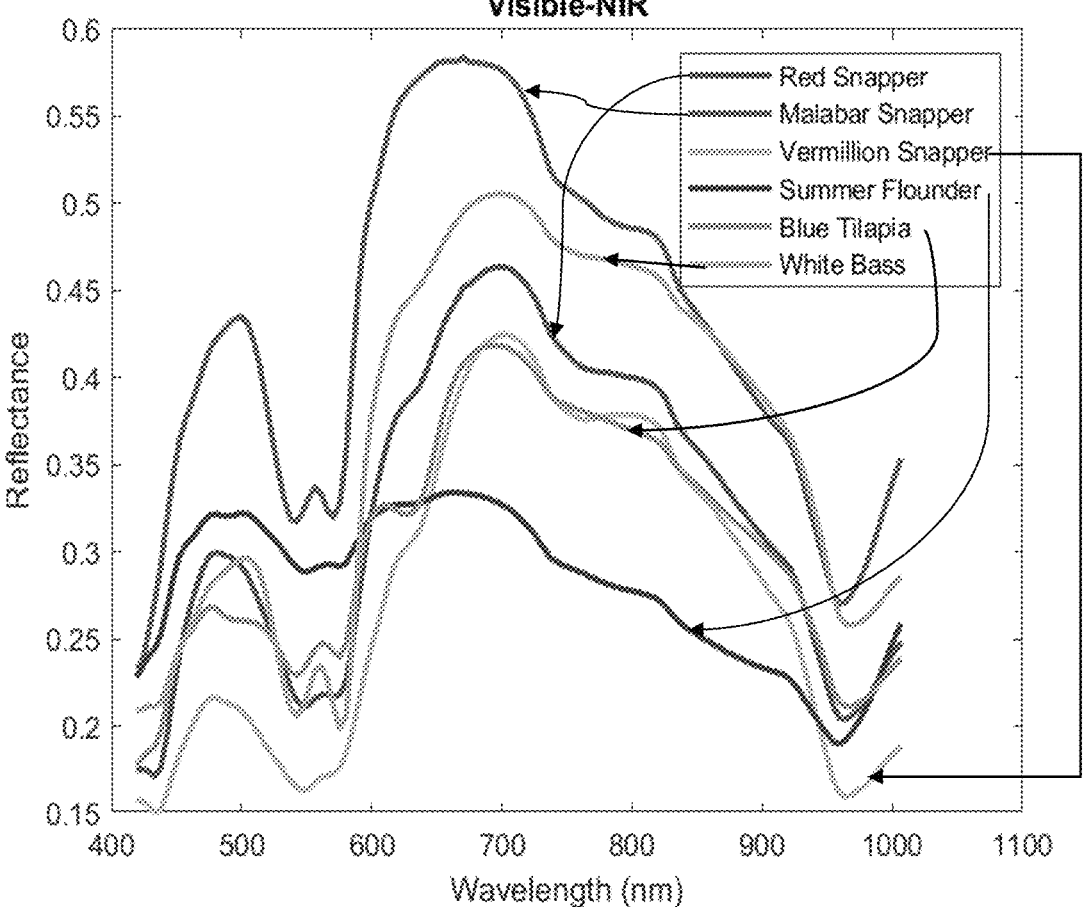
FIG. 4a depicts reflectance data for each of six fish according to some embodiments presently disclosed.
Figure 4B:
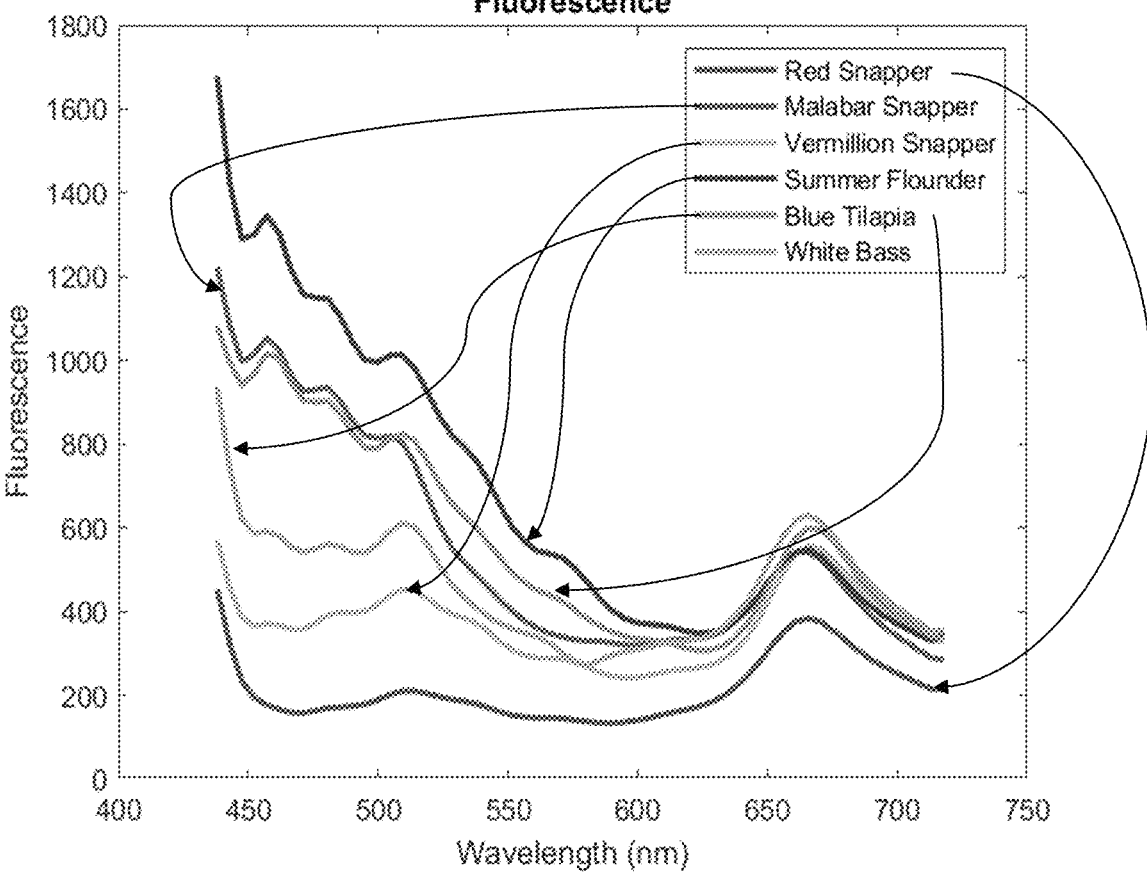
FIG. 4b depicts fluorescence spectra data for each of six fish according to some embodiments presently disclosed.
Figure 5A:
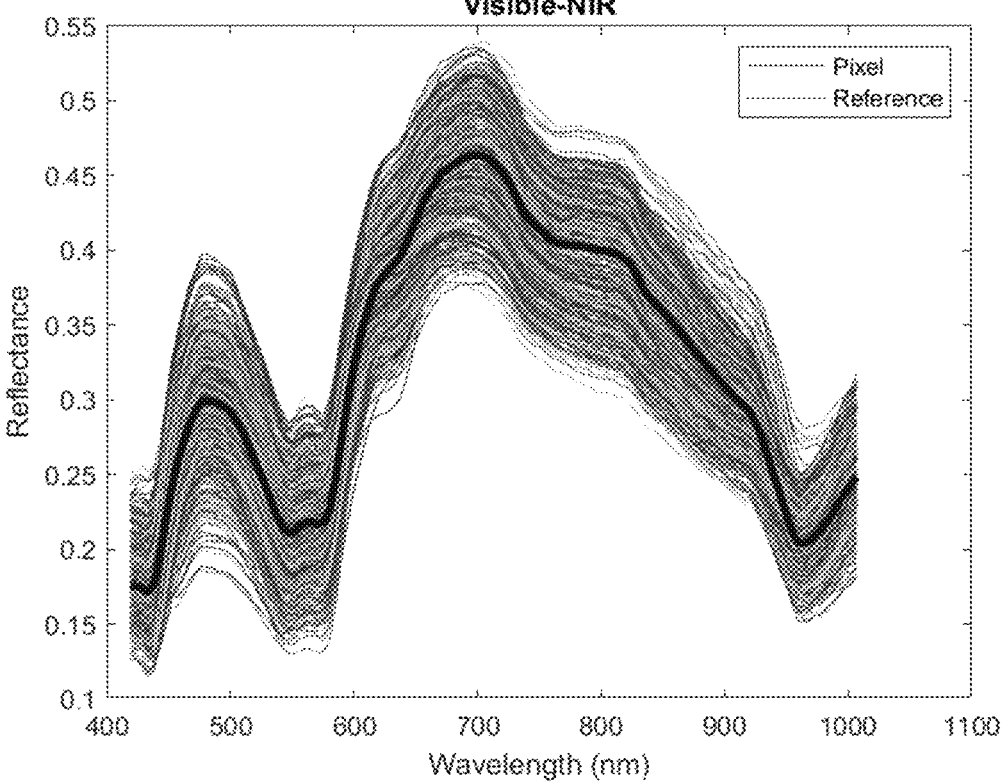
FIG. 5a depicts reflectance data for each pixel of one of the red snapper fillets according to some embodiments presently disclosed.
Figure 5B:
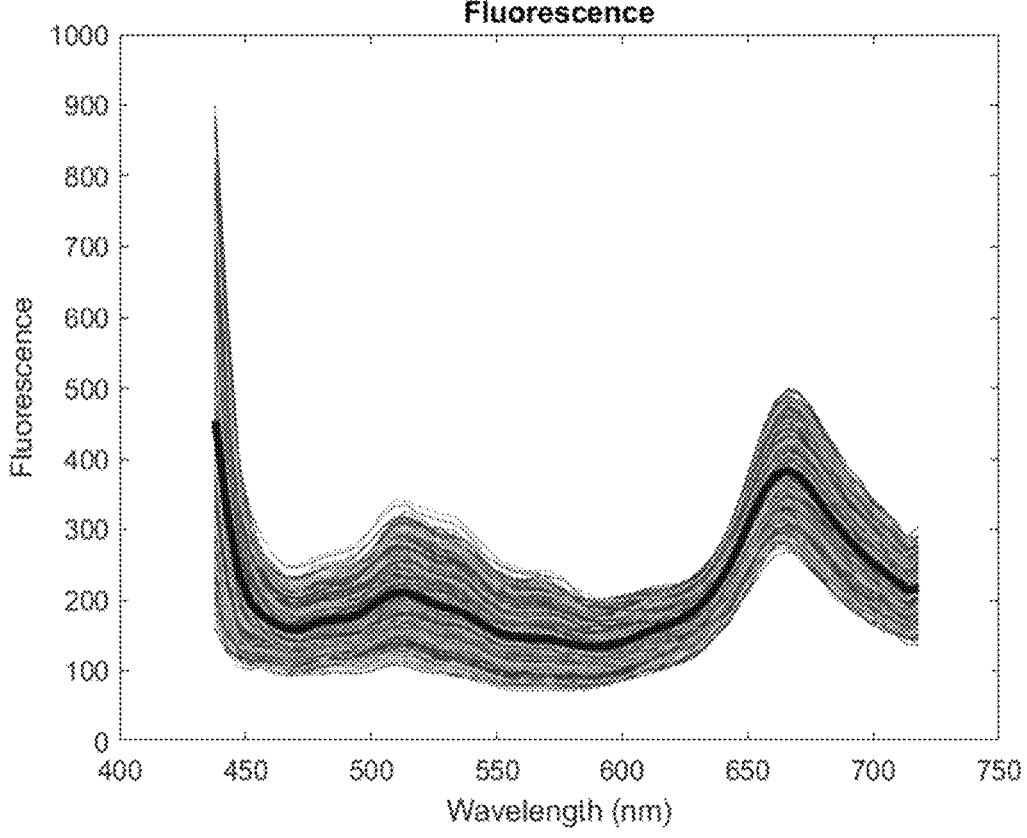
FIG. 5b depicts fluorescence spectra data for each pixel of one of the red snapper fillets according to some embodiments presently disclosed.

The average reflectance and fluorescence spectra for each of the six fish species are shown in FIGS. 4a-b respectively. The spectra for all six species (including the red snapper and the Malabar snapper) were calculated from the pixels of a single fillet. VNIR reflectance and fluorescence spectra for individual blocks from one red snapper image are shown in FIGS. 5a-b, along with the average spectrum. The significant differences in the shapes and positions of the spectral averages for the various species and homogeneous nature of the spectra for pixels of a single fillet suggest that high classification accuracies can be achieved with this spectral information.

Figure 6A:
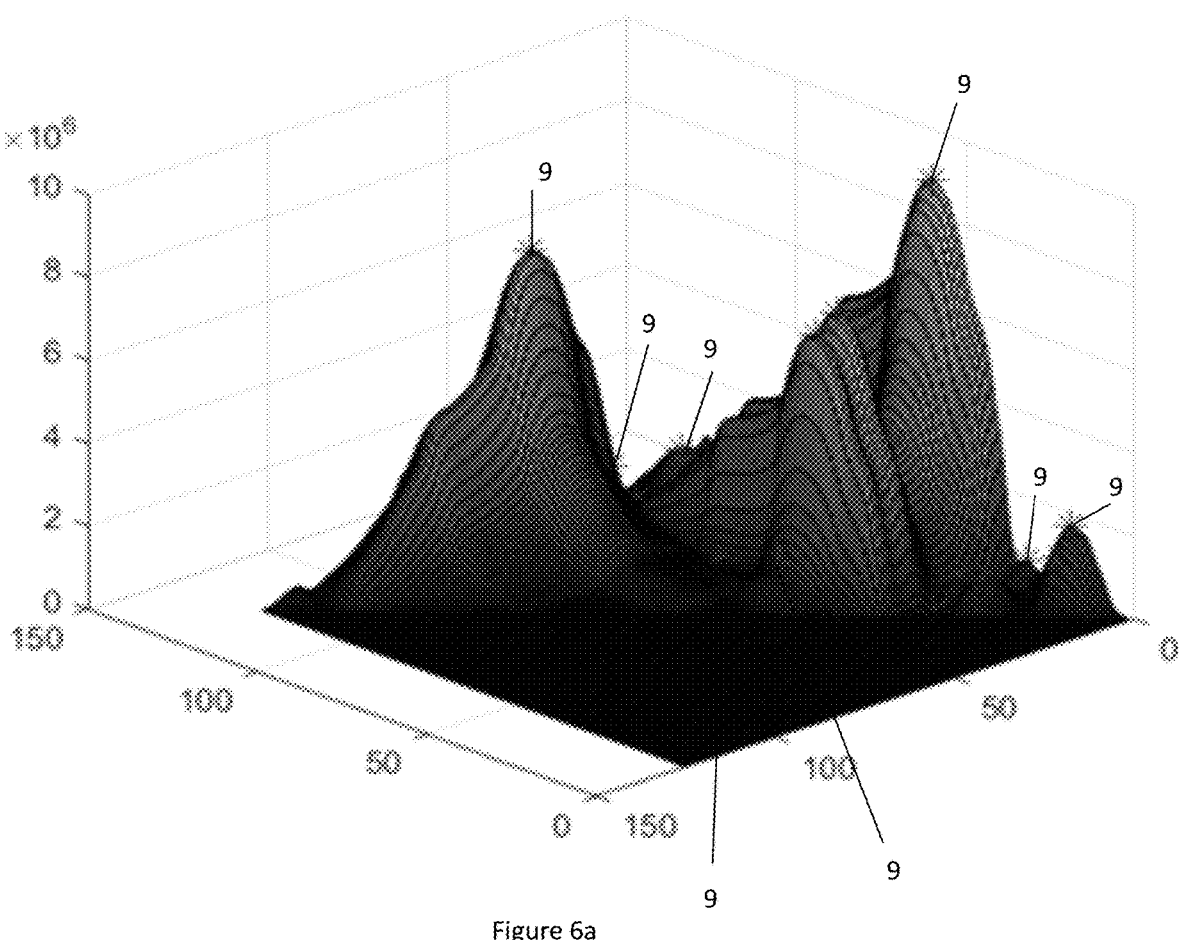
FIGS. 6a-c depict results of the peak finding algorithm for the VNIR data displayed from three different angles according to some embodiments presently disclosed.
Figure 6B:
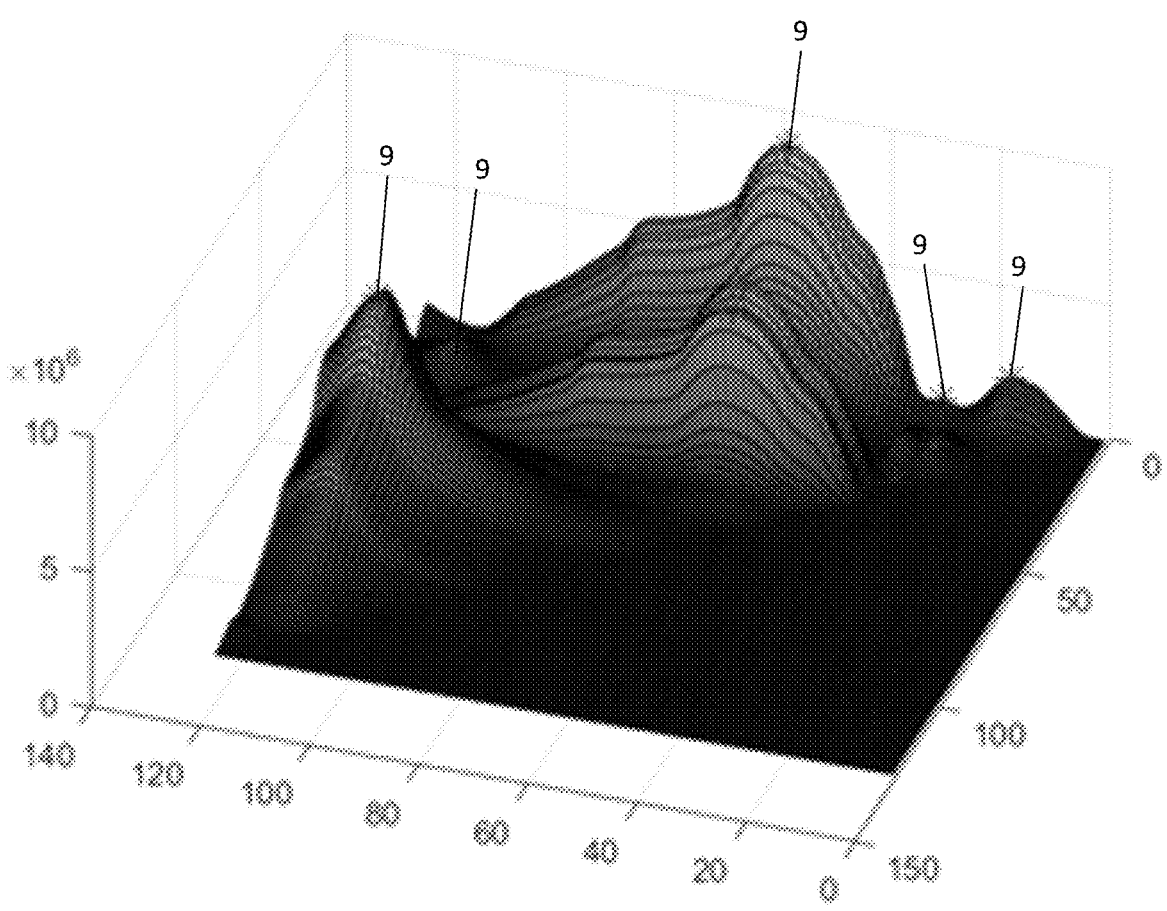
Figure 6C:
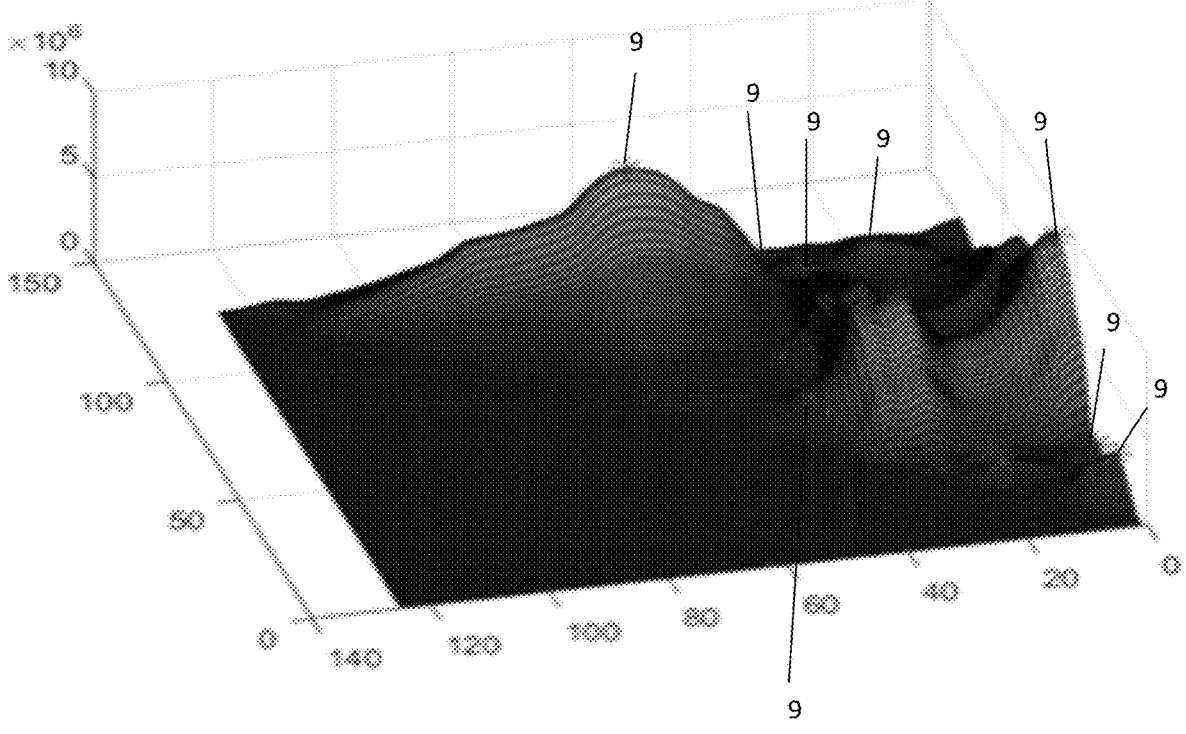

FIGS. 6*a-c* show the WPD plot for the VNIR data with the results of the peak finding algorithm added as asterisks 9. The terrain of this WPD matrix may be near-optimal for realizing the benefits of the SPM WPD band selection method. Prominent peaks rise above the floor of the surface plot to represent apparent differences between regions of high WPD values (and hence little redundancy between the associated bands) and low WPD values. The presently disclosed system and method successfully isolated the local maximum for each peak and identified several peaks near the floor of the surface plot with very low WPD values.

Figure 7:
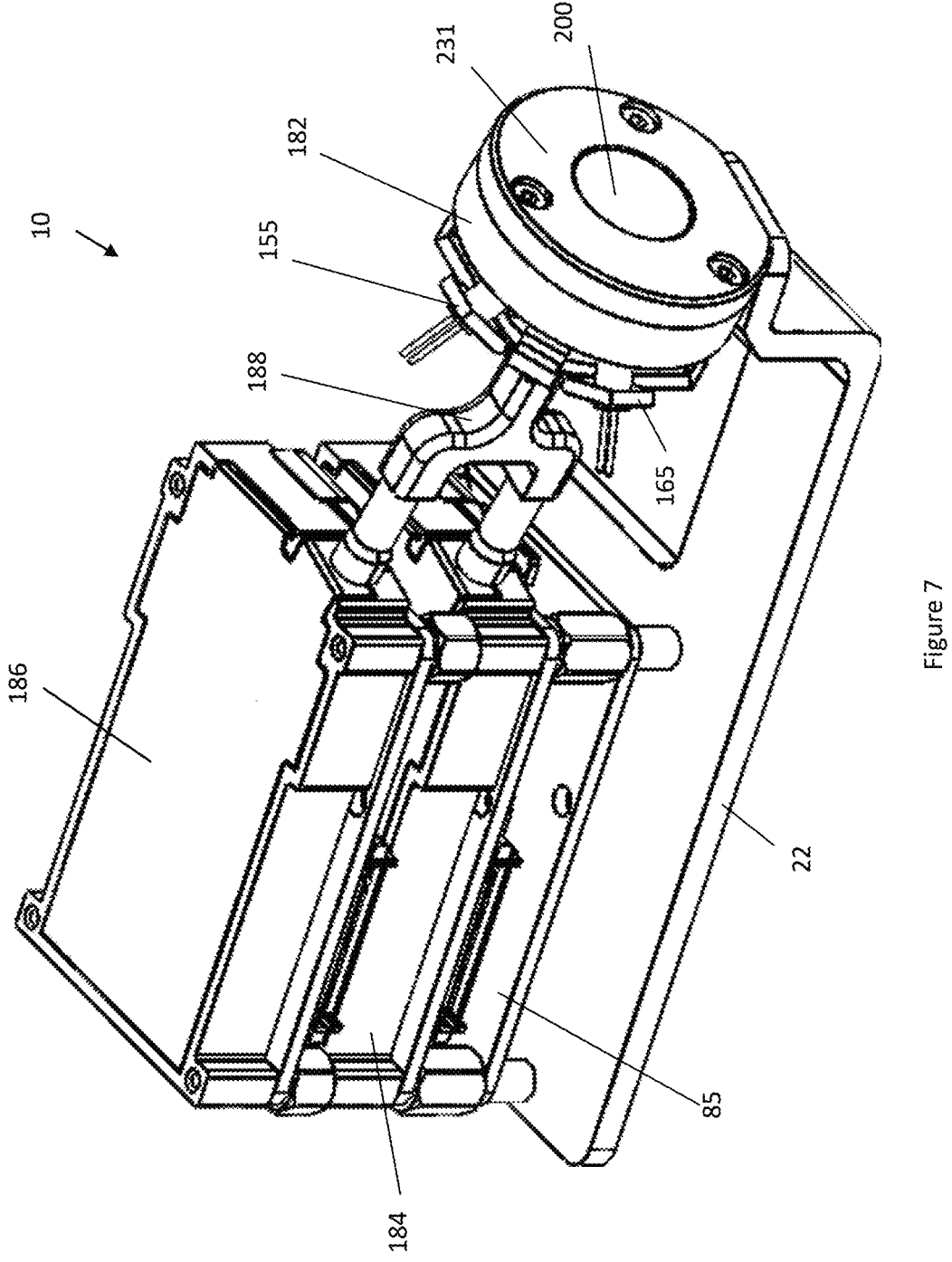
FIG. 7 depicts a device according to some embodiments presently disclosed.
Figure 8:
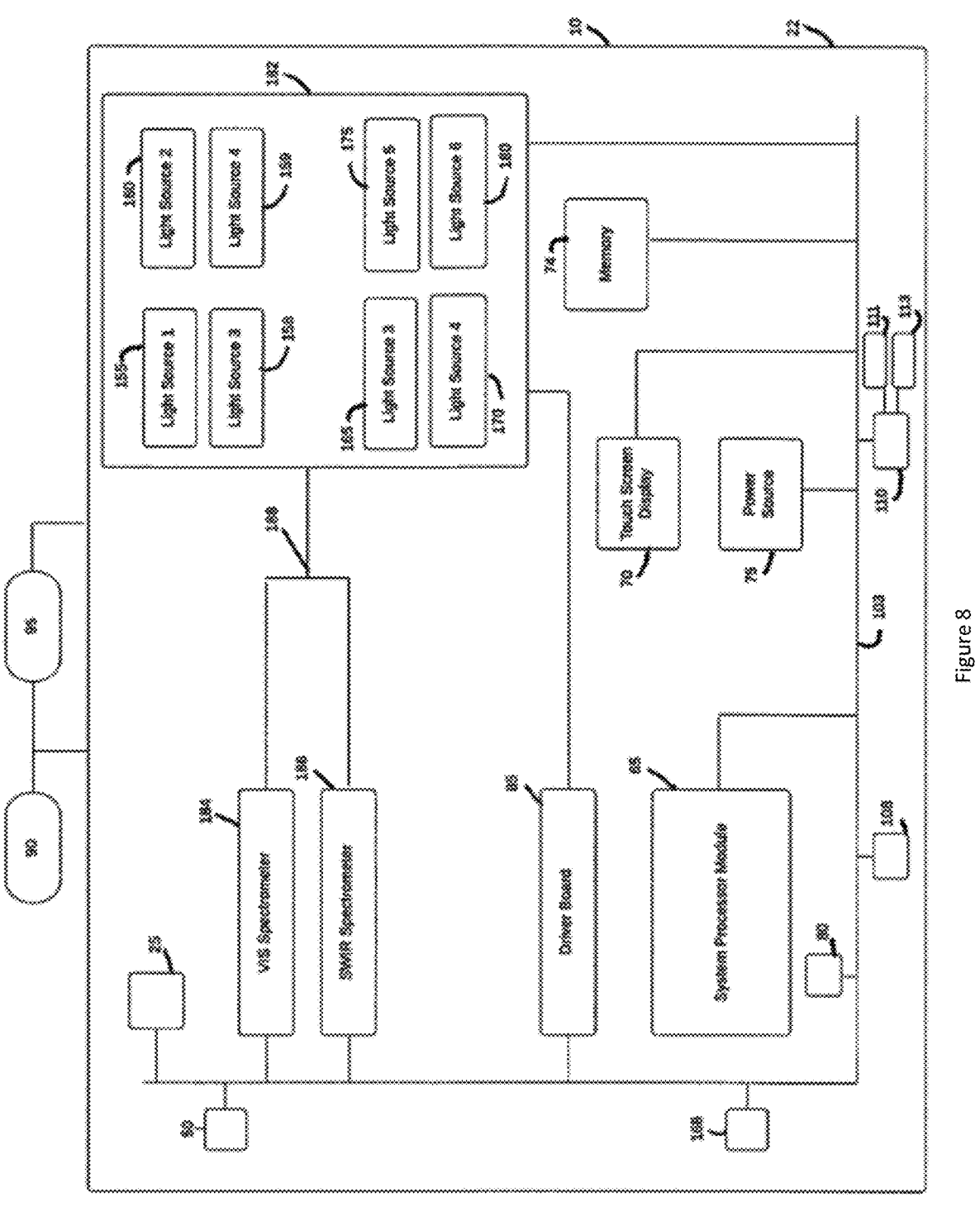
FIG. 8 depicts a block diagram of a device according to some embodiments presently disclosed.

Referring to FIG. 7, at least a portion of a device 10 is shown according to some embodiments presently disclosed. Referring to FIG. 8, a block diagram 20 is shown according to some embodiments presently disclosed. The block diagram 20 depicts some of the components of the device 10 and how they communicate with one another. According to some embodiments presently disclosed, the device 10 is a handheld device. According to some embodiments presently disclosed, the device 10 is part of non-invasive imaging system and method for assessing product(s).

The presently disclosed device 10 may be used to assess one or more products according to some embodiments presently disclosed. The products may be, for example, food related products, meat related products (i.e. beef, lamb, pork, poultry), seafood related products (i.e. fish, shellfish, seaweed), pharmaceutical related products, drug related products, construction related products, natural products, synthetic products, and/or other consumer related products.

According to some embodiments presently disclosed, an operator (i.e. user, technician) uses the device 10 to collect data on the one or more products.

According to some embodiments presently disclosed, the device 10 comprises a housing 22. According to some embodiments, the housing 22 of the device 10 comprises additional materials for ruggedization or to provide drop/ impact resistance.

According to some embodiments presently disclosed, the device 10 comprises a memory 74 (which may comprise one or more computer readable storage mediums). The memory 74 may comprise high-speed random-access memory and/or non-volatile memory, such as one or more magnetic disk storage devices, flash memory devices, or other non-volatile solid-state memory devices. Access to memory 74 by other components of the device 10, such as one or more system processor modules 65 and a peripherals interface, may be controlled by a memory controller (not shown).

According to some embodiments presently disclosed, the device 10 comprises one or more system processor modules 65. The one or more system processor modules 65 run or execute various software programs and/or sets of instructions stored in memory 74 to perform various functions for the device 10 and to process data. The system processor module 65 may also comprise orientation sensors, motion sensors, global positioning systems, wireless communication systems such as WiFi or Bluetooth systems, cellular network communications systems such 4G, LTE or 5G or similar systems. The system processor module 65 may use these systems to communicate with a device server 90 or it may communicate with the device server via a wired connection through a peripheral interface. The system processor module 65 may also use these systems to communicate with other wireless devices such as cell phones, tablets, smart glasses, other inspection devices or other smart displays as well as RFID systems, barcode readers, fingerprint readers, etc. According to some embodiments, some or all of these components may be implemented on a single chip. According to some embodiments, some or all of these components may be implemented on separate chips.

According to some embodiments presently disclosed, the device 10 comprises an audio circuitry 110, a speaker 111, and a microphone 113. The audio circuitry 110, the speaker 111, and the microphone 113 provide an audio interface between a user (i.e. operator) and the device 10. The audio circuitry 110 receives audio data, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to one or more system processor modules 65 for processing. Audio data may be retrieved from and/or transmitted to memory 74. The audio circuitry 110 may also comprise a headset/speaker jack (not shown). The headset jack provides an interface between the audio circuitry 110 and removable audio input/output peripherals, such as speaker, output-only headphones and/or a headset with both output (e.g., a headphone for one or both ears) and input (e.g., a microphone).

According to some embodiments presently disclosed, the device 10 comprises a display 70. The display 70 may be a touch-sensitive display 70. The touch-sensitive display 70 is sometimes called a "touch screen" for convenience, and may also be known as or called a touch-sensitive display system. In one embodiment, the touch-sensitive touch screen 70 provides an input interface and an output interface between the device 10 and the user. The touch screen 70 is configured to implement virtual or soft buttons and one or more soft keyboards. A display controller receives and/or sends electrical signals from/to the touch screen 70. The touch screen 70 displays visual output to the user. The visual output may include graphics, text, icons, video, and any combination thereof (collectively termed "graphics"). In some embodiments, some or all of the visual output may correspond to user-interface objects, further details of which are described below.

The touch screen 70 has a touch-sensitive surface, sensor or set of sensors that accepts input from the user based on haptic and/or tactile contact. The touch screen 70 and the display controller (along with any associated modules and/or sets of instructions in memory 74) detect contact (and any movement or breaking of the contact) on the touch screen 70 and converts the detected contact into interaction with user-interface objects (e.g., one or more soft keys, icons, web pages or images) that are displayed on the touch screen. In one embodiment, a point of contact between a touch screen 70 and the user corresponds to a finger of the user.

The touch screen 70 may use LCD (liquid crystal display) technology, or LPD (light emitting polymer display) technology, although other display technologies may be used in other embodiments. The touch screen 70 and the display controller may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with the touch screen 70.

A touch-sensitive display in some embodiments of the touch screen 70 may be analogous to the multi-touch sensitive tablets described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety.

A touch-sensitive display in some embodiments of the touch screen 70 may be as described in the following applications: (1) U.S. patent application Ser. No. 11/381, 313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228, 758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

The touch screen 70 may have a resolution of 100 dpi. to 350 dpi. The user may make contact with the touch screen 70 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/ cursor position or command for performing the actions desired by the user.

In addition to the touch screen 70, the device 10 may comprise a touchpad (not shown) for activating or deactivating particular functions. The touchpad is a touch-sensitive area of the device that, unlike the touch screen, does not display visual output. The touchpad may be a touch-sensitive surface that is separate from the touch screen 70 or an extension of the touch-sensitive surface formed by the touch screen.

The one or more system processor modules 65 may be configured to communicate with the smart display 70 to provide information to the user during an inspection or to accept instructions from the operator during an inspection. According to some embodiments, the smart display 70 may be a passive device such as a touch screen display. According to some embodiments, the smart display 70 may be an active device with multiple processing and communication capabilities such as a smartphone or tablet. If the smart display 70 is an active device some of the system software functions may be shared between the one or more system processor modules 65 and the smartphone or tablet. According to some embodiments, the smart display 70 is a smartphone.

The device 10 may also comprise a radio frequency (RF) circuitry 108. The RF circuitry 108 may be configured to receive and transmit RF signals, also called electromagnetic signals. The RF circuitry 108 converts electrical signals to/from electromagnetic signals and communicates with communications networks and other communications devices via the electromagnetic signals. The RF circuitry 108 may include circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this document. According to some embodiments, the radio frequency (RF) circuitry 108 allows the device 10 to communicate with a device server 90 and/or an external server 95.

The device 10 may also comprise a physical or virtual click wheel (not show) and/or one or more controls 80 as an input control device. The user may navigate among and interact with one or more graphical objects (henceforth referred to as icons) displayed in the screen 70 by rotating the click wheel or by moving a point of contact with the click wheel (e.g., where the amount of movement of the point of contact is measured by its angular displacement with respect to a center point of the click wheel) or by activating the one or more controls 80. The click wheel may also be used to select one or more of the displayed icons. For example, the user may press down on at least a portion of the click wheel or an associated button. User commands and navigation commands provided by the user via the click wheel may be processed by an input controller as well as one or more of the modules and/or sets of instructions in memory 74. For a virtual click wheel, the click wheel and click wheel controller may be part of the touch screen 70 and the display controller, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

According to some embodiments presently disclosed, the device 10 comprises a power system 75. The power system 75 powers various components of the device 10. The power system 75 may comprise a power management system, one or more power sources (e.g., battery, alternating current (AC)), a recharging system, a power failure detection circuit, a power converter or inverter, a power status indicator (e.g., a light-emitting diode (LED)) and/or any other components associated with the generation, management and distribution of power in portable devices.

According to some embodiments presently disclosed, the device 10 comprises an optical sensor 25. The optical sensor 25 of the device 10 may be electrically coupled with an optical sensor controller. The optical sensor 25 may comprise charge-coupled device (CCD) or complementary metal-oxide semiconductor (CMOS) phototransistors. The optical sensor 25 receives light from the environment, projected through one or more lens, and converts the light to data representing an image. In conjunction with an imaging module (also called a camera module), the optical sensor 25 may capture visual media (i.e. still images or video). In some embodiments, the optical sensor 25 may be located on the front of the device 10, opposite the touch screen display 70 on the back of the device 10, so that the touch screen display 70 may be used as a viewfinder for either still and/or video image acquisition. In some embodiments, the optical sensor 25 may be located on the back of the device 10 to capture image(s) of the user. In some embodiments, one optical sensor 25 may be located on the back of the device 10 and another optical sensor 25 may be located on the front of the device 10. In some embodiments, the position of the optical sensor 25 may be changed by the user (e.g., by rotating the lens and the sensor in the device housing) so that a single optical sensor 25 may be used along with the touch screen display to capture still and/or video image.

According to some embodiments presently disclosed, the optical sensor 25 may comprise fluorescence imaging camera, 3D stereoscopic imaging camera, thermal imaging camera, or speckle imaging camera.

According to some embodiments presently disclosed, the optical sensor 25 may comprise triple band pass filter. The triple band pass filters are configured to cut off the NADH excitation wavelength to the optical sensor 25. According to some embodiments presently disclosed, the optical sensor 30 may comprise double band pass filter. The double band pass filters are configured to cut off the NADH/FAD excitation wavelength to the optical sensor 25.

According to some embodiments presently disclosed, the optical sensor 25 is a color optical sensor. According to some embodiments presently disclosed, the optical sensor 25, when imaging under ambient light, may act as a view finder for operators to position the system correctly prior to biomarker measurements and for conventional wound dimension measurements.

According to some embodiments presently disclosed, the device 10 comprises a range finder to calibrate the field of view at each image capture distance for comparing wound dimensions across different images and over time.

According to some embodiments presently disclosed, the device 10 may also comprise one or more accelerometers 168 as shown in FIG. 3. The accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are which are incorporated herein by reference in their entirety. Information may be displayed on the touch screen display 70 in a portrait view or a landscape view based on an analysis of data received from the one or more accelerometers 168.

According to some embodiments, the memory 74 may be configured to store one or more software components as described below.

The memory 74 may be configured to store an operating system. The operating system (e.g., Darwin, RTXC, LINUX, UNIX, OS X, WINDOWS, or an embedded operating system such as VxWorks) comprises various software components and/or drivers for controlling and managing general system tasks (e.g., memory management, storage device control, power management, etc.) and facilitates communication between various hardware and software components.

The memory 74 may be configured to store a system software. The system software may provide data storage for measurements and other information that are transferred from the device 10. The system software may provide system management functions for managing the creation of jobs and task lists that can be implemented using the device 10. The system software may be configured to manage data storage and creation of jobs and task lists for one or more devices 10 for an organization. The system software may comprise firmware software, analysis software, and user interface software.

The memory 74 may also be configured to store a communication module. The communication module facilitates communication with other devices over one or more external ports and also includes various software components for handling data received by the RF circuitry 108 and/or the external port. In one embodiment, the external port (e.g., Universal Serial Bus (USB), FIREWIRE, etc.) is configured for coupling directly to other devices or indirectly over a network (e.g., the Internet, wireless LAN, etc.).

The memory 74 may be configured to store a contact/motion module. The contact/motion module is configured to detect contact with the touch screen 70 (in conjunction with the display controller) and other touch sensitive devices (e.g., a touchpad or physical click wheel). The contact/motion module includes various software components for performing various operations related to detection of contact, such as determining if contact has occurred, determining if there is movement of the contact and tracking the movement across the touch screen 74, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). The contact/motion module and the display controller may also detect contact on a touchpad. The contact/motion module and the controller may further detect contact on a click wheel.

The memory 74 may be configured to store a graphics module. The graphics module comprises various known software components for rendering and displaying graphics on the touch screen 70, including components for changing the intensity of graphics that are displayed. As used herein, the term "graphics" includes any object that can be displayed to a user, including without limitation text, web pages, icons (such as user-interface objects including soft keys), digital images, videos, animations and the like.

The memory 74 may also be configured to store a text input module. The text input module, which may be a component of graphics module, provides soft keyboards for entering text in various applications that need text input.

The memory 74 may be configured to store a GPS module. The GPS module determines the location of the device and provides this information for use in various applications (e.g., to camera module as picture/video metadata).

The memory 74 may be configured to store applications. The applications may comprise one or more of the following modules (or sets of instructions), or a subset or superset thereof: a camera module for still and/or video images; an image management module; a video player module; and/or online video module.

The applications may comprise additional modules (or sets of instructions). For example, other applications that may be stored in memory 74 may include one or more of the following: a contacts module (sometimes called an address book or contact list); a telephone module; a video conferencing module; an e-mail client module; an instant messaging (IM) module; a browser module; a calendar module; search module; notes module; map module; word processing applications; JAVA-enabled applications; encryption; digital rights management; voice recognition; and/or voice replication.

The camera module (in conjunction with, for example, touch screen 70, display controller, optical sensor(s) 25, optical sensor controller, contact module, graphics module, and image management module) may be configured to capture still images or video (including a video stream) and store them into memory 74, modify characteristics of a still image or video, or delete a still image or video from memory 74.

The image management module (in conjunction with, for example, touch screen 70, display controller, contact module, graphics module, text input module, and camera module) may be configured to arrange, modify or otherwise manipulate, label, delete, present (e.g., in a digital slide show or album), and store still and/or video images.

The video player module (in conjunction with, for example, touch screen 70, display controller, contact module, graphics module, audio circuitry 110, and speaker 111) may be configured to display, present or otherwise play back videos (e.g., on the touch screen 70 or on an external, connected display via external port).

The online video module (in conjunction with, for example, touch screen 70, display system controller, contact module, graphics module, audio circuitry 110, speaker 111, RF circuitry 108) may be configured to allow the user to access, browse, receive (e.g., by streaming and/or download), play back (e.g., on the touch screen 70 or on an external, connected display via external port), upload and/or otherwise manage online videos in one or more file formats.

Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various embodiments. For example, video player module may be combined with another module into a single module. The memory 74 may store a subset of the modules and data structures identified above. Furthermore, memory 74 may store additional modules and data structures not described above.

The device 10 may be configured so as to allow operation of a predefined set of functions on the device be performed exclusively through a touch screen 70 and/or a touchpad. By using a touch screen and/or a touchpad as the primary input/control device for operation of the device 10, the number of physical input/control devices (such as push buttons, dials, and the like) on the device 10 may be reduced.

The predefined set of functions that may be performed exclusively through a touch screen and/or a touchpad may include navigation between user interfaces. In some embodiments, the touchpad, when touched by the user, navigates the device 10 to a main, home, or root menu from any user interface that may be displayed on the device 10.

The device 10 as shown in FIG. 8 may comprise more or fewer components than shown, may combine two or more components, or a may have a different configuration or arrangement of the components. The various components shown in FIG. 8 may be implemented in hardware, software or a combination of both hardware and software, including one or more signal processing and/or application specific integrated circuits.

Components shown in FIG. 8 may communicate over one or more communication buses or signal lines 103.

According to some embodiments presently disclosed, the device 10 comprises a motion sensor, orientation sensor, temperature sensor, distance sensor, and/or a plurality of light sources 155-180. According to some embodiments presently disclosed, the device 10 may also comprise hand controls 80 and/or an illumination driver 85.

According to some embodiments, the illumination driver 85 controls and provides suitable power to the light sources 155-180. The light sources 155-180 may be activated by the illumination driver 85 in response to one or more signals from the system processor module 65. The light sources 155-180 can be operated in continuous or pulsed illumination modes. The pulse mode facilitates background image capture to enhance detectability in brighter ambient light. The illumination driver 85 receives one or more signals from the system processor module 65 to turn the light sources 155-180 on and off. During fluorescence imaging modes some of the light sources 155-180 are turned on and off sequentially via one or more signals from the system processor module 65.

According to some embodiments, the light sources 155-180 may be lasers, light emitting diodes (LEDs), lamps, or other sources of illumination capable of providing the appropriate wavelengths for fluorescence excitation. According to some embodiments, some of the light sources 155-180 are high power LEDs in the wavelength range of UV and blue/violet. According to some embodiments, some of the light sources 155-180 provide illumination time for fluorescence imaging of between 1 msec to 200 msec for each excitation wavelength. The actual time of the exposure for either fluorescence imaging may be controlled by a system software algorithm which takes into account the task being performed, distance to the surface, illumination light energy, required energy for excitation, required energy for disinfection, and other factors to calculate the illumination and imaging times.

When the task being performed is fluorescence imaging the system sets the illumination time based on the amount of energy the illumination system provides under UV illumination and under blue violet illumination at a known distance that was determined by measurement during a system calibration process. The system software determines the amount of illumination required for detection of a desired contaminant, such as saliva or biological residues or bacteria, from prior knowledge extracted from experimental measurements with known samples.

According to some embodiments, the system processor module 65 comprises a computer on an integrated circuit with a Central Processing Unit (CPU) with machine learning model computation, multiple data input and output ports, and peripheral device interfaces with connection to various other components as shown in FIG. 8. The system processor module 65 may host the system software that guides inspections, analyzes data, and communicates with the user (i.e. operator) of the device 10 and one or more external servers 90, 95. The system processor module 65 may provide control of the light sources 155-180 for imaging. The system processor module 65 may manage the timing and synchronization of the light sources 155-180. The system processor module 65 may process the captured images to provide meaningful information to operators and for inspection records.

According to some embodiments, the distance sensor 50 comprises at least one Light Detection and Ranging (LIDAR) sensor and directed towards the field of view of the surface being examined. According to some embodiments, the angular acceptance of the LIDAR sensor can be adjusted programmatically to overlap a desired field of view of the camera systems.

The system processor module 65 may be configured to receive and interpret signals from the hand actuated controls 80 of the device 10. Hand actuated controls 80 can include momentary push button switches, on/off push button switches, or multi-axis push button controls that can be used to guide a cursor on the display 70.

According to some embodiments, the device server 90 comprises a computer system connected either wirelessly or by a secure wire or fiberoptic connection to the device 10. According to some embodiments, the device server 90 is a cloud server. The device server 90 may be configured to host the image and inspection history databases for one or more devices 10 and communicates with the system software on one or more devices 10. According to some embodiments, the device server 90 manages the communication of data and reports to and from one or more external servers 95.

According to some embodiments, the one or more external servers 95 may be customer servers or servers providing other data such as local environmental conditions or local disease prevalence. The device server 90 may also host web portals where users of the device 10 and or their managers can view inspection histories, incident reports, device status, inspection status, and where users can setup inspection task lists and perform other management and reporting functions regarding cleanliness status and completeness of the tasks for an inspection task list, multiple inspection task lists for multiple handheld devices or operators, of a facility, or of multiple facilities.

According to some embodiments presently disclosed, the system software is fully or partially stored in memory of the device server 90. According to some embodiments presently disclosed, the system software runs on the device server 90.

According to some embodiments presently disclosed, the system software may provide data storage for measurements and other information that are transferred from the device 10. The system software on the device server 90 may provide system management functions for managing the creation of jobs and task lists that can be implemented using the device 10. The system software on the device server 90 may be configured to manage data storage and creation of jobs and task lists for one or more devices 10 for an organization. For example, a company may have five devices 10 at different locations that are managed from a single device server 90. According to some embodiments, the device server 90 may also manage data storage and creation of jobs and task lists for multiple organizations with multiple devices 10.

According to some embodiments presently disclosed, the device server 90 is a cloud server wirelessly connected to one or more devices 10 and providing services to many organizations. The cloud device server 90 may comprise web portals that are accessible through the internet where users or managers can manage one or more devices 10. The system management software on the device server 90 may provide for the creation, storage, and retrieval of inspection and sanitation reports. The system management software on the device server 90 may provide for the creation of a risk index for each inspection task and for analysis of previous inspection and sanitation reports to analyze ongoing risk and apply an updated risk index for each inspection task. The system management software on the device server 90 may provide the ability to communicate with external sources of data. External sources of data can be at least one of an organization server, an institutional server, a server providing data from a government or regulatory body, a server providing data from a public or private source of environmental, health, epidemiological, weather, population, scheduling, transportation, etc. information. The management software on the device server 90 may also provide data to local, regional, national, or international agencies or regulatory bodies.

The device server 90 may communicate task management information and collect data via wired or wireless methods to the system software on the device 10. The system software can communicate reports and measurement data and device 10 system status to the device server 90. The system software may comprise firmware software, analysis software, and user interface software.

The user interface software provides information and control screens on the display 70 to guide a user (i.e. operator) through assessment of the product and task list. According to some embodiments, the user interface software displays options to the operator via the display 70 and accepts input from the operator via either the display 70 or the hand controls 80 on the smart display and/or accepts input from the operator via the smart display 70 and the hand controls 80 on the device. According to some embodiments, the user interface software provides for communication of inspection tasks, inspection status and inspection results to the device server 90.

The firmware software may be directly connected to and controls the hardware components of the device 10. The user interface software provides information to and interprets commands from the device 10 operator. The analysis software continuously analyzes sensor measurements, analyzes image data, and provides information to the operator to guide the analysis of the product.

According to some embodiments presently disclosed, the device 10 may be used to collect full-resolution reflectance and fluorescence images of a product being tested. According to some embodiments presently disclosed, the device 10 comprises visible and near-infrared (VNIR) hyperspectral imaging system. The light source for VNIR reflectance may be, for example, a 150 W quartz tungsten lamp. For fluorescence imaging, two UV line light sources may be used, each with, for example, four 10 W, 365 nm, light-emitting diodes (LEDs). Reflectance images, for example, in 125 bands within the 419-1007 nm spectral range (4.4 nm at FWHM) and fluorescence images, for example, in 60 bands within the 438-718 nm range (4.4 nm at FWHM) may be acquired using, for example, a 23 mm focal length lens, an imaging spectrograph, and a 14-bit electron-multiplying charge-coupled device.

According to some embodiments presently disclosed, the device 10 comprises a frontend assembly 182 (shown in FIGS. 7, 8 and 9a-b) that is optically coupled with a first spectrometer 184 and a second spectrometer 186. The device 10 comprises a Y-coupler 188 to optically couple the frontend assembly 182 with the spectrometers 184 and 186. The Y-couple 188 connects output optical fibers from the frontend assembly 182 to the spectrometers 184 and 186.

According to some embodiments presently disclosed, the spectrometers 184 and 186 measure the spectrum of light transmitted from the frontend assembly 182. According to some embodiments presently disclosed, the spectrometers 184 and 186 measure the amount of light transmitted by a product as a function of wavelength. According to some embodiments presently disclosed, the spectrometer 184 is a visible (VIS) spectrometer and the spectrometer 186 is a short-wave infrared (SWIR) spectrometer.

Figure 9A:
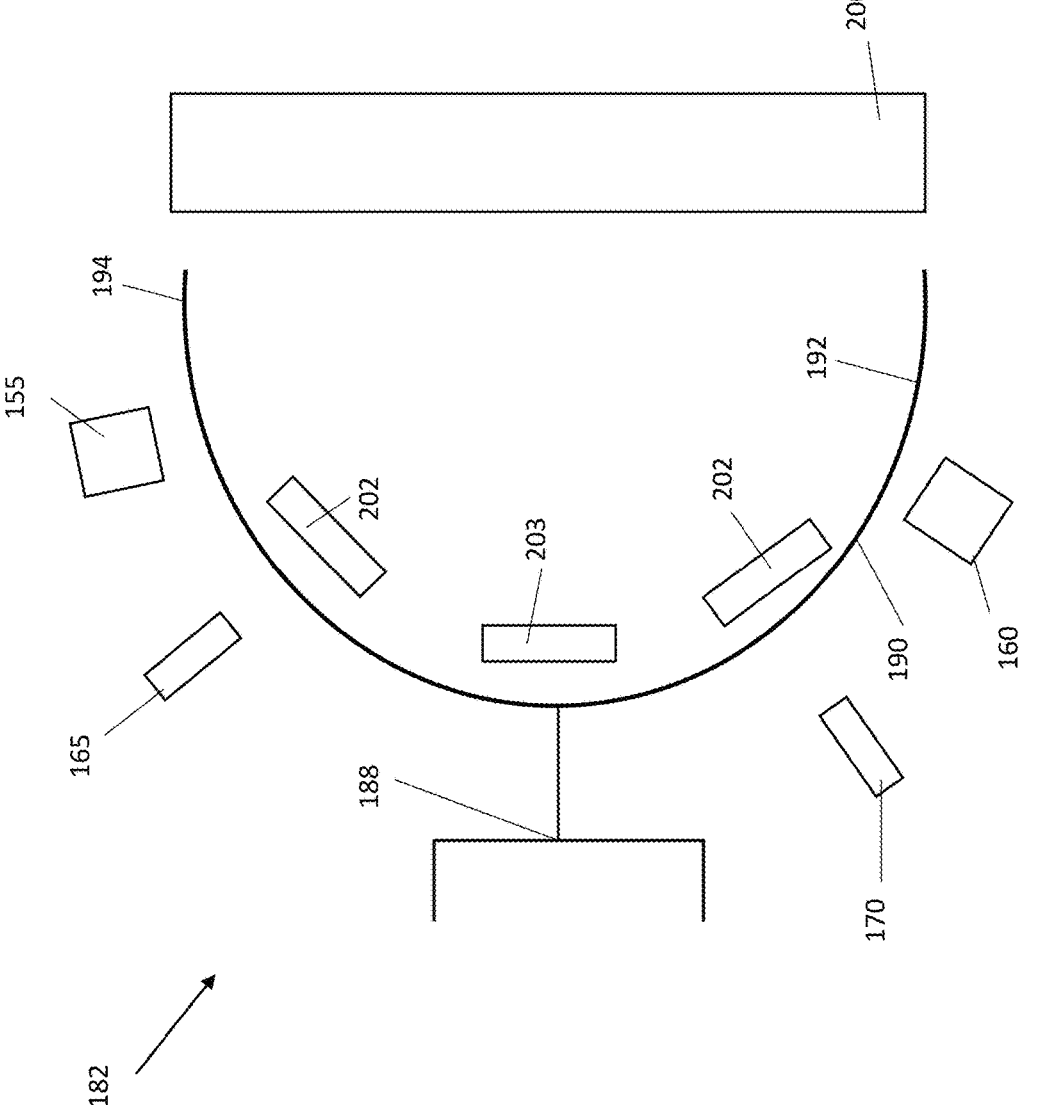
FIG. 9a depicts a cutaway side view of a frontend assembly according to some embodiments presently disclosed.
Figure 9B:
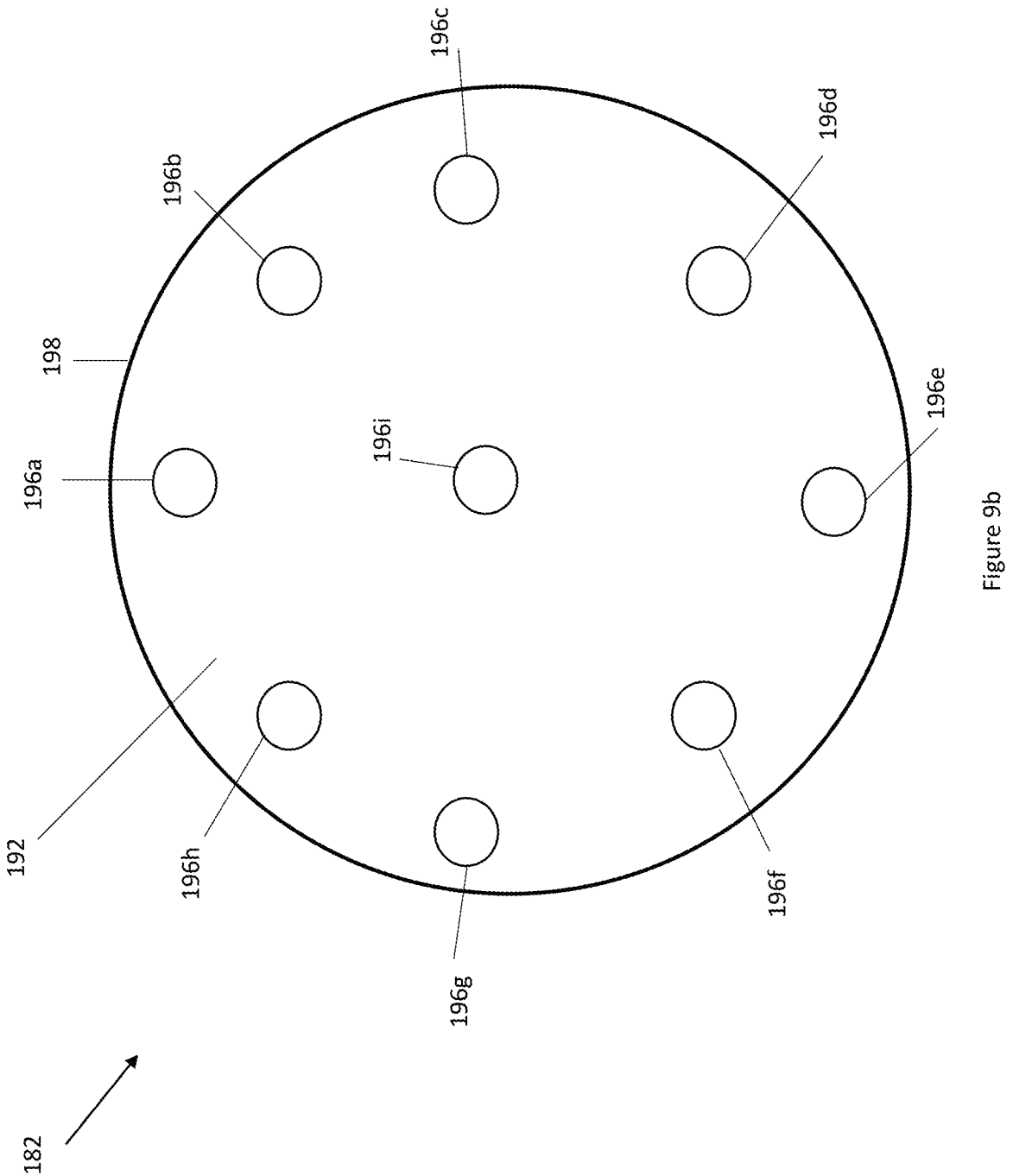
FIG. 9b depicts front view of a frontend assembly according to some embodiments presently disclosed.

Referring to FIG. 9a, a cut away side view of the frontend assembly 182 is shown according to some embodiments presently disclosed. Referring to FIG. 9b, front view of the frontend assembly 182 is shown according to some embodiments presently disclosed. According to some embodiments presently disclosed, the frontend end assembly 182 comprises housing 190 with one or more of the light sources 155-180 associated with the housing 190. According to some embodiments presently disclosed, the housing 190 comprises an inner surface 192 that is concave shaped. According to some embodiments presently disclosed, the housing 190 comprises an inner surface 192 that is hemispherical. According to some embodiments presently disclosed, the housing comprises an outer surface 194 positioned opposite the inner surface 192. According to some embodiments presently disclosed, one or more of the light sources 155-180 are positioned along the outer surface 194 of the housing 190. According to some embodiments presently disclosed, the inner surface 192 comprises aluminum material. According to some embodiments presently disclosed, the housing 190 comprises aluminum material.

According to some embodiments presently disclosed, the light source 155 is a bulb. According to some embodiments presently disclosed, the light sources 155 and 158 are bulbs. According to some embodiments presently disclosed, the light sources 155, 158, and 159 are bulbs. According to some embodiments presently disclosed, the light sources 155, 158, 159, and 160 are bulbs.

According to some embodiments presently disclosed, the light source 155 is a tungsten bulb. According to some embodiments presently disclosed, the light sources 155 and 158 are tungsten bulbs. According to some embodiments presently disclosed, the light sources 155, 158, and 159 are tungsten bulbs. According to some embodiments presently disclosed, the light sources 155, 158, 159, and 160 are tungsten bulbs.

According to some embodiments presently disclosed, the housing 190 comprises a plurality of through apertures 196a-h configured to allow light from one or more light sources 155-180 to pass through the housing 190 towards a window 200 described below. According to some embodiments presently disclosed, the apertures 196a-h are positioned along the perimeter edge 198 of the housing 190.

According to some embodiments presently disclosed, the frontend end assembly 182 comprises a window 200 positioned in front of the inner surface 192. According to some embodiments presently disclosed, the window 200 positioned over the concave surface 192. According to some embodiments presently disclosed, the window 200 comprises antireflective coating on a surface facing the inner surface 192. According to some embodiments presently disclosed, the window 200 is sapphire window.

According to some embodiments presently disclosed, the light source 155 is positioned in line with the apertures 196a to allow light from the light source 155 to pass through the aperture 196a towards the window 200. Referring to FIG. 9b, according to some embodiments presently disclosed, the light source 155 is positioned in line with the aperture 196a located, for example, substantially at a 12 o'clock position along the perimeter of the housing 190.

According to some embodiments presently disclosed, the light sources 155 and 158 are positioned in line with the apertures 196a and 196e to allow light from the light sources 155 and 158 to pass through the apertures 196a and 196e towards the window 200. Referring to FIG. 9b, according to some embodiments presently disclosed, the light source 155 is positioned in line with the aperture 196a located, for example, substantially at a 12 o'clock position along the perimeter of the housing 190. According to some embodiments presently disclosed, the light source 158 is positioned opposite the light source 155 and in line with the aperture 196e located, for example, substantially at a 6 o'clock position along the perimeter of the housing 190.

According to some embodiments presently disclosed, the light sources 155, 158, and 159 are positioned in line with the apertures 196a, 196c, and 196e to allow light from the light sources 155, 158 and 159 to pass through the apertures 196a, 196c, and 196e towards the window 200. Referring to FIG. 9b, according to some embodiments presently disclosed, the light source 155 is positioned in line with the aperture 196a located, for example, substantially at a 12 o'clock position along the perimeter of the housing 190. According to some embodiments presently disclosed, the light source 158 is positioned opposite the light source 155 and in line with the aperture 196e located, for example, substantially at a 6 o'clock position along the perimeter of the housing 190. According to some embodiments presently disclosed, the light source 159 is positioned in line with the aperture 196c located, for example, substantially at a 3 o'clock position along the perimeter of the housing 190.

According to some embodiments presently disclosed, the light sources 155, 158, 159 and 160 are positioned in line with the apertures 196a, 196c, 196e, and 96g to allow light from the light sources 155, 158, 159 and 160 to pass through the apertures 196a, 196c, 196e, and 196g towards the window 200. Referring to FIG. 9b, according to some embodiments presently disclosed, the light source 155 is positioned in line with the aperture 196a located, for example, substantially at a 12 o'clock position along the perimeter of the housing 190. According to some embodiments presently disclosed, the light source 158 is positioned opposite the light source 155 and in line with the aperture 196e located, for example, substantially at a 6 o'clock position along the perimeter of the housing 190. According to some embodiments presently disclosed, the light source 159 is positioned in line with the aperture 196c located, for example, substantially at a 3 o'clock position along the perimeter of the housing 190. According to some embodiments presently disclosed, the light source 160 is positioned opposite the light source 159 and in line with the aperture 196g located, for example, substantially at a 9 o'clock position along the perimeter of the housing 190.

According to some embodiments presently disclosed, the light source 165 is a light emitting diode (LED). According to some embodiments presently disclosed, the light sources 165 and 170 are LEDs. According to some embodiments presently disclosed, the light sources 165, 170, and 175 are LEDs. According to some embodiments presently disclosed, the light sources 165, 170, 175, and 180 are LEDs.

According to some embodiments presently disclosed, the light source 165 operates at a first wavelengths. According to some embodiments presently disclosed, the light source 170 operates at the first wavelengths. According to some embodiments presently disclosed, the light source 175 operates at a second wavelengths. According to some embodiments presently disclosed, the light source 180 operates at the second wavelengths. According to some embodiments presently disclosed, the first wavelength is, for example, 365 nm, 395 nm or 405 nm. According to some embodiments presently disclosed, the second wavelength is, for example, 365 nm, 395 nm or 405 nm.

According to some embodiments presently disclosed, the light source 165 is a multimodal light source that operates at least at two different wavelengths. According to some embodiments presently disclosed, the light source 165 operates at, for example, 365 nm and 395 nm; or 365 nm and 405 nm; or 395 nm and 405 nm.

According to some embodiments presently disclosed, the light source 170 is a multimodal light source that operates at least at two different wavelengths. According to some embodiments presently disclosed, the light source 170 operates at, for example, 365 nm and 395 nm; or 365 nm and 405 nm; or 395 nm and 405 nm.

According to some embodiments presently disclosed, the light source 175 is a multimodal light source that operates at least at two different wavelengths. According to some embodiments presently disclosed, the light source 175 operates at, for example, 365 nm and 395 nm; or 365 nm and 405 nm; or 395 nm and 405 nm.

According to some embodiments presently disclosed, the light source 180 is a multimodal light source that operates at least at two different wavelengths. According to some embodiments presently disclosed, the light source 180 operates at, for example, 365 nm and 395 nm; or 365 nm and 405 nm; or 395 nm and 405 nm.

According to some embodiments presently disclosed, the light source 165 is positioned in line with the apertures 196b to allow light from the light source 165 to pass through the aperture 196b towards the window 200. Referring to FIG. 9b, according to some embodiments presently disclosed, the light source 165 is positioned in line with the aperture 196b located, for example, between a 12 o'clock position and a 3 o'clock position along the perimeter of the housing 190.

According to some embodiments presently disclosed, the light sources 165 and 170 are positioned in line with the apertures 196b and 196f to allow light from the light sources 165 and 170 to pass through the apertures 196b and 196f towards the window 200. Referring to FIG. 9b, according to some embodiments presently disclosed, the light source 165 is positioned in line with the aperture 196b located, for example, between a 12 o'clock position and a 3 o'clock position along the perimeter of the housing 190. According to some embodiments presently disclosed, the light source 170 is positioned opposite the light source 165 and in line with the aperture 196f located, for example, between a 6 o'clock position and a 9 o'clock position along the perimeter of the housing 190.

According to some embodiments presently disclosed, the light sources 165, 170, and 175 are positioned in line with the apertures 196b, 196f and 196h to allow light from the light sources 165, 170 and 175 to pass through the apertures 196b, 196f and 196h towards the window 200. Referring to FIG. 9b, according to some embodiments presently disclosed, the light source 165 is positioned in line with the aperture 196b located, for example, between a 12 o'clock position and a 3 o'clock position along the perimeter of the housing 190. According to some embodiments presently disclosed, the light source 170 is positioned opposite light source 165 and in line with the aperture 196f located, for example, between a 6 o'clock position and a 9 o'clock position along the perimeter of the housing 190. According to some embodiments presently disclosed, the light source 175 is positioned in line with the aperture 196h located, for example, between a 9 o'clock position and a 12 o'clock position along the perimeter of the housing 190.

According to some embodiments presently disclosed, the light sources 165, 170, 175 and 180 are positioned in line with the apertures 196b, 196d, 196f and 196h to allow light from the light sources 165, 170, 175 and 180 to pass through the apertures 196b, 196d, 196f, and 196h towards the window 200. Referring to FIG. 9b, according to some embodiments presently disclosed, the light source 165 is positioned in line with the aperture 196b located, for example, between a 12 o'clock position and a 3 o'clock position along the perimeter of the housing 190. According to some embodiments presently disclosed, the light source 170 is positioned opposite the light source 165 and in line with the aperture 196f located, for example, between a 6 o'clock position and a 9 o'clock position along the perimeter of the housing 190. According to some embodiments presently disclosed, the light source 175 is positioned in line with the aperture 196h located, for example, between a 9 o'clock position and a 12 o'clock position along the perimeter of the housing 190. According to some embodiments presently disclosed, the light source 180 is positioned opposite the light source 175 and in line with the aperture 196d located, for example, between a 3 o'clock position and a 6 o'clock position along the perimeter of the housing 190.

According to some embodiments presently disclosed, the frontend assembly 182 comprises one or more optical filters 202 positioned between the window 200 and the light sources 165, 170, 175, and/or 180. According to some embodiments presently disclosed, the one or more optical filters 202 are band pass filters or short pass filters. According to some embodiments presently disclosed, the one or more optical filters 202 remove emission tail generated by the light sources 165, 170, 175, and/or 180. According to some embodiments presently disclosed, the one or more optical filters 202 are thin film filter.

According to some embodiments presently disclosed, the device 10 is configured to operate in a reflectance imaging mode. According to some embodiments presently disclosed, the device 10 performs a reflectance analysis (i.e. reflectance test) when operating in the reflectance imaging mode.

Figure 10:
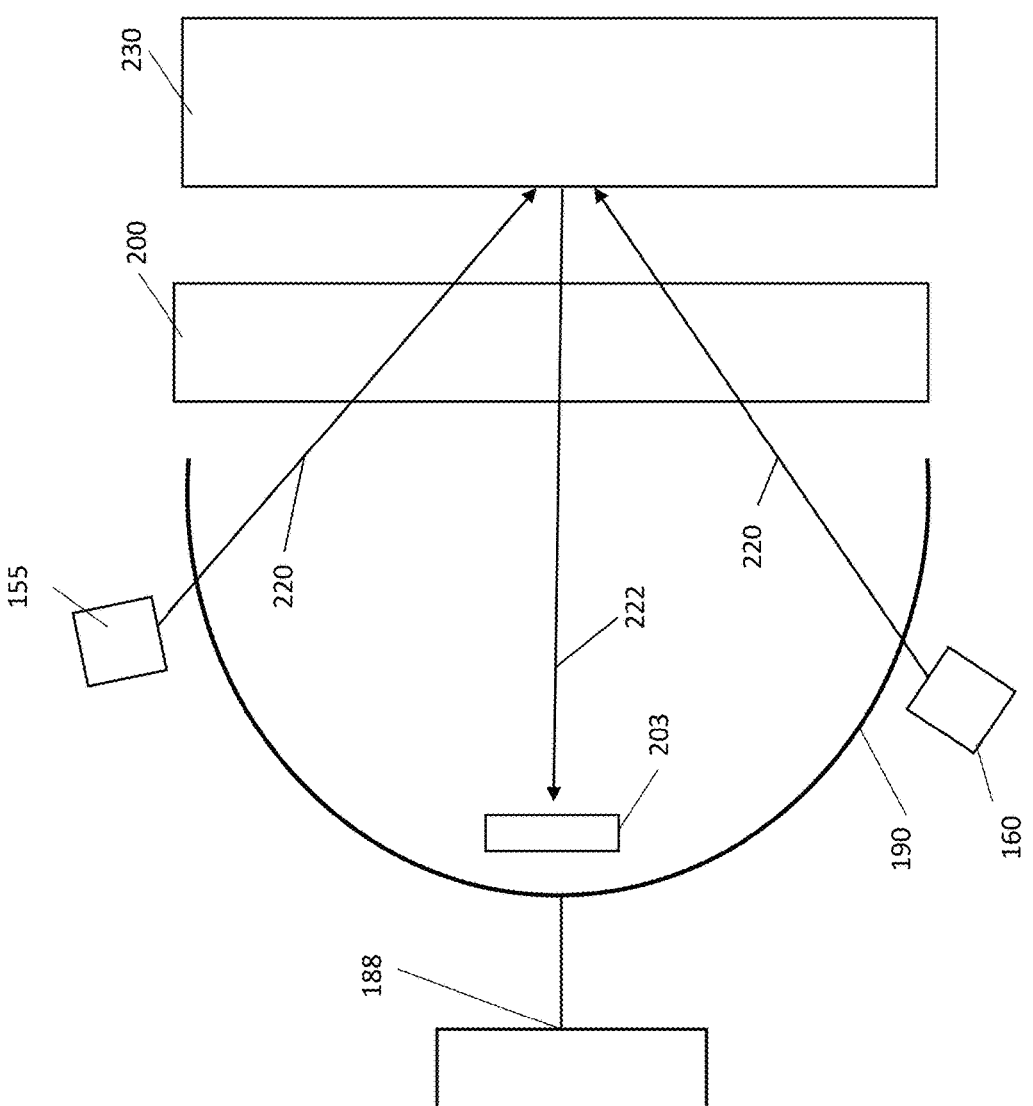
FIG. 10 depicts another cutaway side view of a frontend assembly according to some embodiments presently disclosed.

According to some embodiments presently disclosed, the device 10 performs a reflectance analysis (i.e. reflectance test) as shown in FIG. 10. A light 220 from at least light source 155 passes through the aperture 196a and the window 200 until it hits the product 230 being tested. Due to material properties of the product 230, at least some of the light 220's wavelengths will be absorbed or reflected by the product 230. According to some embodiments presently disclosed, at least a portion of a light 222 reflected by the product 230 is directed towards the y-coupler 188 through the window 200 and a through aperture 196i. According to some embodiments presently disclosed, the light 222 is a portion of the light 220 that has been reflected by the product 230 and spectrally modified and/or diffused by the product 230. According to some embodiments presently disclosed, the aperture 196i is positioned at the center of the inner surface 192. According to some embodiments presently disclosed, at least a portion of the light 222 will be directed by the y-coupler 188 to the spectrometers 184 and 186 for processing. According to some embodiments presently disclosed, at least a portion of the light 222 will be directed by the y-coupler 188 to the spectrometer 184 for processing. According to some embodiments presently disclosed, at least a portion of the light 222 will be directed by the y-coupler 188 to the spectrometer 186 for processing.

According to some embodiments presently disclosed, the light 220 is generated by the light source 155 and the light source 158. According to some embodiments presently disclosed, the light 220 is generated by the light source 159 and the light source 160. According to some embodiments presently disclosed, the light 220 is generated by the light source 155, the light source 158, the light source 159, and/or the light source 160. According to some embodiments presently disclosed, the light 220 is generated by activating any combinations of the light source 155, 158, 159, 160.

According to some embodiments presently disclosed, the device 10 is configured to operate in a first fluorescence imaging mode. According to some embodiments presently disclosed, the device 10 performs a first fluorescence analysis (i.e. first fluorescence test) when operating in the first fluorescence imaging mode.

Figure 11:
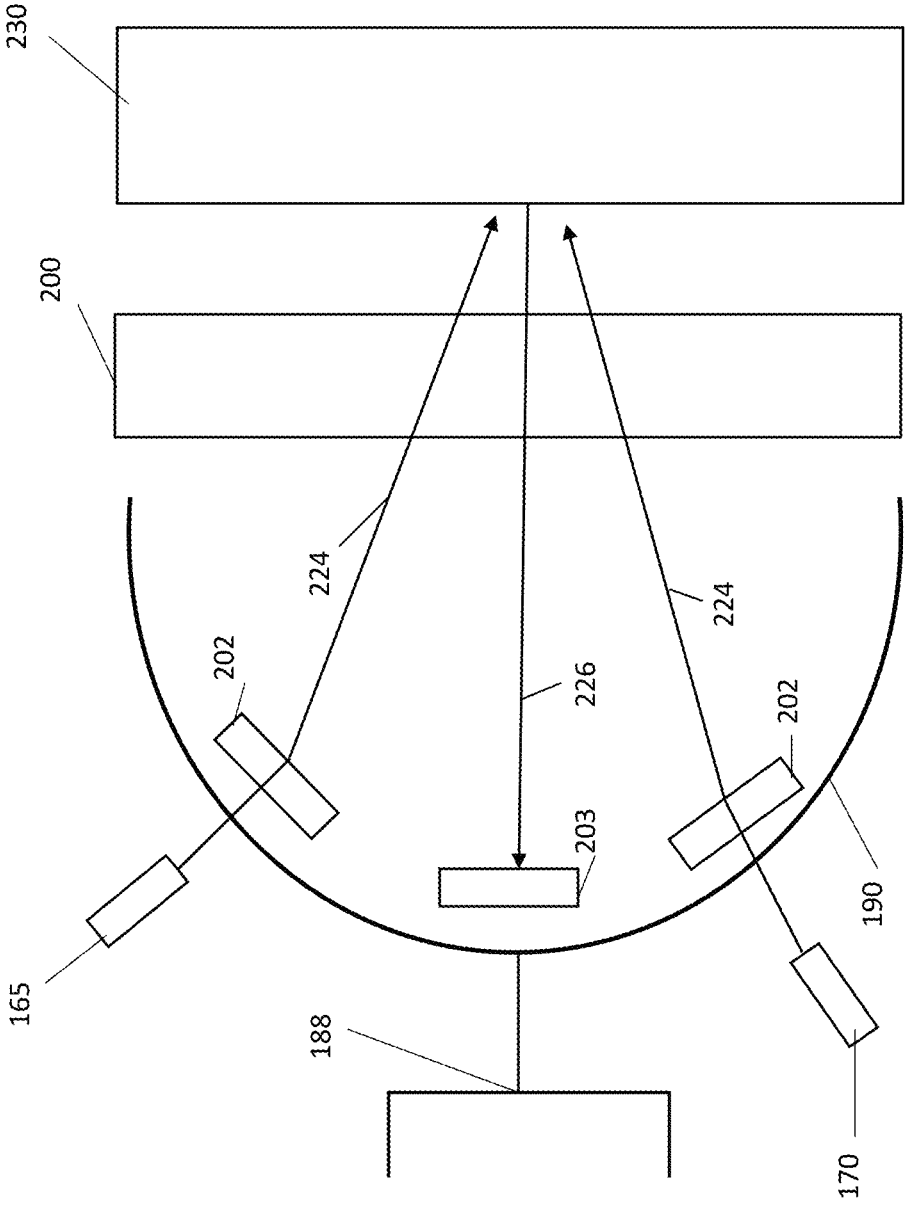
FIG. 11 depicts another cutaway side view of a frontend assembly according to some embodiments presently disclosed.

According to some embodiments presently disclosed, the device 10 performs a first fluorescence analysis (i.e. first fluorescence test) as shown in FIG. 11. A light 224 from at least light source 165 passes through the aperture 196b and the window 200 until it hits the product 230 being tested. Due to material properties of the product 230, at least some of the light 224's wavelengths will be absorbed or reflected by the product 230. According to some embodiments presently disclosed, at least a portion of a light 226 reflected by the product 230 is directed towards the y-coupler 188 through the window 200 and the through aperture 196i. According to some embodiments presently disclosed, the light 226 is a portion of the light 224 that has been reflected by the product 230. According to some embodiments presently disclosed, at least a portion of the light 226 will be directed by the y-coupler 188 to the spectrometer 184 for processing. According to some embodiments presently disclosed, at least a portion of the light 226 will be directed by the y-coupler 188 to the spectrometer 186 for processing. According to some embodiments presently disclosed, at least a portion of the light 226 will be directed by the y-coupler 188 to the spectrometer 184 and the spectrometer 186 for processing.

According to some embodiments presently disclosed, the light 224 is generated by the light source 165 and the light source 170. According to some embodiments presently disclosed, the light 224 is generated by the light source 175 and the light source 180. According to some embodiments presently disclosed, the light 224 is generated by the light source 165, the light source 170, the light source 175, and/or the light source 180. According to some embodiments presently disclosed, the light 224 is generated by activating any combinations of the light source 165, 170, 175, 180. According to some embodiments presently disclosed, the light 224 is at a first wavelength. According to some embodiments presently disclosed, the light 224 is at a wavelength of 365 nm. According to some embodiments presently disclosed, the light 224 is at a wavelength of 395 nm. According to some embodiments presently disclosed, the light 224 is at a wavelength of 405 nm.

According to some embodiments presently disclosed, the device 10 is configured to operate in a second fluorescence imaging mode. According to some embodiments presently disclosed, the device 10 performs a second fluorescence analysis (i.e. first fluorescence test) when operating in the second fluorescence imaging mode.

Figure 12:
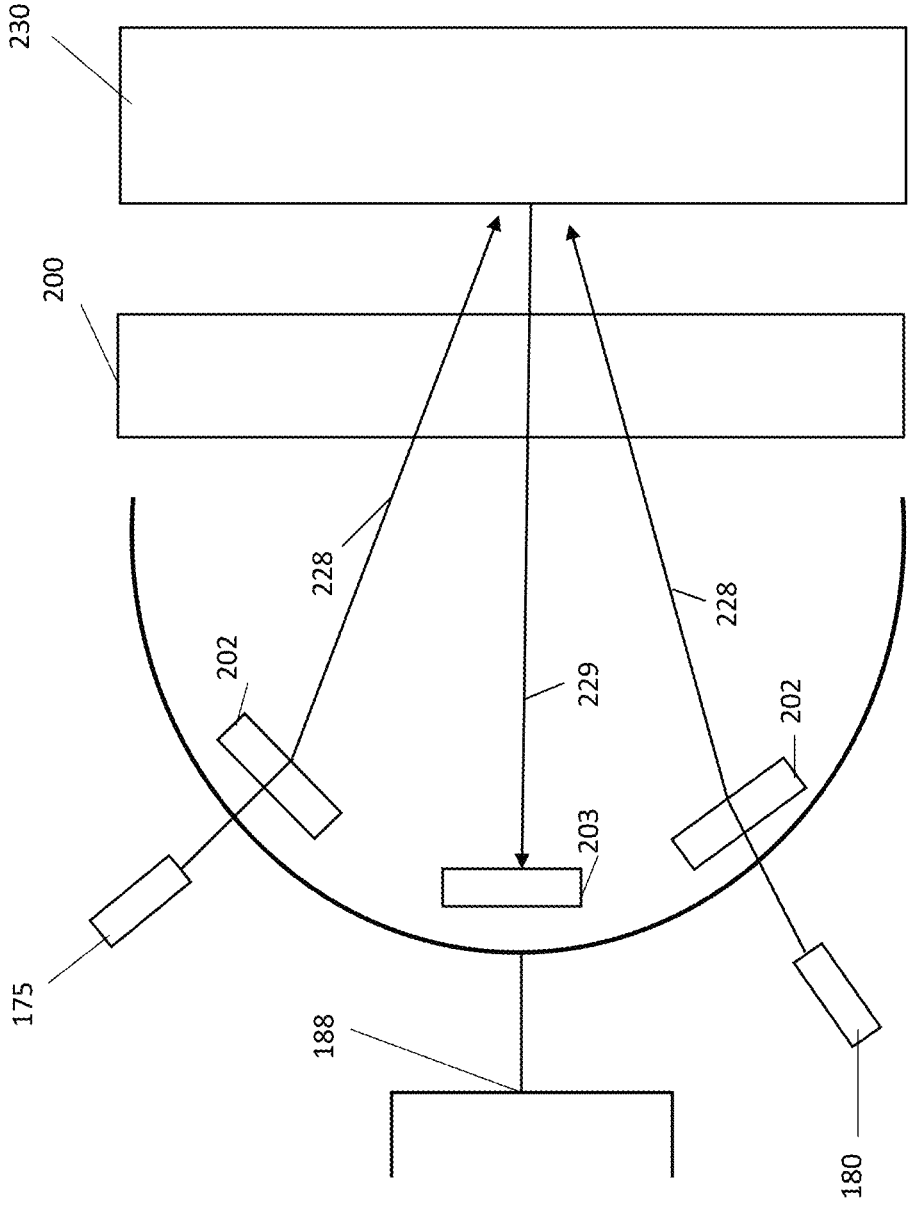
FIG. 12 depicts another cutaway side view of a frontend assembly according to some embodiments presently disclosed.

According to some embodiments presently disclosed, the device 10 performs a second fluorescence analysis (i.e. second fluorescence test) as shown in FIG. 12. A light 228 from at least light source 175 passes through the aperture 196h and the window 200 until it hits the product 230 being tested. Due to material properties of the product 230, at least some of the light 228's wavelengths will be absorbed or reflected by the product 230. According to some embodiments presently disclosed, at least a portion of a light 229 reflected by the product 230 is directed towards the y-coupler 188 through the window 200 and the through aperture 196i. According to some embodiments presently disclosed, the light 229 is a portion of the light 228 that has been reflected by the product 230. According to some embodiments presently disclosed, at least a portion of the light 229 will be directed by the y-coupler 188 to the spectrometer 184 for processing. According to some embodiments presently disclosed, at least a portion of the light 229 will be directed by the y-coupler 188 to the spectrometer 186 for processing. According to some embodiments presently disclosed, at least a portion of the light 229 will be directed by the y-coupler 188 to the spectrometer 184 and the spectrometer 186 for processing.

According to some embodiments presently disclosed, the light 228 is generated by the light source 175 and the light source 180. According to some embodiments presently disclosed, the light 228 is generated by the light source 165 and the light source 170. According to some embodiments presently disclosed, the light 228 is generated by the light source 165, the light source 170, the light source 175, and/or the light source 180. According to some embodiments presently disclosed, the light 228 is generated by activating any combinations of the light source 165, 170, 175, 180. According to some embodiments presently disclosed, the light 228 is at a second wavelength. According to some embodiments presently disclosed, the first wavelength used in the first fluorescence test is different from the second wavelength using in the second fluorescence test. According to some embodiments presently disclosed, the light 224 is at a wavelength of 365 nm. According to some embodiments presently disclosed, the light 224 is at a wavelength of 395 nm. According to some embodiments presently disclosed, the light 224 is at a wavelength of 405 nm.

According to some embodiments presently disclosed, the device 10 performs the first fluorescence test and the second fluorescence test using same light sources operating at first wavelength for the first fluorescence test and operating at a second wavelength for the second fluorescence test.

According to some embodiments presently disclosed, the frontend assembly 182 comprises an optical filter 203 positioned between the window 200 and the aperture 196i. According to some embodiments presently disclosed, the optical filter 203 is a long pass filter.

According to some embodiments, the frontend assembly 182 comprises a spacer ring 231 (shown in FIG. 7) to prevent products 230 from touching the window 200. According to some embodiments, the product 230 may be positioned 2 mm-3 mm away from the window 200.

According to some embodiments presently disclosed, the device 10 performs three modes. The three modes are three spectroscopy modes. The three spectroscopy modes are reflectance imaging mode, first fluorescence imaging mode, and second fluorescence imaging mode as described above.

Figure 13:
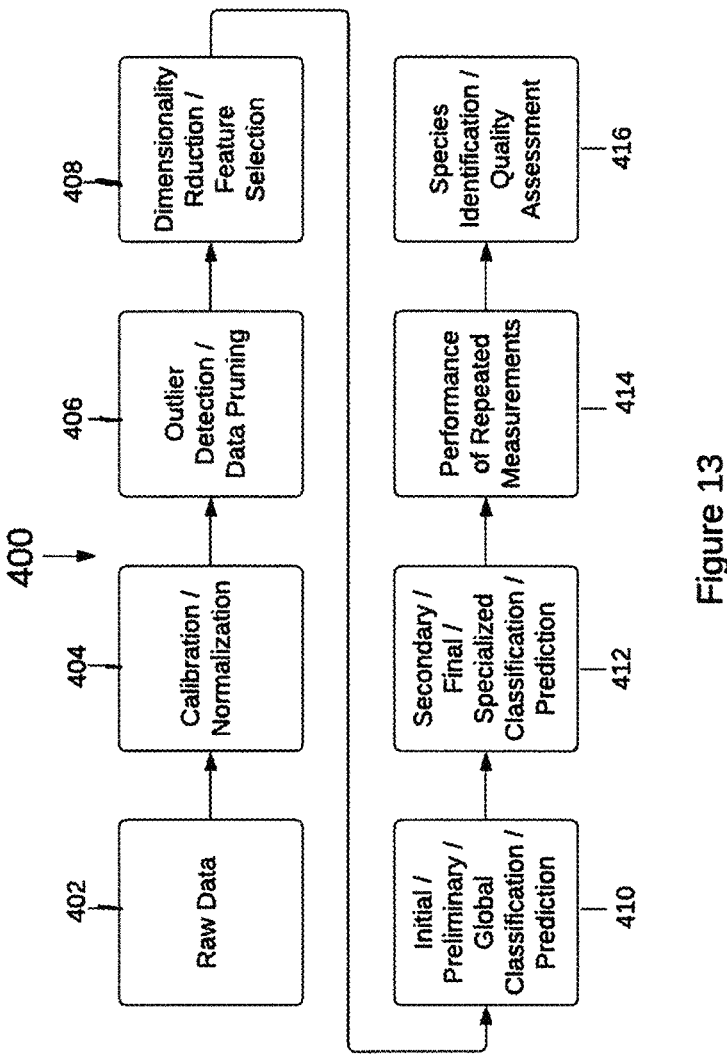
FIG. 13 depicts a method according to some embodiments presently disclosed.

Referring to FIG. 13, a method 400 is shown according to some embodiments presently disclosed. At 402, the device 10 generates raw data for the product 230. The raw data may also comprise dark current data, and/or white reference, and/or spectral data for the tested product 230, and/or exposure times data. The spectral data for the product 230 is based at least on data generated by the first fluorescence test, the second fluorescence test and the reflectance test.

At 404, reflectance data of the product 230 may be calibrated/adjusted by subtracting the dark current and by dividing by the white reference spectra. In order to be able to fuse the fluorescence mode with the reflectance modes the fluorescence data may be normalized using different methods such as, for example, standard normal variate (SNV).

At 406, the outliers may be detected using data quality strategies such as, for example, based on the criterion that they exceed mean+/−twice the standard deviation of all the measurements of the product 230.

At 408, dimensionality reduction may be used to remove redundant information and reducing data from higher to lower level dimensions. Feature selection may also be performed to understand which wavelength bands are more important. More details may be found in an article by Karl Pearson F. R. S., 1901. LIII. On lines and planes of closest fit to systems of points in space. The London, Edinburgh, and Dublin Philosophical Magazine and Journal of Science, 2(11), pp. 559-572, which is incorporated herein by reference in its entirety. More details may also be found in an article by Nicolas Meyer, Myriam Maumy-Bertrand, Frederic Bertrand, 2010. Comparaison de la regression PLS et de la regression logistique PLS: application aux donnees d'allelotypage. Journal de la Societe Francaise de Statistique, 151(2), pp. 1-18, which is incorporated herein by reference in its entirety.

At 410, single mode initial/preliminary/global classification may be performed for each of the three spectroscopy modes to obtain their initial predictions. According to some embodiments, the three spectroscopy modes are based at least on data generated by the first fluorescence test, the second fluorescence test and the reflectance test. The data from all three spectroscopy modes may be fused in two ways: decision level fusion and feature level fusion as shown in FIGS. 16-19 described below.

At 412, secondary/final/specialized classification methods such as, for example, sub-model analysis, ensemble stacking, decision-making system such as, for example, voting, weighted sum or other methods may be implemented to improve the accuracy. The sub-model technique improves the accuracies of low performing species, while ensemble stacking increases the overall accuracy by using multiple complimentary classification models. According to some embodiments, the combination of fusion, stacking and sub-model may be implemented on the quality adulteration and traceability (QAT) device chip. At 414, the performance of the models may be improved by measuring multiple points on the product 230 and increase in performance may be evaluated. At 416, the product 230 is identified.

Figure 14:
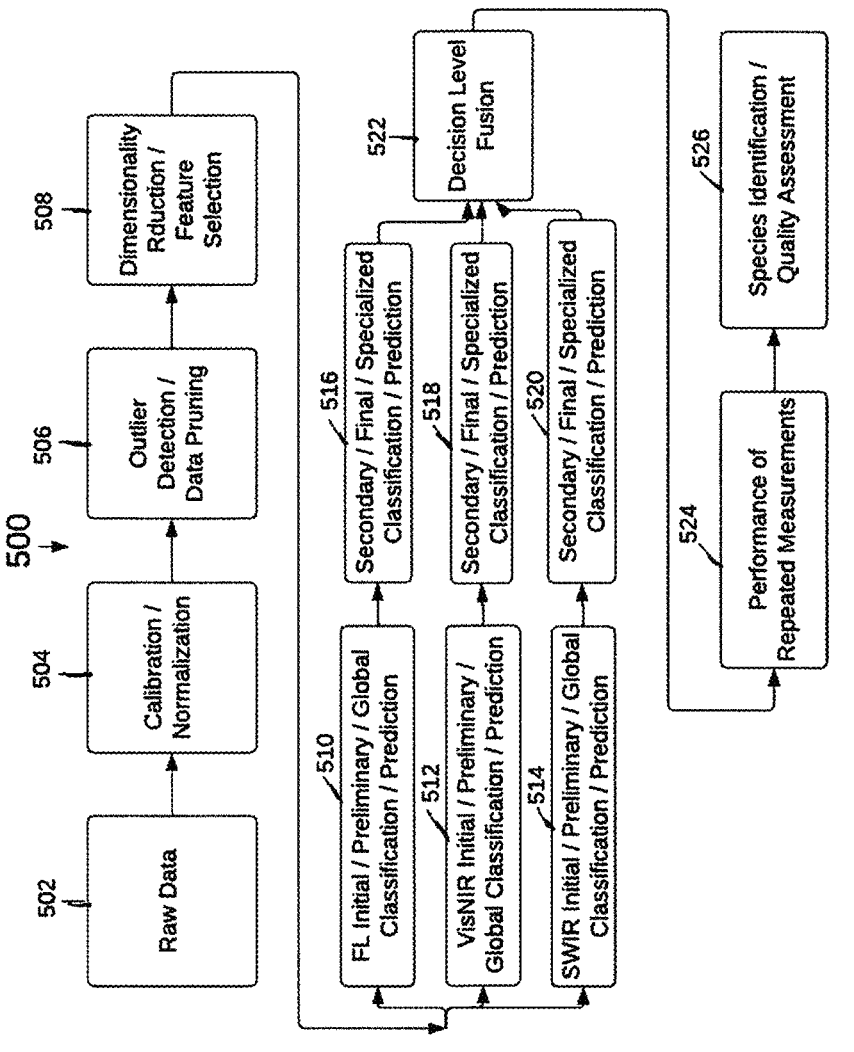
FIG. 14 depicts another method according to some embodiments presently disclosed.

Referring to FIG. 14, a method 500 is shown according to some embodiments presently disclosed. According to some embodiments, the method 500 provides Artificial Intelligence (AI)/Machine learning (ML) for decision level fusion. At 502, the device 10 generates raw data for the product 230. The raw data may also comprise dark current data, and/or white reference, and/or spectral data for the tested product 230, and/or exposure times data. The spectral data for the product 230 is based at least on data generated by the first fluorescence test, the second fluorescence test and the reflectance test.

At 504, reflectance data of the product 230 may be calibrated/adjusted by subtracting the dark current and by dividing by the white reference spectra. In order to be able to fuse the fluorescence mode with the reflectance modes the fluorescence data may be normalized using different methods such as, for example, standard normal variate (SNV).

At 506, the outliers may be detected using data quality strategies such as, for example, based on the criterion that they exceed mean+/−twice the standard deviation of all the measurements of the product 230.

At 508, dimensionality reduction may be used to remove redundant information and reducing data from higher to lower level dimensions. Feature selection may also be performed to understand which wavelength bands are more important.

At 510, initial/preliminary/global single mode classification may be performed for fluorescence classification to obtain its performances. At 516, a secondary/final/specialized classification such as, for example, a sub-model analysis and/or ensemble stacking may be implemented on data from 510 to improve the accuracy of low performing species.

At 512, initial/preliminary/global single mode classification may be performed for reflectance classification. At 518, a secondary/final/specialized classification such as, for example, a sub-model analysis and/or ensemble stacking may be implemented on data from 512 to improve the accuracy of low performing species.

At 514, initial/preliminary/global single mode classification may be performed for reflectance classification. At 520, a secondary/final/specialized classification such as, for example, a sub-model analysis and/or ensemble stacking may be implemented on data from 514 to improve the accuracy of low performing species.

At 522, the data from 516, 518 and 520 may be fused in decision level fusion. In decision level fusion, the predictions of the three single-mode models are entered into a decision mechanism such as, for example, majority vote, weighted sum or any other method where the final prediction will be the specie/freshness that most modes predict.

At 524, multiple measurements are taken from the sample for example the fillet to increase the amount of data which increases the chance of correct prediction. According to some embodiments, combination of fusion, stacking and sub-model may be implemented on the quality adulteration and traceability (QAT) device chip. The improvement in the performance of the models may be evaluated by increasing the number of measured points. At 526, the product 230 is identified.

Referring to FIG. 15, a method 600 is shown according to some embodiments presently disclosed. Although fish is being used, it is only an example and this method may be used on other products 230.

Presently disclosed sub-model technique allows to differentiate between fish species whose data are similar and the global model struggles to classify. The dataset is split into training and test sets. The sub-model technique may be implemented and evaluated as follows.

At 610, presently disclosed system and method may perform training and evaluation of the global model. The training set 602 is fed into a model 603 called Global Model to train it. The performance of the Global Model is evaluated using the test set. The confusion matrix is examined to identify low performance fish species. The fish species that the low performance species are predicted as are identified. Each set of similar fish species form a sub-model. Each sub-model either calls all the species not in that submodel "other" (option a) or removes them (option b).

At 615, presently disclosed system and method may perform training and evaluation of sub-model(s). The training data is relabeled to match each of the sub-model(s). Relabeled training data may be fed into each sub-model to train all the sub-models. The performance of each sub-model may be assessed against the test set.

At 620, presently disclosed system and method may implement and evaluate Global-plus-Sub-model. The test set may be fed into the Global model. If the predicted specie is not in any of the sub-models then the global model is passed as the prediction of the Global-plus-Sub-model. If the predicted specie is in any of the sub-models then the data point is fed into the sub-model and the prediction is passed as the prediction of the Global-plus-Sub-model. In option b, if the submodel predicts "other" then the Global model's prediction is passed as the global-plus-submodel's prediction. The performance of the Global-plus-Sub-model is compared with the performance of the Global model.

Referring to FIG. 16, a method 700 is shown according to some embodiments presently disclosed. The method 700 is an ensemble stacking method for single mode spectroscopy. In stacking method, training data 710 is fed into three base models 702, 704, and 706. The base models 702, 704, and 706 may be selected to diversify the classification approaches. The base models 702, 704, and 706 may be, for example, k-nearest neighbor (KNN), random forest (RF) and logistic regression (LR). The initial predictions 712, 714, 716 of the base models 702, 704, and 706 are appended as features to the original training set 710. This new data set (i.e. combination of 710, 712, 714, 716) acts as the training set for another classification method 720. The classification method 720 may be, for example, Meta Model. Meta Model may be chosen based on performance, for example, linear discriminant analysis (LDA). Output of the classification method 720 is final prediction 722.

Referring to FIG. 17, a method 800 is shown according to some embodiments presently disclosed. The method 800 is an ensemble stacking method with feature level fusion. According to some embodiments, data 801 is generated by concatenating data from the first fluorescence test, the second fluorescence test and the reflectance test to form one large data set 810. The data set 810 is fed into three base models 802, 804, and 806. The base models 802, 804, and 806 may be selected to diversify the classification approaches. The base models 802, 804, and 806 may be, for example, k-nearest neighbor (KNN), random forest (RF) and logistic regression (LR). The initial predictions 812, 814, 816 of the base models 802, 804, and 806 are appended as features to the original training set 810. This new data set (i.e. combination of 810, 812, 814, 816) acts as the training set for another classification method 820. The classification method 820 may be, for example, Meta Model. Meta Model may be chosen based on performance, for example, linear discriminant analysis (LDA). Output of the classification method 820 is final prediction 822.

Referring to FIG. 18, a method 900 is shown according to some embodiments presently disclosed. The method 900 is a decision level fusion with a decision-making mechanism 918 such as, for example, voting, weighted sum, etc. According to some embodiments, data 901, 903, 905 from each of the three spectroscopy modes (i.e. the first fluorescence test, the second fluorescence test and the reflectance test) are fed into its own base model 902, 904, 906. The base models 902, 904, 906 may be selected to diversify the classification approaches. The base models 902, 904, 906 may be, for example, k-nearest neighbor (KNN), random forest (RF) and logistic regression (LR). The initial predictions 930, 931, 933 from the Base Models 902, 904, 906 enter a decision-making mechanism 918. Output of the decision-making system 918 is final prediction 922. According to some embodiments, Base Models 902, 904, 906 may be used to predict the specie/freshness.

Referring to FIG. 19, a method 1000 is shown according to some embodiments presently disclosed. The method 1000 is a decision level fusion with stacking and a decision-making mechanism 1026 such as, for example, voting, weighted sum, etc. According to some embodiments, data 1001, 1003, 1005 from each of the three spectroscopy modes (i.e. the first fluorescence test, the second fluorescence test and the reflectance test) are fed into multiple base models 1002, 1004, 1006. The base models 1002, 1004, 1006 may be selected to diversify the classification approaches. The base models 1002, 1004, 1006 may be, for example, k-nearest neighbor (KNN), random forest (RF) and logistic regression (LR).

The initial predictions 1012, 1014, 1016 of each of the base models 1002, 1004, and 1006 are appended as features to data 1001, 1003, 1005. The combination of 1001, 1012, 1014, 1016 acts as the training set for another classification method 1020. The combination of 1003, 1012, 1014, 1016 acts as the training set for another classification method 1022. The combination of 1005, 1012, 1014, 1016 acts as the training set for another classification method 1024. The classification methods 1020, 1022, 1024 may be, for example, Meta Model. Meta Model may be chosen based on performance, for example, linear discriminant analysis (LDA).

The output from the classification methods 1020, 1022, 1024 enter a decision-making mechanism 1026. Output of the vote system 1026 is final prediction 1028.

Using multiple base models may allow for diversity and for each model's predictions and errors to remain uncorrelated from each other. The meta model may also be trained on a dataset of just the base models' predictions and accuracies may be compared to evaluate the improvement due to ensemble stacking technique. LDA may be chosen for the meta model.

According to some embodiments, decision-making systems 918, 1026 may be implemented using, for example, majority vote, weighted sum, etc. When voting, the majority verdict may be deemed as the final prediction 922, 1028. In the low probability event where the predictions from the three spectroscopy modes happened to be different, the mode that consistently garnered the highest accuracy may be used.

According to some embodiments presently disclosed, the optical sensor 25 and the display 70 may be used to position the frontend assembly 182 directly over a predetermined area of the products to perform the three spectroscopy modes (i.e. a first fluorescence imaging mode, a second fluorescence imaging mode, and a reflectance imaging mode). According to some embodiments presently disclosed, a user of the device 10 may view the display 70 to view images generated by the optical sensor 25. Once the display 70 shows the area of the product to be tested, the user may perform the three spectroscopy modes on that area of product. According to some embodiments, the optical sensor 25 is aligned with the frontend assembly 182 so as to generate images on the display 70 of an area aligned with the frontend assembly 182.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another, i.e. may include transitory and/or non-transitory computer readable media. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Blockchain and/or the Internet of Things (IoT) may be implemented to provide traceable supply chain systems by incorporating immutability, transparency, and distributed trust mechanisms that promote secure data sharing and interactions between various stakeholders in trustless environments. A smart Blockchain IoT-enabled product (i.e. fish) supply chain framework in which a distributed ledger technology may be utilized to enable the trackability and traceability of the fish products through the supply chain.

According to some embodiments presently disclosed, a presently disclosed framework may be able to provide valuable and timely information that can be used to track and trace the fish product throughout harvesting, processing, packaging, shipping, and distribution to the final delivery. According to some embodiments presently disclosed, the presently disclosed framework integrates machine learning into supply chain systems to ensure product authenticity and promote anti-fraud capabilities.

Although presently disclosed embodiments pertain to fish and fish related products, it is to be understood that similar steps and/or framework can be applied to any other products that may benefit from tracking and/or ensuring product authenticity.

Raw fish often undergo several processing stages before they reach their final destination. During this journey, fish and any other food products may be mislabeled, counterfeited, and/or fraudulently substituted. Consumers and retailers, as well as the global seafood industry's reputation, are affected by fish fraud, such as substituting fish species with cheaper varieties. Complex supply chains can go through numerous entities and span multiple international and domestic intermediaries, which makes it difficult to pinpoint details on the product's safety or quality. As a result, methods that document the seafood's geographical origin, monitor species specifications, and record production cycles are essential to ensure consumer confidence in the product's origin and quality and allow authorities and government agencies to effectively enforce regulations to contain potential risks.

Currently, supply chain participants maintain information locally in separate databases or use traditional bookkeeping methods, which makes it very difficult to track and trace a fish product from its source to its destination. Using these supply chain methods allows illegal and unethical access to data, which results in an increased need for effective illicit activity prevention and detection methods, creating the need for an entirely trustworthy and traceable supply chain system.

According to some embodiments, a presently disclosed system tracks and traces the fish product's path through the supply chain and record, for example, the GPS coordinates of where the fish was caught until it reaches its destination.

According to some embodiments, the presently disclosed system implements Blockchain to support perishable product traceability and authenticity in supply chain systems, particularly fish or seafood products, when integrated with the Internet of Things (IoT). According to some embodiments, the presently disclosed system integrates Blockchain with IoT to enhance data collection, allow long-term preservation, and prevent illegal, unreported, and unregulated practices, and creating a fully traceable supply chain system.

According to some embodiments, the presently disclosed system may further combine edge computing, artificial intelligence (AI), and machine learning (ML), to realize significant benefits related to Blockchain use in different fields such as, for example, supply chain systems.

According to some embodiments presently disclosed, the information collected throughout a traceable supply chain using Blockchain may be securely registered on a distributed unchangeable database system available to all partners in the chain. IoT-enabled devices, such as wireless sensors, RFID, GPS chips, spectroscopy, and imaging devices, may be used to sense, actuate, and collect data. This data may be securely processed, communicated, stored, shared, and distributed through the Blockchain network for stakeholder access.

Blockchain's traceability enables supply chain parties to trace fish products all the way back to the point of harvest. According to some embodiments presently disclosed, tracing may be obtained while the product is navigating the processing, manufacturing, distribution, and shipping stages up to delivery to the end consumer, allowing stakeholders to keep track of the product's biological and physical characteristics, such as temperature, humidity, and microbiological features.

According to some embodiments, the presently disclosed system provides a layered architecture for a smart Blockchain IoT-enabled fish supply chain system framework that enables trackability and traceability when sharing the information and validated status of fish products throughout harvesting, processing, packaging, shipping, distribution, and final consumer delivery to all stakeholders.

Blockchain can be defined as a peer-to-peer (P2P) trusted immune distributed ledger technology (DLT) suitable for secure communication between untrusted parties in a decentralized architecture. Every participating node has a copy of the shared ledger, where any modification is achieved through consensus between a specific group of nodes, also called miners, voters, or peers. Miners are full Blockchain nodes selected in accordance with the terms and policies of the chosen consensus protocol. Miners are responsible for verifying and validating transactions in terms of data and identity using the consensus protocol.

The shared digital ledger consists of records called blocks. Each new block of verified transactions that have been cryptographically secured and are then unchangeable is appended to the existing chain of blocks. Each block consists of the active data, a timestamp, a cryptographic hash of the previous block, and a cryptographic hash of the current block.

Although Blockchain technology may be used in digital cryptocurrency, the presently disclosed system implements Blockchain technology to provide better security against possible data fraud or attacks and vulnerabilities in supply chain. Blockchain, especially with IoT, is a potential approach for achieving node identification, secure authentication and communication, safe resource accessibility, and distributed storage. According to some embodiments, the presently disclosed system may be implemented in fields such as supply chain, agriculture, healthcare, digital energy and smart grid, automotive industry, smart home, and financial applications.

According to some embodiments, the presently disclosed system utilizes Blockchain, IoT, and machine learning, to build fully transparent decentralized traceability systems that share product information between all authorized stakeholders. The presently disclosed system may allow the industry to operate more efficiently and profitably. Blockchain ensures reliable proof of authenticity of fish origins or fish delivery quality to consumers so they can securely and easily access trusted information sources using their mobile handheld devices.

Fish supply chain systems is a dynamic group of interactions between harvesters, suppliers, public health authorities, manufacturers, shippers, retailers, and customers. Fish and seafood are vital temperature-sensitive products; therefore, traceable supply systems must deliver the right product at the right price, in the right condition and quality, and at the right time.

Software traceability may be defined from a software engineering perspective as the extent to which uniquely identifiable software artifacts can be related to one another in the software life cycle development while maintaining interrelated links over time. Examples include establishing the relationship between design elements and software specifications, design and software testing, requirements, and architectural design. Traceability can be categorized into horizontal and vertical. Horizontal traceability establishes the relationship between elements of the same artifacts, such as design elements, whereas vertical traceability establishes the link between different artifacts at different levels of abstraction.

Software traceability, from a supply and chain perspective, has a different definition, with the goal of 1) increasing supply chain visibility, openness, transparency, neutrality, and reliability; 2) improving quality control and regulation compliance; 3) reducing possible risks and enhancing public safety; and 4) managing logistic operations and enhancing inventory tracking and product recalls. Alternative definitions of traceability in the supply chain may include the ability to trace the data history, such as the chain of custody, associated with the product from the consumer back to the producer. Digital data sharing systems, such as electronic record-keeping systems, may be used to track and trace the product's movement through the supply chain.

Traceability may be classified as external or internal traceability in the context of the supply chain. External traceability may require all traceable artifacts to be uniquely identified, with information shared between all participating entities, such as consumers and distributors, manufacturers, and other stakeholders. Internal traceability may require enforcing a set of rules within a company to establish a proper relationship between the raw materials to produce the final products.

According to some embodiments presently disclosed, Blockchain improves traceable supply chain systems. Interfacing smart Blockchain-based supply chain systems with anti-fraud and tracking technologies, such as RFID and Wireless Sensor Networks (WSN), enables presently disclosed system to track the product data and detect counterfeit and fake products.

According to some embodiments, the presently disclosed system provides key quality attributes, including, for example, performance, security, privacy, scalability, latency, integrity, and usability.

Blockchain creates new forms of distributed and decentralized software architectures in which a ledger's shared state can be reached across a network of untrusted participants without relying on a single authority.

Blockchain(De)centralization may be determined by the access it offers to system entities, either public or limited to certain participants who have the right to access the Blockchain network. Blockchain can be either: 1) fully decentralized (public), 2) fully centralized (private), or 3) partially centralized or partially decentralized (consortium). Public Blockchains have better transparency and audibility; however, they sacrifice privacy. Private Blockchain is typically more efficient and has fewer nodes than public Blockchain, but it usually sacrifices decentralization for speed. Consortium Blockchains are controlled by a set of nodes with specific privileges for validating transactions between multiple organizations. Private or consortium Blockchains offer better options if the network is governed and hosted by one or few organizations since they can control the number of participants and protect their sensitive information by specifying who can access the system. This option would be best for SC systems.

Data storage and computation operations can be performed on-chain or off-chain, or with external storage. The heavyweight approach involves storing data and metadata, or the state of data, on-chain. The lightweight approach involves storing the core ledger data and metadata on-chain, allowing it to be accessed by the public. The actual data and the data required by smart contracts for verification and documentation are stored off-chain, including sensitive stakeholder information. Off-chain data is usually linked to on-chain data through a type of hash identification generated using Secure Hash Algorithm (SHA). Off-chain storage is useful for keeping large files containing additional information or when storing information requires more space than the Blockchain supports such as images or videos.

Consensus protocols are responsible for maintaining integrity and security in Blockchain-based systems. Several consensus protocols may be used to enforce a majority agreement among nodes to validate transactions. Every new block of verified transactions may be appended to the existing chain under the agreement of the consensus protocol. Examples of these protocols include, for example, Proof of Work (PoW), Proof of Sake (PoS), Proof of Authority (PoA), Proof of Elapsed Time (PoET), and Proof of Byzantine Fault Tolerance (PBFT). Each protocol has its own set of benefits and drawbacks, and each is best suited for a specific application.

System requirements are represented by identifying system use cases and abuse or misuse cases. Use cases generally describe the list of actions or event steps that define the interactions between an actor or a device and a system to achieve a specific function. Understanding the use cases of the proposed system for each actor or device can help identify the functionality of each entity in the system and how it responds to requests.

Abuse or misuse cases define the acts that cause intentional system violation; therefore, security requirements must be determined. The system is exposed to one or more of the following events in these circumstances, including 1) faults and failures in the data generation or device functionalities, or 2) misbehaviors by system actors or cyber-attacks that target system devices, aimed at harming the system through identified abuse or misuse cases that risk system security. Examples of abuse or misuse cases include product fraud, sensor tampering, sensor feed modification, network cyber-attacks, and transaction repudiation.

According to some embodiments, the presently disclosed Blockchain-based fish supply chain system may be defined through 1) a set of use cases describing the transactional processes on the supply chain for fish traceability back to its origin, and 2) a set of abuse cases that determine security requirements to control illegal, unreported, and unregulated activities such as fraud, substitution, other kinds of violence, and possible risks at any point in the chain.

Referring to FIG. 20, a system framework is shown according to some embodiments presently disclosed. According to some embodiments, the presently discloses system framework is layered architecture. The presently discloses system framework may comprise four architectural layers: Supply Chain layer 1200, IoT layer 1205, knowledge layer 1210, and application layer 1215.

The supply chain layer 1200 depicts the interactions between the actors who play the role of nodes that are communicating and transacting with each other in the chain's physical flow. The IoT layer 1205 may be represented by IoT-enabled devices, sensors, and actuators that are connected through the IoT cloud to the supply chain system to monitor and collect traceability data that will be stored in the Blockchain. The knowledge layer 1210, or Blockchain layer, may be used to store all data activities, such as transactions, that occur during the supply chain operations in the form of data blocks that are encrypted and controlled by the smart contract and distributed to each involved entity. The application layer 1215 may provide the applications that extract the different functionalities and integrate the end-users with system services so they can view the data.

According to some embodiments presently disclosed, the supply chain layer 1200 represents the physical flow of the fish, which begins with the suppliers or harvesters who capture or harvest fish species as raw materials from their natural sources such as the sea, lakes, rivers, or aquaculture farms. Fresh fish is then typically bid and sold at fishery auction traders, then packaged and sent through the international and domestic intermediaries, such as processing plants, manufacturers, distributors, and retailers, to the end customer.

Fish can be sold, processed, packaged, stored, and transported multiple times by different intermediaries in its process life cycle. For instance, fish may be frozen, salted, or transformed into several types of fish products, repackaged in bulk or individually, then shipped to distributors to be stored or distributed according to retailer contracts. Mass products might be repackaged into individual items to be sold to the end-user at retail stores and markets.

Fish is a temperature-sensitive product that requires the upkeep of a cold chain throughout its journey, from fishery to consumer. IoT-enabled vehicles or refrigeration trucks may be used for distribution channels, which are four to eight times more expensive than normal logistic services. These refrigeration trucks keep the fish product safe in a controlled environment; therefore, every stage of the supply chain is typically followed by a quality and safety assessment to ensure compliance with regulations.

According to some embodiments, the presently disclosed system divides the supply chain into 1) a Harvester (Raw fish supplier): catching fish, registering raw fish, and packaging; 2) Manufacturer (factories, fishing docks): grading, fish processing, manufacturing, product registering with a unique number, and packaging. Fish products must be re-registered and uniquely identified with a batch number if they are packaged into batches; 3) Distributor (delivery companies, warehouses, storage hubs): packaging, delivering, classifying, quality checking, standardizing, tracking, and storing; 4) Safety and quality regulators (government food safety inspectors, certifiers, auditors): inspecting, grading, penalizing, licensing, and standardizing. Inspectors, certifiers, and auditors are classified as system users. System users may carefully observe trusted data sources concerning the process of production and provenience to assign certifications, such as organic or bio labels; 5) Retailers (markets, supermarkets, wholesale stores, retail shops): receiving, packaging, classifying, selling, storing, distributing, and marketing; 6) Customers: buying, returning, quality checking, reporting, and consuming. Customers or end-consumers may interact with the presently disclosed system by querying fish product data, which is permanently stored in the Blockchain; 7) Other actors may involve software developers and project coordinators.

The actors in the presently disclosed Blockchain IoT-based supply chain system can be divided into three categories Blockchain: 1) non-authenticated parties, 2) authenticated parties, and 3) anonymous. Non-authenticated parties represent parties that are yet to authenticate themselves. Those parties may register and log in, which will be accepted or denied by the system. Authenticated parties that represent the minors are permitted to join the system. The platform provides different access credentials for each party to allow specific functionalities such as add, edit, remove items, or read-only. Anonymous users do not need to register or be authenticated and can only access the system to consult system information and query product data.

The IoT layer 1205 may be built upon two technologies: 1) Blockchain and 2) edge computing, in addition to physical IoT-enabled devices. The IoT layer 1205 may be imagined as a three-tier architecture consisting of an IoT device, edge server, and cloud tier as shown in FIG. 21. Presently disclosed architecture, with Blockchain deployment Blockchain, may support security and trust establishment, while edge computing aims to move the computation load and storage at the edge devices rather than being completely performed at the cloud, ensuring higher system efficiency and scalability. Presently disclosed architecture may provide a distributed platform that integrates computation, storage, networking, and application processing capabilities to provide better resources to end system users.

Edge computing may be used to address issues such as latency, a device's limited battery, bandwidth, security, and privacy. The edge computing may provide full use of local/cloud resources, increases network response, and reduces energy consumption by moving storage and computation from cloud to edge. The presently proposed system may deploy Blockchain in the cloud for time and energy-consuming data mining processes with large data volumes, while data sensing and preprocessing for small volumes may be performed locally at the edge devices. According to some embodiments, the presently disclosed process may be made possible by deploying smart functioning sensors that incorporate Micro-Electro-Mechanical System (MEMS) technology. These sensors may perform data processing and analysis at or near the source resulting in reduced amounts of data movements between the platform and device. Intensive computing tasks may be offloaded from IoT devices to edge servers and offloaded from an edge server to other edge servers or the cloud for better load distribution.

IoT-enabled devices at the IoT device tier may be used to collect the track and trace data. This tier may be enabled by wireless sensors to monitor temperature, humidity, dissolved oxygen, salinity, carbon dioxide, RFID devices, machine-readable optical labels such as QR codes and bar codes, smart weighing devices, survey cameras, handheld contamination inspection devices, and GPS trackers.

IoT-enabled devices for the presently disclosed system may comprise 1) Wireless sensors. Wireless sensors may be placed at strategic points on the chain and have both identification and sensing capabilities. These sensors may communicate precise measurements continuously, called polling, or upon request. For instance, the sensor measures the temperature, initiates a packet, and communicates wirelessly with the nearest server to monitor a shipping truck's temperature. Each packet may contain a unique track-and-trace number for the current measurement associated with the sensor device's MAC address. The sensor may store the track-and-trace number in the sensors' memory if the server is temporarily not accessible and can be automated to measure, record, and store the temperature regularly. The track-and-trace number may be used to obtain the temperature data that may be sent to the smart contract for verification once the packet is received at the destination. The smart contract then verifies the temperature values and responds to the requester if it is within the specified limits or not. 2) IoT-enabled optical scanning devices or tablets/smartphones with cameras. These devices may read RFID tags or machine-readable optical labels such as QR codes and bar codes, known as tagging systems, which report product information with the track and trace readings collected along the way until the product is delivered to the customer. RFID tags, for example, are unique digital cryptographic identifiers that may connect physical items to their virtual identities. RFID tags may be attached to each fish container or packing case to track the shipment and read its location as it travels through the chain. RFID tags may be more convenient than bar codes but have a higher cost. RFID tags may be attached to the fish containers and packing cases, while the bar codes are usually used for labeling individual products. 3) Smart weighting devices. These devices may be used for weighing the fish caught during fishing operations. Weight logging could be automated to help forecast the landing date to the selected destination. 4) On-board survey cameras and electronic monitoring systems. These systems may identify interactions with by-catches and protected fish species. 5) Automated handheld imaging inspection devices. These devices may check fish freshness and possible microbiological and chemical contamination in fish species or fish farms. For instance, a contamination and sanitization inspection system handheld device 10 described above may be used to measure fish freshness and fecal contamination. The presently disclosed device 10 may be used for inspecting several kinds of other products in an supply chain system. The device 10 is efficient for detecting possible contamination and adulteration. 6) GPS trackers. These trackers may be used for real-time location determination and detailed tracking information for products along the supply chain, including geo-location, speed, and time.

The edge devices at the IoT edge tier are finite resources; therefore, their participation in Blockchain as a data source is facilitated by more capable servers found in upper layers, at the edge and on the cloud. The edge server tier is located at the middle of the architecture near the IoT-enabled devices. Edge servers can efficiently perform computational and analytical tasks, including hash computation, encryption and decryption, and mining assigned to nearby end devices. These tasks may be offloaded from the devices and outsourced to edge servers for execution and data analysis. Edge technology, equipped with analytical models in IoT settings, may be used to securely perform diagnostic, descriptive, and predictive analytics faster and cheaper. The cloud tier, located on top of the network architecture at the far end, consists of interconnected cloud servers that represent a large data center providing core cloud services and processing requests from the edge servers.

The Blockchain ontology 1210 relates to the business operations and processes of the potential enterprise adopters. The Blockchain ontology may be used to understand how data is exchanged over the Blockchain-based network. The Blockchain ontology is responsible for describing and addressing nodes such as sensors, actuators, objects, devices, and services while providing an essential level of abstraction to manage heterogeneity and interoperability. A Blockchain's ontology may distinguish the different key components, including nodes, transactions, blocks, smart contracts, ledgers, and consensus as shown in FIG. 22.

Transactions have information about the product movements along the supply chain's life cycle as shown in FIG. 23. Transactions may include data for events related to transportation, processing, testing, value-added activities, packing, storage, and logistics actions. The transactions may contain geo-locations, departure and arrival times, transit times, operations such as processing, sorting, packaging, and quality checking, farm names, sensor readings, fish types, batch numbers, batch quantities, best-by dates, expiration dates, brands, colors, product labels, weight, storage conditions, inspections, and quarantine information. The presently disclosed process creates a digital record to prove provenance compliance, authenticity, and quality.

Supply chain management may comprise different types of transactions in which each transaction has data associated with, for example, a particular entity or object. The number of transactions and execution times are expected to be reduced for all transactions with the established trust using, for example, Blockchain. Multiple transactions may be verified, validated, and then bundled into a block within every period of time. Every transaction bundle may be monitored and agreed on by peer nodes, which execute smart contracts when a triggering event occurs. Blocks may be securely interconnected and stored to be accessed only by stakeholders with distributed ledger technology.

The distributed digital ledger is a collection of replicated, shared, and synchronized data spread across registered and authorized Blockchain network participants Blockchain. This ledger may provide secure storage for IoT physical device configurations and sensing data. Peers may vote on any update to agree upon a change if modifications are made to the ledger. Each node then receives a copy of any changes recorded on the ledger. The digital ledger database makes the presently disclosed system more transparent, reliable, and, most importantly, without third party interference.

Smart contracts are another key Blockchain component Blockchain that may ensure the system's transparency, security, and autonomy. Smart contracts use the agreed-upon trade rules and regulations to ensure trust between stakeholders when joining the Blockchain network in the supply chain. Smart contracts may add flexibility and power to program business logic aligned with preset conditions in cases such as order verification, inventory update, and payment trigger. Requirements and compliance with regulations are also ensured, and traceability constraints may be enforced. This functionality is built into the smart contracts and occurs when data is fed into the Blockchain, allowing the fish products to move freely through the supply chain.

According to some embodiments, manufacturers and processing companies may bid on fish using smart contracts after receiving fish products from farmers. Verification and validation are performed by peer nodes. The smart contract may be automatically triggered when these nodes agree on a set of conditions, and the transactions are then recorded on the Blockchain.

Contained data in the Blockchain can be categorized into Track, Trace, and informative data for supply chain applications. Track data records a history of the product's microbiological and physical parameters, such as temperature, humidity, and microbiological information, to recognize any changes or variations in the ingredients or conditions. Trace data comes as a graph of coordinates on a geographical map that can be used to represent the past and current history of the fish product's geographical locations. This information may ensure the fish product's safety and quality at each stage of the chain. Informative data often takes the form of food and nutrition information that supplements track and trace information. This data may be used to enhance the product's end stories presented to the customer. The presently disclosed system may presents the track and trace data in the form of a chain of events when any of the stakeholders try to retrieve the data associated with any fish product.

The need to store massive amounts of data is one of the Blockchain challenges that may causes a significant reduction in system performance. According to some embodiments, presently disclosed system may use a hybrid approach of both on-chain and off-chain storage, where on-chain stores the primary ledger and metadata to all nodes on the Blockchain network, while off-chain stores the large documents and data required by smart contracts for verification and documentation. An example of using off-chain storage is when retailer A purchases a fish product from supplier B. Retailer A determines the product's details, such as unique identifier, source entity, and receiving entity. The retailer also determines the number of batches that need to be delivered and the timestamp. The shipper takes a snapshot of the shipped product as evidence of delivery. The purchase and delivery agreements are stored in an off-chain content management system with on-chain evidence, while the shipper's photo evidence of the merchandise in the retailer's possession is kept in an off-chain database.

Cryptographic hashes stored in the ledger may identify the corresponding data off-chain. Private Blockchain may be used for applications that have sensitive business data or place restrictions on who has the authority to manipulate the data. Access control lists (ACL)s may add granular data access rights based on each participant's role in the system and manages trust between them through rewards or penalties based on the smart contract's output.

Hyperledger Fabric may be chosen for the proposed Blockchain's database system, where all participating node identities are known and authenticated, and only peer nodes can validate and verify transactions. Hyperledger Fabric is a private Blockchain platform that achieves security, interoperability, and privacy. The platform allows some basic features to be configured, such as block size, which impacts the network throughput and latency. The transaction separation may flow into three steps: execution or endorsement, ordering, and validation. This separation is the primary distinction between Hyperledger Fabric and other platforms, which can assist with scaling the solution in terms of the number of processing transactions and the number of participating nodes.

Hyperledger Fabric is designed to deploy at the enterprise private network for sensitive information sharing and exchanging in a trade context. Permission to read, write, and validate transactions to the ledger may be chosen by consensus. Access to the entire ledger may not be uniform across all stages in the supply chain to avoid misuse of sensitive business information; however, the transacting nodes may have access to the complete history of all previous transactions, product locations, and quality information. This information may be used to establish a trusted system for fish product traceability and identify any safety and quality violations or fraud.

Hyperledger Fabric enables a clear line of communication between multiple players in the supply chain. The platform may also preserve confidentiality for suppliers, shippers, and buyers, since it has the concept of channels, which allows partitioning of the fabric network into multiple Blockchains. For example, a supplier wants to set a different price per retailer without sharing this information. Separate channels can be created between the supplier and each retailer so only channel members can use it to communicate and complete their transactions.

The system's functionalities in the application layer 1215 may be exposed to the end-users who can collaborate with the system using write operations to store data, queries to retrieve data, remote visualization, data analytics, image processing, and Machine Learning. For instance, the information extracted from the knowledge layer 1210 may be processed and visualized over the fisher APP, enabling fishers to take Blockchain-verified photos of their catch with their smartphones. The photos, along with the time and location, are then uploaded to the Blockchain together with the digital certificates, or their hash values. Origin proofs and real-time quality tracking are possible using this method. Traceability software may be used by stakeholders, including authorities, business partners, and consumers, to track the fish from their capture sites to the consumer. Consumer APPs may be used to verify the purchased products in terms of provenance, traceability, and quality, and provide nutritional information to the final consumers. Integrating image processing and Machine Learning technologies with the fish supply chain system may assist in detecting fish quality and health, especially with recent advances in handheld inspection device technology.

Blockchain IoT-enabled fish supply chain systems may collect abundant amounts of data regarding fish welfare, water quality, genetics, feed, processing, and distribution, which can be utilized to advance the supply chain management systems towards more sustainability and transparency.

The number of transactions on the Blockchain and IoT cloud are growing rapidly; therefore, Machine Learning may be used to automate data analysis and business decisions by categorizing, standardizing, aggregating, annotating, and transforming the big and unstructured data that come from different areas of the supply chain. The trained Machine Learning models may be used to construct applications, solutions, or tools for sustainable Blockchain-based supply chain management, which will reduce human intervention and overcome the weakness of traditional decision-making systems that manage big data.

The Machine Learning model's effectiveness may be determined by the chosen algorithm, which can be selected from the following categories: supervised learning, unsupervised learning, semi-supervised learning, reinforcement learning, and federated learning, as well as the availability of substantial amounts of data samples for the different classes or categories. Data may be collected using supply chain with the assistance of numerous technologies, such as wireless sensor networks, satellite communication, handheld devices, and automation identification systems, such as barcoding and RFID tags.

FIG. 24 depicts architecture of a Multichain blockchain network controlled by one Admin, which sets the roles of other participating nodes. The Admin 1220 can create more Admins to avoid a single point of failure. Multichain manages access to the data using a set of participants, which obtain addresses and various permissions, allowing them to exist in the closed blockchain network. The pre-registered participants may have access to read and write blocks on the ledger. Transaction validation and block mining may be performed by a known set of miner nodes 1222, 1224, 1226, called, for examples, validators. Multichain command-line interface (CLI) and JSON-RPC clients, or regular nodes, may interact with the network and access the blockchain API.

Multichain may use data streams that act as an independent append-only collection of items, which enforces shared data confidentiality. This technology is characterized by its flexibility, allowing permissions changes and delegations. Multichain is also based on round-robin scheduling, where nodes take turns creating blocks and adding them to the blockchain.

In Multichain, block validation is achieved through a round-robin scheduling process where validators take turns publishing blocks. This approach may eliminate the mining race and promotes fairness within the blockchain network by avoiding conflicts between nodes competing to send transactions. Additionally, it may reduce the risk of a 50% attack, as no single participant has a monopoly over the majority of block creation. The absence of cryptographic puzzles during block validation also conserves the resources of the nodes. Multichain may employ the principle of mining diversity, which means that a specified percentage of miners can validate consecutive blocks without repetition. The time a miner has to wait for its turn to validate the next block can be calculated using Equation (1).

$$\text{Interval} = \text{\# of miners} * \text{mining diversity} \qquad \text{Equation 1}$$

Where $0.0 \leq \text{mining diversity} \leq 1.0$. A value of 1 means that every miner will be included in the rotation, while 0 indicates no restrictions. Although a high mining diversity value (<0.75) is recommended, a value too close to 1 may cause the blockchain to freeze if some miners become inactive or malfunction. To avoid this, a time limit may be set to control the length of the wait, ensuring that block publication is not interrupted by unavailable nodes.

Round-robin scheduling aligns well with the distributed systems architecture that requires node trust, but it is not suitable for permissionless blockchain networks commonly used by cryptocurrencies. In these networks, malicious nodes can add new nodes, increasing the risk of new blocks being deployed.

FIG. 25 depicts a distributed publish-subscribe architecture that may be integrated on top of the Hyperledger Fabric. Publishers may generate data, and distributed brokers integrated into the Blockchain platform may receive the data from the publishers, verify, and validate the data content, and coordinate data communications between publishers and subscribers. Subscribers who have already registered for specific data may receive the verified data via the brokers. Publishers and subscribers usually belong to different organizations and do not know each other. This situation is similar to a supply chain in which IoT devices are connected to the different parts of particular organizations. These participants may be interfaced with their own brokers to maintain a consistent state through the consensus protocol. A hybrid storage model that includes both on-chain and off-chain storage may be used. Interplanetary File System may be used for off-chain data storage, as more data are sent on the Blockchain and may be extended with additional storage using cloud facilities.

According to some embodiments presently disclosed, fish processing plants establish their brand as a provider of authenticated species and high-quality products. Their aim is to attract wholesalers, retailers, and online markets by offering proof of authenticity and freshness. Similarly, wholesalers and retailers also seek to provide their customers with evidence of the products' freshness and authenticity. some of the motivations for implementing traceability systems in fish processing plants are:

To comply with legal requirements by the European Union, the USA, and other markets that mandate traceability of seafood products.

To meet customer demands for information on product origin, production methods, environmental and social impacts, and other attributes.

To improve operational efficiency, reduce waste, optimize inventory, and enhance product quality and shelf life.

To demonstrate social and environmental responsibility, support certification schemes, and participate in improvement projects.

The mislabeling issue exists in multiple forms, such as misrepresentation of the species, freshness, origin of catch, and processing/handling methods. Mislabeling is when food packaging does not accurately reflect the contents of the product. Mislabeling can be intentional or unintentional, and it can have negative consequences for consumers, such as health risks, economic losses, or ethical concerns. In general, some of the forms of mislabeling in foods are:

False advertising: When a food product makes claims that are not true or supported by evidence, such as "all natural", "organic", "gluten-free", or "low-fat" when they are not. For example, a food product is labeled as "all natural" but contains a synthetic preservative1.

Missing or incorrect ingredients: When a food product does not list all the ingredients it contains, or lists ingredients that it does not contain. This can be due to human error, fraud, or contamination. For example, an ingredient is not listed on a product label, even though it is required by law1.

Undeclared allergens: When a food product contains an ingredient that can cause an allergic reaction in some people, but does not declare it on the label. This can be life-threatening for people with severe allergies. For example, a food product is labeled as "gluten-free" even though it contains barley2.

Product substitution: When a food product is replaced with a cheaper or inferior product, without informing the consumer. This can be done to increase profits, avoid shortages, or deceive consumers. For example, inexpensive types of fish are labeled as more expensive fish.

Date mislabeling: When a food product is labeled with an incorrect "sell by" or "use by" date, which can affect the quality and safety of the product. This can be done to extend the shelf life of the product, or to avoid waste. For example, a food product is labeled with an incorrect "sell by" or "use by" date1.

To illustrate, if the fish has been frozen and how many times it has been frozen, device 10, described above, can assess all of the aforementioned aspects. It's important to note that fish is just one example. The above described device 10 may be used on other products and/or food as well.

FSMA stands for the Food Safety Modernization Act, which is a law that aims to ensure the safety of the U.S. food supply by shifting the focus from responding to foodborne illness outbreaks to preventing them. Traceability is the ability to track the history, location, and status of a food or its components along the supply chain. Traceability is important for food safety, quality assurance, market access, and consumer confidence. The FDA final rule on Requirements for Additional Traceability Records for Certain Foods (Food Traceability Final Rule) is a regulation that implements Section 204 (d) of the FSMA. The final rule establishes traceability recordkeeping requirements, beyond those in existing regulations, for persons who manufacture, process, pack, or hold foods included on the Food Traceability List (FTL). The FTL consists of 16 categories of foods that have a higher risk of causing foodborne illness outbreaks. The Food Traceability Final Rule requires persons subject to the rule to: Maintain records containing Key Data Elements (KDEs) associated with specific Critical Tracking Events (CTEs) along the supply chain of foods on the FTL. KDEs are pieces of information that are necessary to trace a food or its components, such as lot numbers, dates, quantities, and locations. CTEs are points in time when a food or its components are created, transformed, moved, or disposed of Provide information to the FDA within 24 hours or within some reasonable time to which the FDA has agreed when requested during a foodborne illness investigation or other public health emergency. Use electronic or paper records that are legible, accurate, and complete. Keep records for two years after they are created or received.

The compliance date for all persons subject to the Food Traceability Final Rule is Jan. 20, 2026. The final rule is a key component of the FDA's New Era of Smarter Food Safety Blueprint, which outlines the agency's vision and goals for enhancing food safety in the 21st century.

Selection and Spectral Recording: The operator randomly selects food items, such as fish, and records their spectra using device 10 described above. These spectra serve as the initial reference data for the food products.

Reference Facility Labeling: The reference facilities, which may include processing plants in Alaska, cinnamon producers in Sri Lanka, or grass-fed beef producers in Brazil, will apply labels of authenticity to the food items. These labels will contain crucial information such as the species, feed type, catch date, and different processing methods. These labels may be associated with the corresponding spectral data of each food item.

Supply Chain Monitoring: Throughout the entire supply chain, the biological changes of the food products will be closely monitored. This monitoring involves tracking the changes in the food items' properties and characteristics over time. Key factors considered include temperature variations and other handling factors experienced during shipping and distribution.

Correlation/Machine Learning Analysis: The collected spectral data and monitoring information are subjected to correlation/Machine Learning analysis. This analysis aims to establish connections between the biological (compositional, chemical, and molecular) changes in the food items and the specific factors impacting them, such as time, temperature fluctuations, and handling conditions during transportation.

FIG. 26 depicts a process 1240 according to some embodiments presently disclosed. At 1242, sensors are installed on relevant points in the supply chain or production process to capture data. Sensors may include temperature sensors, humidity sensors, Global Positioning System (GPS) trackers, or any other sensor relevant to the product's traceability. At 1244, sensors from 1242 collect data from the environment or product they are monitoring. According to some embodiments presently disclosed, the sensors collet data continuously. According to some embodiments, temperature sensors records temperature fluctuations, GPS trackers records location data, etc. According to some embodiments presently disclosed, the collected data is aggregated and organized into a format suitable for blockchain integration. At 1246, the collected data undergoes validation and verification process to ensure its accuracy and authenticity. According to some embodiments presently disclosed, the collected data undergoes validation and verification prior to being entered into the blockchain. According to some embodiments presently disclosed, the collected data may be cross-references with existing records or undergo cryptographic verification to detect any tampering or inconsistencies. At 1248, the data that was validated at 1246 is encrypted to ensure its security and privacy. According to some embodiments presently disclosed, a cryptographic hash of the validated data is created. The cryptographic hash of the validated data may act as a unique identifier for the dataset and enhanced data integrity. At 1250, prepare a transaction to enter the encrypted and hashed data into the blockchain. According to some embodiments presently disclosed, the transaction may include the data, the timestamp, and any other relevant metadata. According to some embodiments presently disclosed, the transaction may be broadcast to the blockchain network for validation and consensus. At 1252, the blockchain network's nodes (i.e. computers) validate the transaction and the data it contains. Depending on the blockchain's consensus mechanism (e.g., Proof-of-Work, Proof-of-Stake), the nodes may agree on the validity of the transaction and add it to a new block. At 1254, once consensus is achieved, the new block containing the data may be added to the blockchain. The block becomes immutable, meaning that the data it holds cannot be altered or deleted without consensus from the majority of the network. At 1256, the updated blockchain may be distributed to all network participants, ensuring that everyone has access to the latest information. The new data may now be visible to all relevant stakeholders within the blockchain network. At 1258, at any point in the supply chain or production process, authorized parties can access the blockchain and trace the product's history from its origin to its current location.

The transparency of the blockchain ensures that data integrity is maintained, and any changes or events are securely recorded. By following these steps, data generated by sensors is securely entered into the blockchain, ensuring enhanced traceability, data integrity, and transparency throughout the entire supply chain or production process.

FIG. 27 depicts a process 1260 according to some embodiments presently disclosed. According to some embodiments, the process 1260 allows data generated by the device 10 (described above) to be stored on the blockchain using, for example, Blockchain smart contracts. At 1262, device 10, scans a product and generates one or more Final Predictions 416, 722, 822, 922 and/or 1028 using one or more Machine Learning models. The device 10's output may serves as an API endpoint exposed by the one or more Machine Learning models, allowing the device 10 module to send input data by invoking the smart contract end-point, which is the Uniform Resource Locator (URL) address of the smart contract on the blockchain. According to some embodiments presently disclosed, each device 10 record may be a data structure that encompasses multiple fields, including: (1) Species Name: This field indicates the identified species of the scanned product. (2) Level of Confidence: It represents the degree of certainty or confidence associated with the species identification prediction. (3) Measured Spectra: This field contains the spectral data obtained during the scanning process, which is used by the one or more Machine Learning models for analysis and prediction.

At 1264, the authenticity of the fish may be ensured by comparing the predicted fish identity obtained by the device 10 with the actual identity. According to some embodiments presently disclosed, the device 10 generates a predicted fish identity based on the analysis and predictions made by the one or more Machine Learning models. This identity may be determined through species identification and other relevant characteristics. According to some embodiments presently disclosed, the actual fish identity may be obtained through various means, such as, for example, visual inspection, reference data on the blockchain, or other reliable sources. It represents the verified and known identity of the fish under examination. According to some embodiments presently disclosed, the predicted fish identity may be compared with the actual fish identity to assess their consistency. This involves evaluating the degree of match or similarity between the predicted and actual identities. According to some embodiments presently disclosed, a high level of authenticity may be indicated if the predicted fish identity aligns closely with the actual fish identity. This verifies that the fish is genuine and matches the expected species. According to some embodiments presently disclosed, further investigation or measures may be initiates in the case of discrepancies or variations between the predicted and actual identities. These may include additional testing, expert evaluation, or taking appropriate actions based on predetermined protocols.

At 1266, the device 10 displays fish's identity if at 1264 it is determined that the product is authentic.

At 1268, the device 10 displays an alarm message to indicate a detected issue with the fish's authenticity.

At 1270, a smart contract is triggered. According to some embodiments presently disclosed, smart contracts are self-executing sets of instructions that represent contractual agreements embedded within the blockchain. They may automate and enforce predefined rules and conditions for transactions, enhancing trust and efficiency in the system. This step involves setting up the smart contract on the blockchain and defining its structure and functionality to define variables, write data, and access data.

At 1272, smart contracts enable automatic verification and execution of various actions. After getting predictions/ detections from the one or more Machine Learning models' API, the event may be triggered within the smart contract by the device 10, which, passes the device 10 record to the blockchain. The device 10 may be represented as a "Client" that accesses the methods (functions) such as Read and Write operations.

At 1274, consensus protocol may be invoked. The recorded information (i.e., transaction) may undergo blockchain validation and confirmation by consensus mechanism (e.g., POW, POS, etc), ensuring its immutability and Integrity.

At 1276, Check may be performed to confirm if the transaction meets the criteria of the consensus protocol, such as having a valid signature, sufficient funds, and proper formatting. All nodes on the network must reach a consensus on the updated state to maintain the integrity of the blockchain.

At 1278, valid transactions are grouped together into a new block after the transaction pass validation. The new block may be generated to be recorded on the blockchain and state variables are updated.

At 1280, an error message is displayed and the block is rejected and not added to the blockchain if the proposed block is not valid and not accepted by the majority of nodes.

At 1282, the newly proposed block is propagated through the blockchain network. The blockchain is updated with the new state reflecting the changes made by the smart contract execution.

Referring to FIG. 28, a class diagram 1300 is shown according to some embodiments presently disclosed. According to some embodiments presently disclosed, the class diagram 1300 represents components with key attributes for each system element. According to some embodiments presently disclosed, the diagram 1300 provides an overview of the presently disclosed system's structure, showcasing the components and their associated attributes. Each system element may be represented as a class, and its relationships and attributes are highlighted.

According to some embodiments presently disclosed, presently disclosed system comprises a Harvester class 1302. According to some embodiments presently disclosed, the Harvester class 1302 represents the harvester node in the system. According to some embodiments presently disclosed, the Harvester 1302 has responsibilities such as harvest, register, and pack the raw fish. According to some embodiments presently disclosed, the Harvester 1302 possesses attributes such as harvesterID, name, contact information and location, which provide unique identification and relevant information about the harvester.

According to some embodiments presently disclosed, presently disclosed system comprises a Supplier class 1304. According to some embodiments presently disclosed, the supplier class 1304 represents the supplier node and contains attributes such as supplierID, name, and contact information. These attributes help identify and provide necessary details about the supplier.

According to some embodiments presently disclosed, presently disclosed system comprises a Manufacturer 1322. According to some embodiments presently disclosed, the Manufacturer 1322 is responsible of manufacturing processes such as transferring the raw fish into finished products and set product quality specifications. According to some embodiments presently disclosed, the Manufacturer 1322 contains attributes such as Manufacturer name, ID, processing type and date in addition to contact information.

According to some embodiments presently disclosed, presently disclosed system comprises a Distributer 1324.

According to some embodiments presently disclosed, the Distributer 1324 is responsible of acquiring fish products from various manufacturers in, for example, a distribution center and assemble or pack them into batches according to the retailers' needs, then sell them out to retailers. According to some embodiments presently disclosed, the Distributer 1324 contains attributes such as Distributer name, ID, processing type and date in addition to contact information.

According to some embodiments presently disclosed, presently disclosed system comprises a Retailer 1326. According to some embodiments presently disclosed, the Retailer 1326 may be either small local stores or big supermarkets. According to some embodiments presently disclosed, the Retailer 1326 is responsible for selling the fish products, monitoring and analyzing product conditions, and provides APIs for end-consumers. According to some embodiments presently disclosed, the Retailer 1326 contains attributes such as Retailer name, ID, in addition to contact information.

According to some embodiments presently disclosed, presently disclosed system comprises a Customer 1328. According to some embodiments presently disclosed, the Customer 1328 may be the final element of the chain. According to some embodiments presently disclosed, the Customer 1328 may have fewer rights than other system actors such as view origin and history of the fish product and verify product authenticity. According to some embodiments presently disclosed, the Customer 1328 may contain attributes such as Customer name, ID, in addition to contact information.

According to some embodiments presently disclosed, presently disclosed system comprises a Order 1312. According to some embodiments presently disclosed, the Order 1312 signifies an order within the system. According to some embodiments presently disclosed, the Order 1312 includes attributes like orderID, date, quantity, and status, which help track and manage the orders placed by suppliers.

According to some embodiments presently disclosed, presently disclosed system comprises a Product 1314. According to some embodiments presently disclosed, the Product 1314 includes attributes like ProductName, ID, date, quantity, and status.

According to some embodiments presently disclosed, presently disclosed system comprises a Fish Status 1316. According to some embodiments presently disclosed, the Fish Status 1316 includes attributes feed from IoT Devices such as inspection data and location data.

According to some embodiments presently disclosed, presently disclosed system comprises a Internet of Things (IoT) Device 1318. According to some embodiments presently disclosed, the IoT Devices 1318 are responsible for enabling continuous monitoring and providing valuable input for quality assessment and traceability. It includes attributes such as Device Name, ID, and readings.

According to some embodiments presently disclosed, presently disclosed system comprises Quality, Adulteration and Traceability (QAT) system 1336. According to some embodiments presently disclosed, the Quality, Adulteration and Traceability (QAT) system 1336 is responsible for identifying the fish and assessing its freshness. According to some embodiments presently disclosed, the Quality, Adulteration and Traceability (QAT) system 1336 is the device 10 as described in more detail above.

According to some embodiments presently disclosed, presently disclosed system comprises a Shipment 1334 According to some embodiments presently disclosed, the shipment class 1334 represents the shipment details associated with an order. It possesses attributes such as shipmentID, date, destination, and status, enabling effective tracking and management of shipments.

According to some embodiments presently disclosed, presently disclosed system comprises a Chain Nodes 1308 which aggregates a Regular Node 1310 and a Minor Node 1320. Each of these nodes' lists has several attributes such as Node List, location, and status.

According to some embodiments presently disclosed, presently disclosed system comprises a Smart Contracts 1306. According to some embodiments presently disclosed, the Smart contracts 1306 contain predefined functions that dictate the terms and conditions for all participating Chain Nodes.

According to some embodiments presently disclosed, presently disclosed system comprises an Address 1330 and a Contact 1332. According to some embodiments presently disclosed, the Address 1330 and the contact 1332 may be contained, for example, in the Harvester 1302, the Supplier 1304, the Manufacturer 1322, the Distributer 1324, the Retailer 1326, and/or the Customer 1328.

According to some embodiments presently disclosed, the class diagram 1300 depicts relationships between these components, showcasing their associations and dependencies. For instance, the harvester 1302 and supplier 1304 nodes may interact through the order and shipment classes, with relevant attributes connecting them. According to some embodiments presently disclosed, the class diagram 1300 depicts a visual representation of the presently disclosed system's main components, their attributes, and their relationships, aiding in the understanding of the system's structure and functionality.

Referring to FIG. 29, a system 1400 is shown according to some embodiments presently disclosed. According to some embodiments presently disclosed, the system 1400 depicts the blockchain components along with technologies for building presently disclosed system.

According to some embodiments presently disclosed, the system 1400 comprises a BC-System 1426. According to some embodiments presently disclosed, the BC-System 1426 forms the underlying foundation of the Blockchain-based system, comprising a distributed ledger that securely records and validates transactions across the food supply chain. The BC-System 1426 may generalize NTW layer 1428 which may generalize three computing technologies of Edge 1418, Fog 1420, and Cloud 1422.

According to some embodiments presently disclosed, the system 1400 comprises a Smart Contracts 1406. The Smart contracts 1406 may be self-executing agreements embedded within the blockchain. According to some embodiments presently disclosed, the Smart contracts 1406 automate and enforce predefined rules and conditions for transactions 1444, enhancing trust and efficiency in the system. According to some embodiments presently disclosed, the Smart contracts 1406 enable automatic verification and execution of various actions, such as product authentication, quality assurance, and traceability.

According to some embodiments presently disclosed, the system 1400 comprises a Consensus protocol 1446 that may be configured to validate transactions 1444. After transaction validation, each Block 1442 is formed using a batch of recent valid transactions 1444. Examples of common transactions are Get Access 1450 and Put Access 1448.

According to some embodiments presently disclosed, the system 1400 comprises Sensors 1408, Inspection Devices 1410, Smart Weighting devices 1412, Monitoring Cameras 1416. According to some embodiments presently disclosed, the Sensors 1408, the Inspection Devices 1410, the Smart Weighting devices 1412, and/or the Monitoring Cameras 1416 are IoT Input Devices 1454 which may be deployed throughout the supply chain to collect real-time data. According to some embodiments presently disclosed, the Sensors 1408, the Inspection Devices 1410, the Smart Weighting devices 1412, and/or the Monitoring Cameras 1416 capture information on parameters like temperature, humidity, location, and quality indicators.

According to some embodiments presently disclosed, the Inspection Devices 1410 is the Quality, Adulteration and Traceability (QAT) system/device. According to some embodiments presently disclosed, the Quality, Adulteration and Traceability (QAT) system/device is responsible for identifying the fish and assessing its freshness. According to some embodiments presently disclosed, the Quality, Adulteration and Traceability (QAT) system/device is the device 10 as described in more detail above.

According to some embodiments presently disclosed, the system 1400 comprises End-Users 1424 interacting with the system through GUI 1430 that uses Output Devices 1452 for visual display.

According to some embodiments presently disclosed, the system 1400 comprises Chain Nodes 1432 represented by Regular Nodes 1434 and Minor Nodes 1436. The Minor Nodes 1436 may use On-chain storage 1438 and/or Off-chain storage 1440.

FIG. 29 provides a high-level overview of the components and technologies involved in building the presently disclosed blockchain-based system for food authenticity and traceability.

Referring to FIG. 30, a sequence diagram 1500 is shown according to some embodiments presently disclosed. According to some embodiments presently disclosed, the sequence diagram 1500 illustrates the registration and interaction between a harvester and a supplier in the supply chain system. Referring to FIG. 30, a process 1500 is shown according to some embodiments presently disclosed. According to some embodiments presently disclosed, the process 1500 illustrates the registration and interaction between a harvester and a supplier in the supply chain system. According to some embodiments presently disclosed, the process 1500 illustrates the registration and interaction between a harvester and a supplier in the block-chain-based supply chain system during their identity registration and secure authentication process. Upon successful registration, each peer node may be assigned a unique number known as the Node ID. Following the peer node registration, the blockchain deploys the smart contract, which contains predefined functions that dictate the terms and conditions for all participating peers.

The smart contract functions may be designed to be triggered when specific actions occur. These functions facilitate the placement, confirmation, or rejection of orders, as well as the placement, confirmation, or rejection of shipments. Additionally, the smart contract may allow for the updating of entity statuses, ensuring that all peers adhere to the established terms and conditions outlined in the contract.

The process 1500 may be used to promote transparency and accountability within the system, enabling efficient and reliable interactions between harvester and supplier nodes while maintaining compliance with the smart contract's regulations.

Referring to FIG. 31, an overall design of the block chain system using layer architecture is shown according to some embodiments presently disclosed.

Referring to FIG. 32, a block structure is shown according to some embodiments presently disclosed.

Referring to FIG. 33, a peer 1702 inputs Username and Password to allow the presently disclosed system to authenticate the peer 1702. According to some embodiments presently disclosed, the peer 1702 may be a harvester, manufacturer, distributer and/r retailer. If the system authenticates the peer 1702, the presently disclosed system displays all features available for the role the peer 1702 is associated with as defined in peer 1702's account. If the peer 1702 does not have an account, the presently disclosed system will give the peer 1702 the opportunity to create an account. If the peer 1702 forgot username or password, the presently disclosed system may prompt the peer 1702 to answer security question provided in the Create Account stage. If answered correctly, the username and password are emailed to the email address provided when the account was created. If the peer 1702 entered an invalid username and/or password, the presently disclosed system may describe the reasons why the peer 1702 failed authentication. The presently disclosed system may present the peer 1702 with suggestions for changes necessary to allow the peer 1702 to pass authentication. The presently disclosed system may prompt the peer 1702 to re-enter the valid information. The Flow continues where the peer 1702 enters new information.

Referring to FIG. 34, presently disclosed system allows a peer 1704 to access new fish item registration web page. If the fish is not already registered, presently disclosed system allows the peer 1704 to register new fish.

The presently disclosed system allows the peer 1704 to select add a new fish item. On adding new fish product screen, fill all the details and select add the item to the order list. When the peer 1704 completed adding the item details, the presently disclosed system may generate a QR code and a bar code for the fish and the new item specifications will be displayed on the screen. The peer 1704 who is the owner of the new fish will receive a confirmation email regarding the new fish item. An email with the new item details may also be sent to all peers.

If the peer 1704 fails to fill all the fields with sufficient information about the new fish item, the presently disclosed system may notify the peer 1704 of the reason why the new item was not able to be registered. The presently disclosed system may present the peer 1704 with suggestions for changes necessary to allow the peer to register the item. The presently disclosed system may prompt the peer to re-enter the valid information. The Flow continues where the peer 1704 enters new information.

Referring to FIG. 35, presently disclosed system issues/generates certificate for the newly registered fish. After completing registration of new fish as described in FIG. 34, the presently disclosed system may send an email to the peer 1706. The peer 1706 may clicks on issue certificate button provided in the email. The presently disclosed system may request that peer 1706 to enter the email code. The presently disclosed system may generate the certificate for new fish once code is entered.

Referring to FIG. 36, presently disclosed system allows the peer 1708 to add RFID tags, barcode, and/or QR code to the new fish added in FIG. 34. According to some embodiments presently disclosed, the peer 1708 scans the fish product against different ioT devices available. According to some embodiments presently disclosed, the peer 1708 clicks add details page. The peer 1708 may add the RIFD tags within the required column. The presently disclosed system process and save the tags within the database. The peer 1708 may further scan the barcode against the system. The presently disclosed system process and save the detail. The peer 1708 may scan the QR code. The presently disclosed system saves the details. The peer 1708 may click on save changes and finish button. The presently disclosed system stores the information.

Referring to FIG. 37, presently disclosed system allows the peer 1710 to generate item/batch number for new packages and register their specifications (time, production date, expiry date, etc.). According to some embodiments presently disclosed, the peer 1710 opens add item page. The presently disclosed system prompts to enter the item number. The Distributor/peer 1710 enter the item number. The Distributor/peer 1710 enter the time of production and expiry dates of the product. The Distributor/peer scans the barcode to finish adding the item. The presently disclosed system stores the information.

Referring to FIG. 38, presently disclosed system allows the customer/peer 1712 to make an order. According to some embodiments presently disclosed, the customer/peer 1712 clicks on the purchase button of the product. The presently disclosed system asks to confirm purchase. The customer 1712 confirm purchase. The presently disclosed system generates the tracking id for the order through which the customer 1712 can track the order in future, The presently disclosed system may ask to enter the payment details. The customer 1712 may enter the credit card information and the system authenticate the card. The order gets placed successfully.

Referring to FIG. 39, presently disclosed system allows the supplier/distributor 1714 to ship an order. According to some embodiments presently disclosed, the supplier/distributor 1714 confirms the order and makes payment. The supplier/distributor 1714 delivers the product and update the status of the shipment to delivering. The presently disclosed system keeps tracking the package timely and keep updating the status. On successful delivery the status changes to complete.

Referring to FIG. 40, presently disclosed system allows the peer 1716 to monitor the overall package for safety checks. According to some embodiments presently disclosed, the peer 1716 opens the control panel screen of a specific type of fish. The peer 1716—clicks on required option of interest. The—presently disclosed system measures the temperature, humidity, bacteria level of the fish at that time. The presently disclosed system compares the values to the stored values of the fish. The presently disclosed system displays the status of all the current values.

Referring to FIG. 41, presently disclosed system allows the peer 1718 to track fish. According to some embodiments presently disclosed, the GPS tracker 1720 starts monitoring the fish package movement. The presently disclosed system records the key attribute of the fish movement using geo location API. The presently disclosed system compares the distance between the desired delivery place and current place. The presently disclosed system makes the report about the fish movement and store it. The peer 1718 requests the presently disclosed system to display the tracking information of the fish. The presently disclosed system displays the information.

Referring to FIG. 42, presently disclosed system notifies the peer 1722 about freshness of the fish. According to some embodiments presently disclosed, the peer 1722 uses device 10 described above to inspect the fish. The presently disclosed system identifies the fish species. The presently disclosed system determines the level of deterioration in fish freshness. The presently disclosed system notifies the peer 1722.

Referring to FIG. 43, an IoT sensor of the presently disclosed system detects changes in the measurements (for example, temperature, humidity, etc) and notifies the peer 1724 of the detected changes. According to some embodiments presently disclosed, the peer 1724 uses device 10 described above to inspect fish. The presently disclosed system finds the parameter change. The presently disclosed system detects the reason for the change and control value.

Referring to FIG. 44, a weighing device of the presently disclosed system detects changes in the weight of the fish and notifies the peer 1726 of the detected changes. According to some embodiments presently disclosed, the weight machine measures any change in the weight of the fish. The presently disclosed system finds some weight change. The presently disclosed system compares the initial weight to the present weight. The s—presently disclosed system calculates the difference between both weights. The presently disclosed system notifies the peer 1726.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another, i.e. may include transitory and/or non-transitory computer readable media. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While several illustrative embodiments of the invention have been shown and described, numerous variations and alternative embodiments will occur to those skilled in the art. Such variations and alternative embodiments are contemplated, and can be made without departing from the scope of the invention as defined in the appended claims.

As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

The foregoing detailed description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "step(s) for . . . ."

What is claimed is:

1. A method comprising:

inspecting a food product having a stated identity using a fluorescence imaging mode, a hyperspectral imaging mode, and a thermal imaging mode;

generating one or more final predictions based on the fluorescence imaging mode, the hyperspectral imaging mode, and the thermal imaging mode;

collecting data from one or more sensors;

validating data collected from one or more sensors;

comparing the one or more final predictions with the stated identity of the food product;

determining if the stated identity of the food product is accurate;

preparing a transaction based on the validated data, the one or more final predictions, and the determining;

broadcasting the transaction to a blockchain network;

validating the transaction; and adding new block to the blockchain network based on validated transaction.

2. The method of claim 1, wherein the one or more sensors are temperature sensors, humidity sensors, or Global Positioning System trackers.

3. The method of claim 2, wherein the one or more sensors are positioned along supply chain.

4. The method of claim 3, wherein the one or more sensors are positioned adjacent to the food product.

5. The method of claim 1 further comprising creating a cryptographic hash of the validated data, wherein the cryptographic hash is a unique identifier for the validated data and enhanced data integrity.

6. The method of claim 1, wherein the transaction comprises a timestamp.

7. The method of claim 1, wherein the transaction comprises a metadata.

8. A method comprising:

inspecting a food product having a stated identity using a fluorescence imaging mode, a hyperspectral imaging mode, and a thermal imaging mode;

generating one or more final predictions based on the fluorescence imaging mode, the hyperspectral imaging mode, and the thermal imaging mode;

providing a blockchain corresponding to the product;

comparing the one or more final predictions with the stated identity of the food product;

determining if the stated identity of the food product is accurate;

implementing smart contract when the determination is positive;

performing blockchain validation and confirmation;

generating a new block; and recording the new block on the blockchain.

9. The method of claim 8 further comprising propagating the new block through a blockchain network.

10. The method of claim 8 further comprising updating the blockchain with new state based on the smart contract.

* * * * *